(12) United States Patent  
Nakayama et al.

(10) Patent No.: US 6,606,200 B1  
(45) Date of Patent: Aug. 12, 2003

(54) ZOOM LENS DEVICE AND OPTICAL APPARATUS PROVIDED WITH THE SAME

(75) Inventors: Hiroki Nakayama, Sagamihara (JP); Hiroyuki Hamano, Yamato (JP); Hiroki Yoshida, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/421,367

(22) Filed: Oct. 19, 1999

Related U.S. Application Data

(63) Continuation-in-part of application No. 08/931,518, filed on Sep. 16, 1997, now abandoned.

(30) Foreign Application Priority Data

| Sep. 19, 1996 | (JP) | 8-247837 |
| Aug. 1, 1997 | (JP) | 9-221057 |
| Aug. 1, 1997 | (JP) | 9-221059 |
| Aug. 4, 1997 | (JP) | 9-221951 |
| Sep. 10, 1997 | (JP) | 9-245314 |
| Oct. 20, 1998 | (JP) | 10-316922 |

(51) Int. Cl.$^7$ .............................. G02B 15/14
(52) U.S. Cl. ........................ 359/686; 359/683
(58) Field of Search ................. 359/683, 686, 359/687, 676

(56) References Cited

U.S. PATENT DOCUMENTS

| 4,776,679 A | 10/1988 | Kitagishi et al. | 350/427 |
| 4,810,070 A | 3/1989 | Suda et al. | 350/413 |
| 4,832,471 A | 5/1989 | Hamano | 350/427 |
| 4,842,386 A | 6/1989 | Kitagishi et al. | 350/427 |
| 4,907,866 A | 3/1990 | Kitagishi et al. | 350/426 |
| 4,934,796 A | 6/1990 | Sugiura et al. | 350/427 |
| 4,998,809 A | 3/1991 | Tsuji et al. | 350/500 |
| 5,009,492 A | 4/1991 | Hamano | 350/427 |
| 5,011,272 A | 4/1991 | Nakayama et al. | 350/427 |
| 5,044,706 A | 9/1991 | Chen | 359/357 |
| 5,050,972 A | 9/1991 | Mukaiya et al. | 359/683 |
| 5,078,481 A | 1/1992 | Nakayama et al. | 359/680 |
| 5,087,988 A | 2/1992 | Nakayama | 359/689 |
| 5,111,338 A | 5/1992 | Nakayama | 359/686 |
| 5,113,287 A | 5/1992 | Nakayama | 359/676 |
| 5,134,524 A | 7/1992 | Hamano et al. | 359/687 |
| 5,138,492 A | 8/1992 | Hamano et al. | 359/684 |
| 5,268,790 A | 12/1993 | Chen | 359/558 |
| 5,299,064 A | 3/1994 | Hamano et al. | 359/684 |
| 5,430,576 A | 7/1995 | Hamano | 359/684 |
| 5,493,441 A | 2/1996 | Chipper | 359/354 |

(List continued on next page.)

FOREIGN PATENT DOCUMENTS

| DE | 195 33 591 | 3/1996 |
| JP | 62-24213 | 2/1987 |
| JP | 62-247316 | 10/1987 |
| JP | 4-213421 | 8/1992 |
| JP | 6-324262 | 11/1994 |
| JP | 9-127321 | 5/1997 |
| JP | 9-127322 | 5/1997 |

OTHER PUBLICATIONS

Yoshiya Matsui, "Lens Design Method," Kyoritsu Shuppan Publishing Co., Ltd., p. 98.

Primary Examiner—Scott J. Sugarman
(74) Attorney, Agent, or Firm—Fitzpatrick, Cella, Harper & Scinto

(57) ABSTRACT

A zoom lens device including a diffraction optical element constructed in a new way. In a basic form of the invention, the zoom lens device includes in order of lens units from a long conjugate side, at least a first lens unit including the diffraction optical element, a second lens unit which is moved during zooming in order to change the size of an image, and a third lens unit. In this zoom lens device, during zooming at least one of the lens units from the third lens unit onwards is moved in order to correct a change in an image plane which occurs as the magnification changes.

104 Claims, 53 Drawing Sheets

U.S. PATENT DOCUMENTS

| | | | |
|---|---|---|---|
| 5,521,758 A | 5/1996 | Hamano | 359/557 |
| 5,546,230 A | 8/1996 | Sato et al. | 359/684 |
| 5,583,699 A | 12/1996 | Nakayama | 357/687 |
| 5,600,490 A | 2/1997 | Sugawara et al. | 359/690 |
| 5,638,216 A | 6/1997 | Horiuchi et al. | 359/683 |
| 5,677,792 A | 10/1997 | Hamano | 359/557 |
| 5,717,525 A | 2/1998 | Estelle et al. | 359/677 |
| 5,739,961 A | 4/1998 | Nakayama et al. | 359/687 |
| 5,751,496 A | 5/1998 | Hamano | 359/677 |
| 5,754,346 A | 5/1998 | Nakayama et al. | 359/687 |
| 5,771,123 A | 6/1998 | Hamano | 359/557 |
| 5,774,275 A | 6/1998 | Hamano | 359/687 |
| 5,818,646 A | 10/1998 | Hamano | 359/684 |
| 5,847,877 A | 12/1998 | Imamura et al. | 359/566 |
| 5,847,882 A | 12/1998 | Nakayama | 359/684 |
| 5,872,658 A * | 2/1999 | Ori | 359/686 |
| 5,905,530 A | 5/1999 | Yokota et al. | 348/240 |
| 5,933,283 A | 8/1999 | Hamano | 359/687 |
| 5,963,378 A | 10/1999 | Tochigi et al. | 359/687 |

* cited by examiner

SPHERICAL ABERRATION

ASTIGMATISM

DISTORTION (%)

SPHERICAL ABERRATION

ASTIGMATISM

DISTORTION (%)

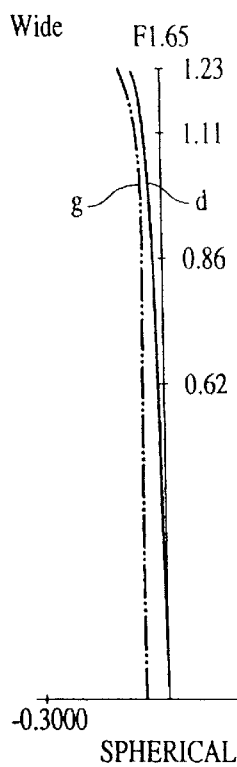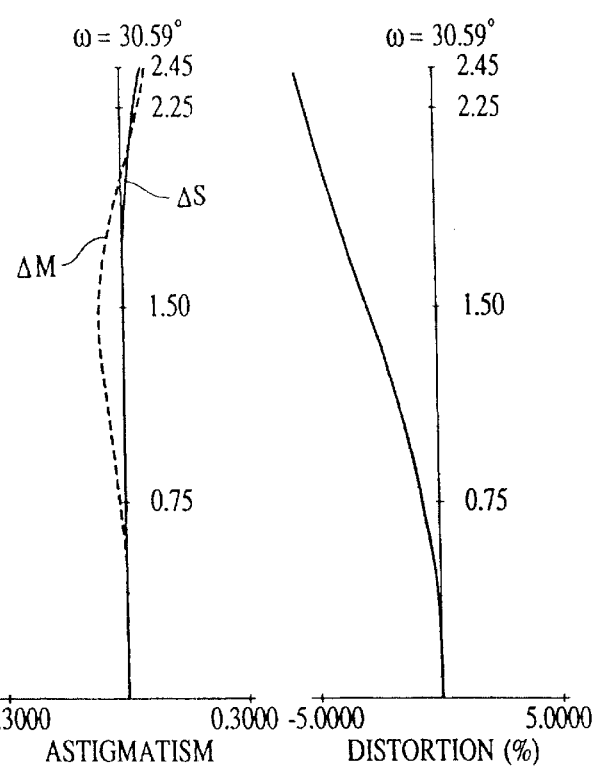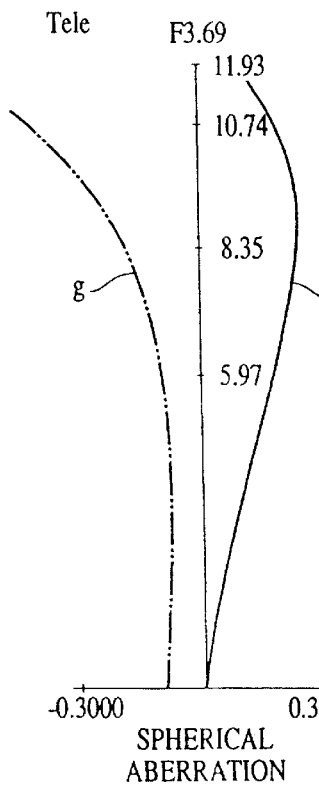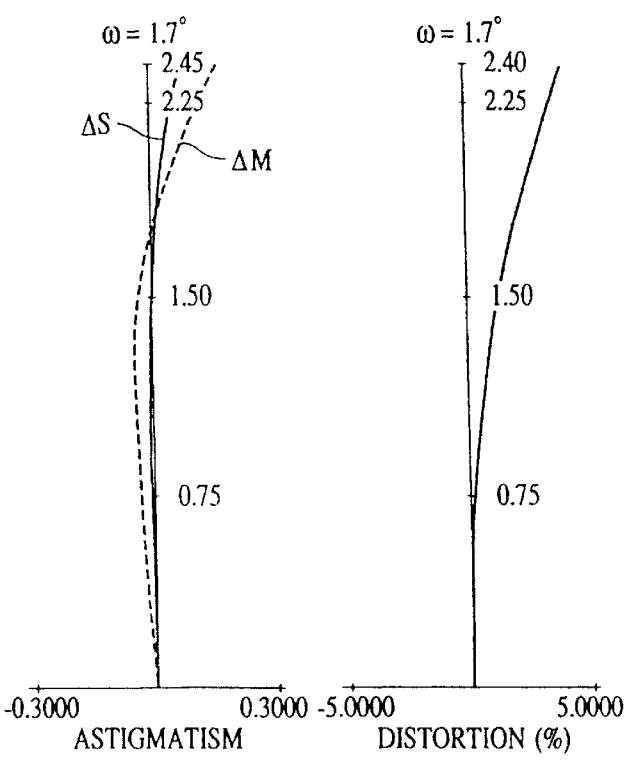
FIG. 11A  FIG. 11B  FIG. 11C
FIG. 11D  FIG. 11E  FIG. 11F

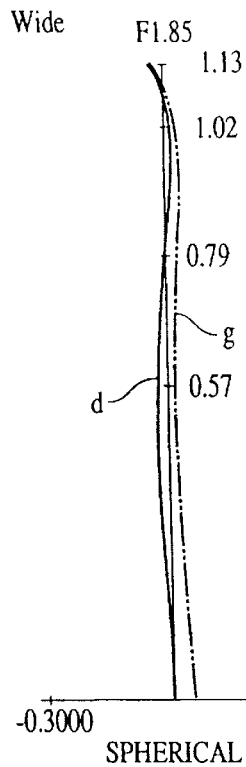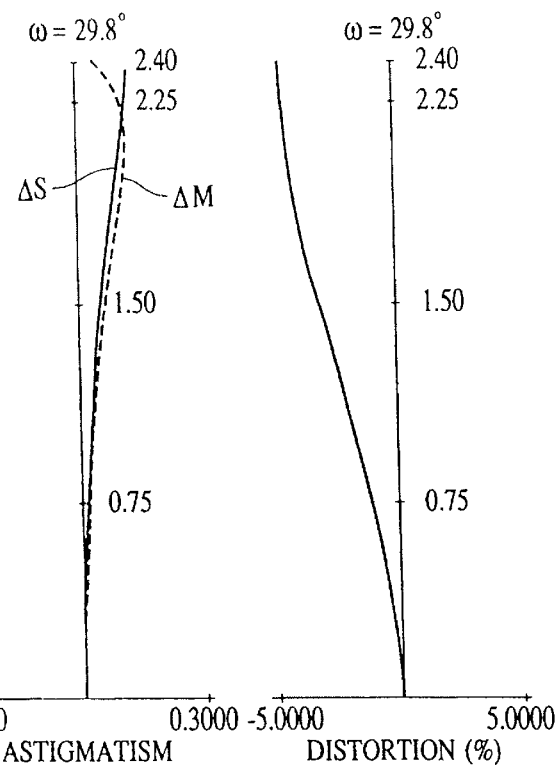
FIG. 15A  FIG. 15B  FIG. 15C
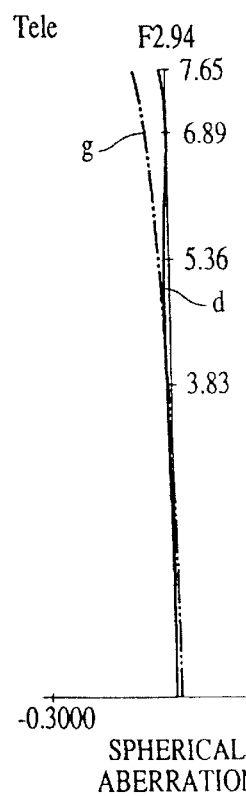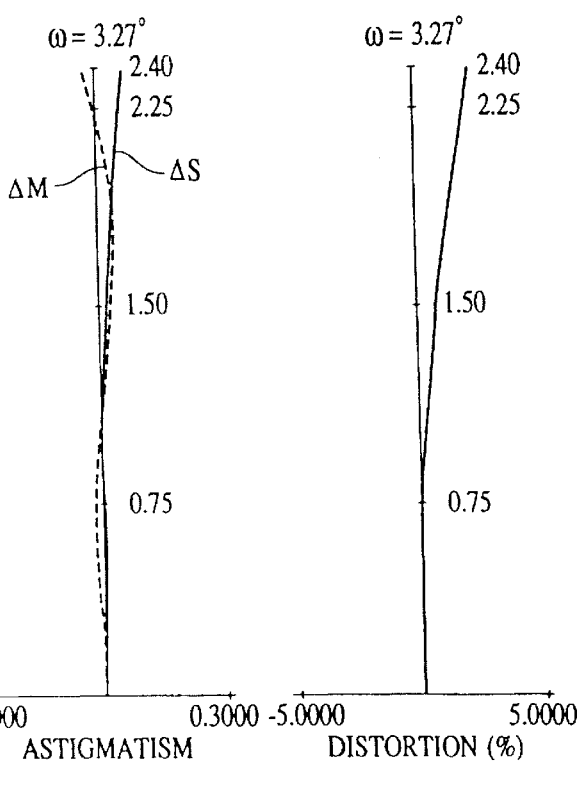
FIG. 15D  FIG. 15E  FIG. 15F

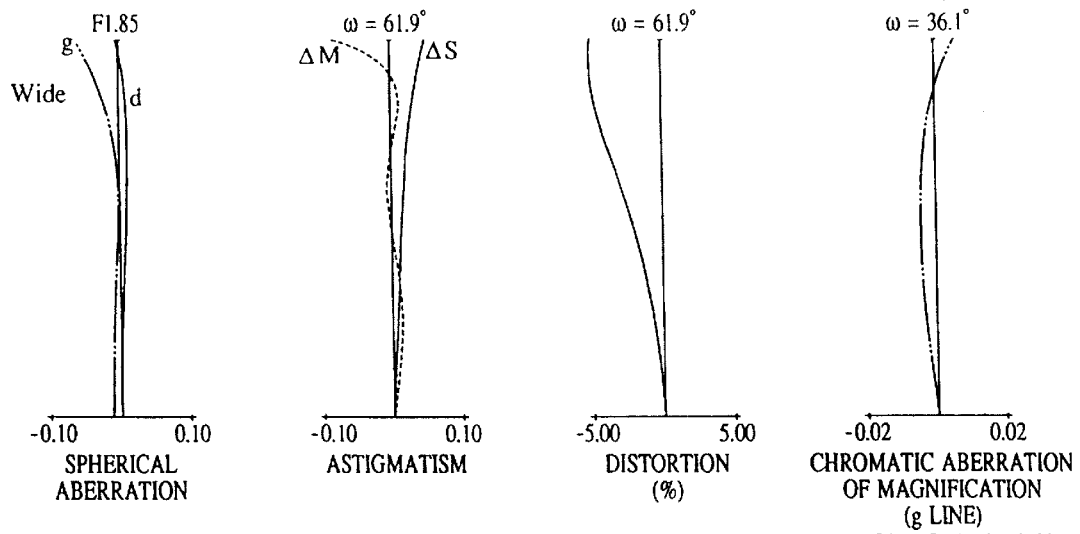
FIG. 31A(1)  FIG. 31A(2)  FIG. 31A(3)  FIG. 31A(4)
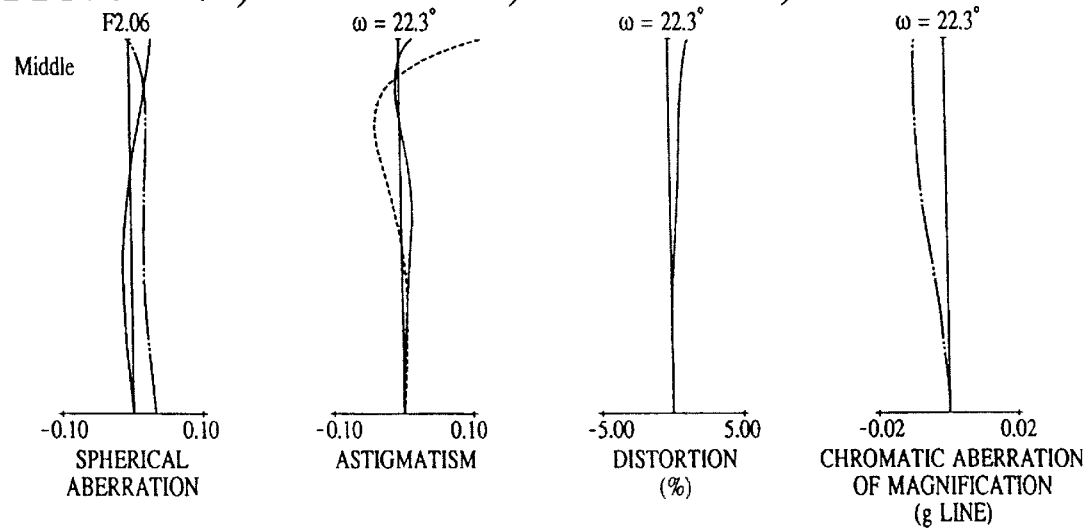
FIG. 31B(1)  FIG. 31B(2)  FIG. 31B(3)  FIG. 31B(4)
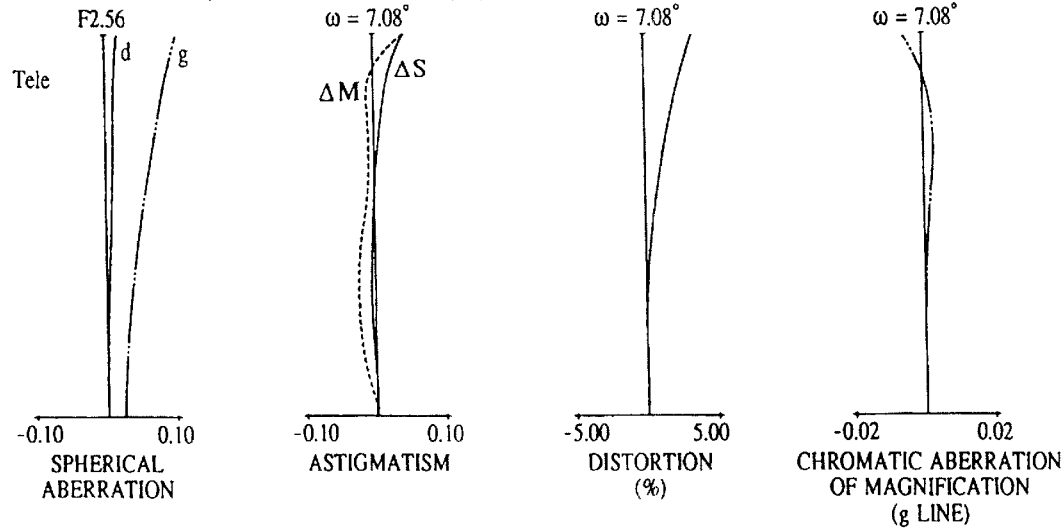
FIG. 31C(1)  FIG. 31C(2)  FIG. 31C(3)  FIG. 31C(4)

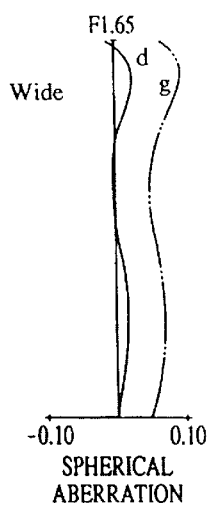 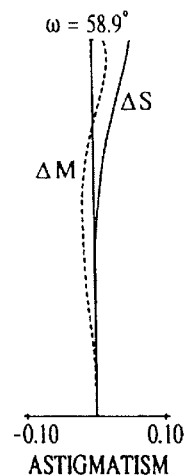 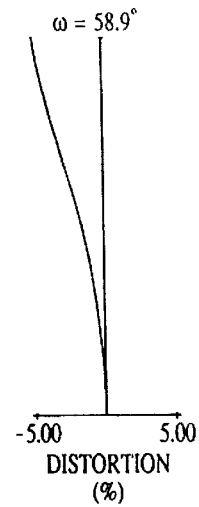 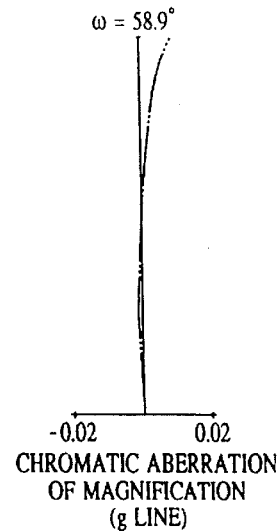
FIG. 32A(1)　　FIG. 32A(2)　　FIG. 32A(3)　　FIG. 32A(4)
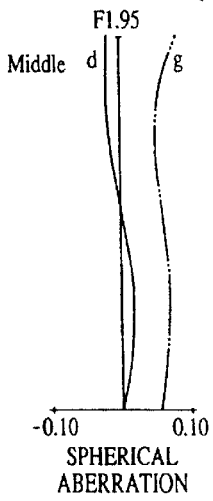 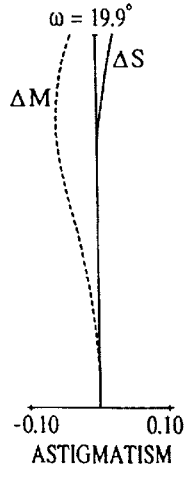 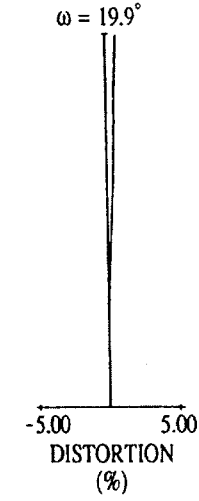 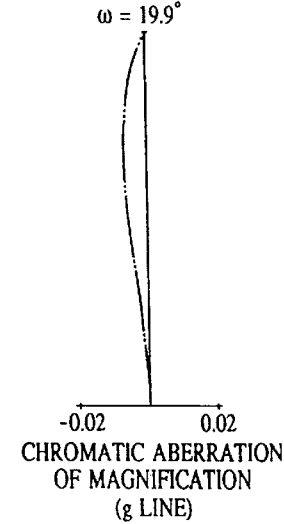
FIG. 32B(1)　　FIG. 32B(2)　　FIG. 32B(3)　　FIG. 32B(4)
 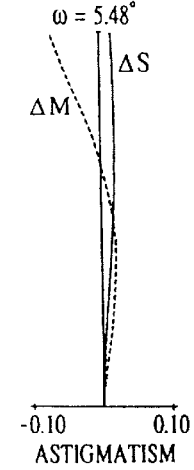 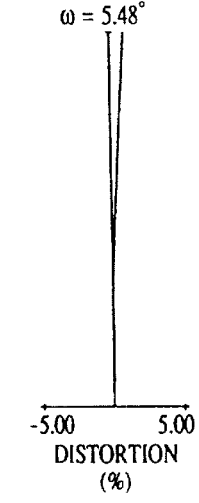 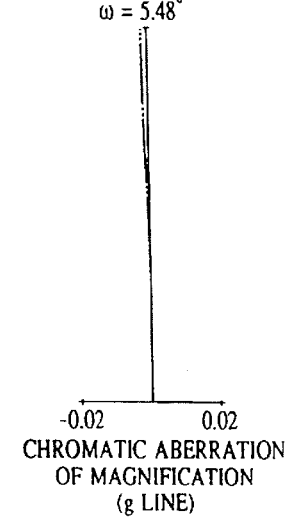
FIG. 32C(1)　　FIG. 32C(2)　　FIG. 32C(3)　　FIG. 32C(4)

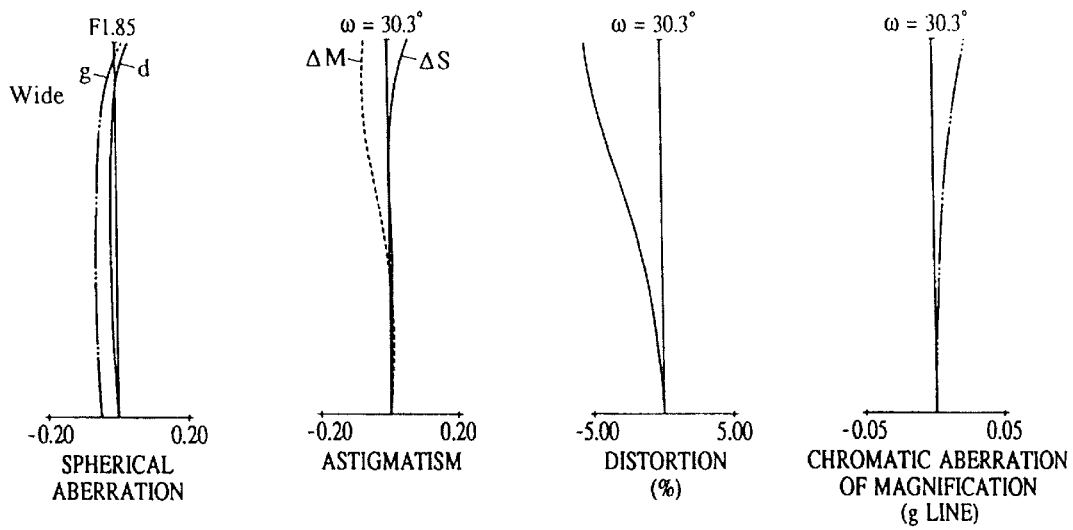
FIG. 33A(1)  FIG. 33A(2)  FIG. 33A(3)  FIG. 33A(4)
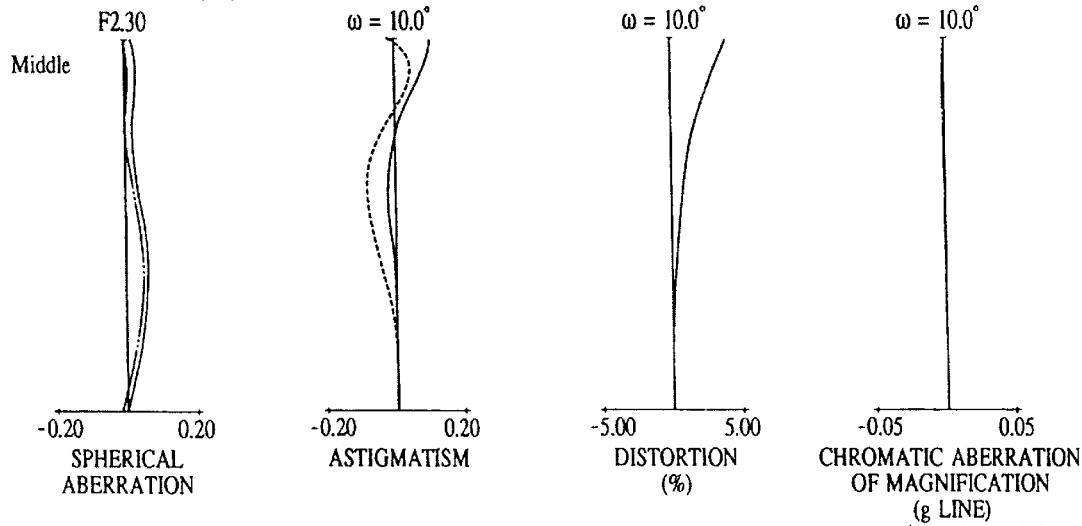
FIG. 33B(1)  FIG. 33B(2)  FIG. 33B(3)  FIG. 33B(4)
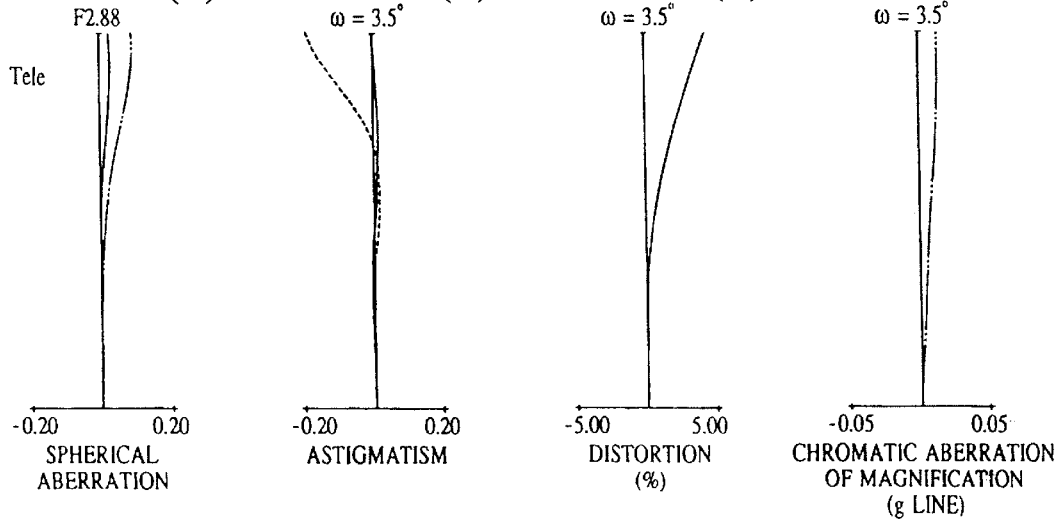
FIG. 33C(1)  FIG. 33C(2)  FIG. 33C(3)  FIG. 33C(4)

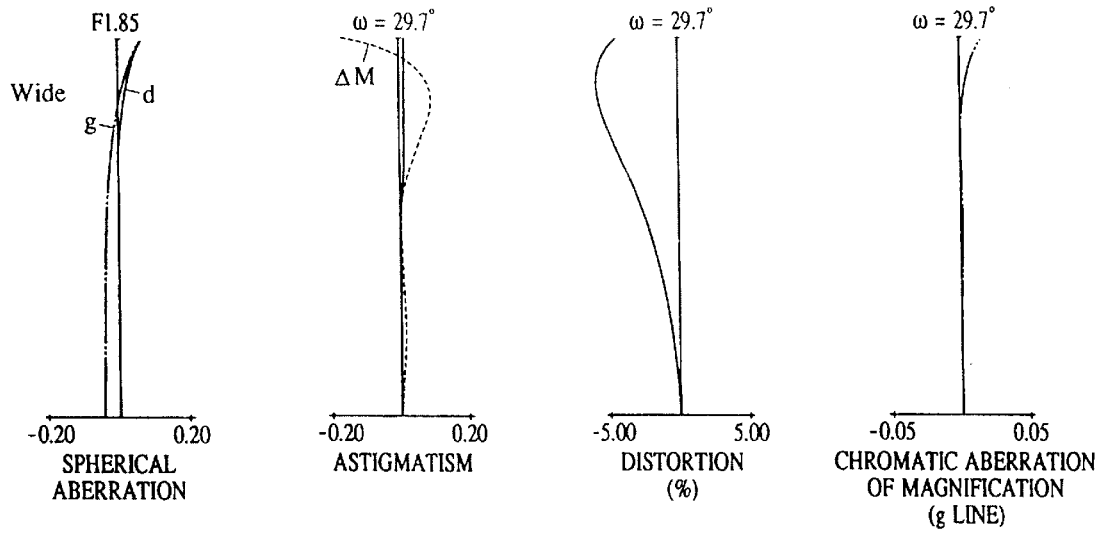
FIG. 34A(1)   FIG. 34A(2)   FIG. 34A(3)   FIG. 34A(4)
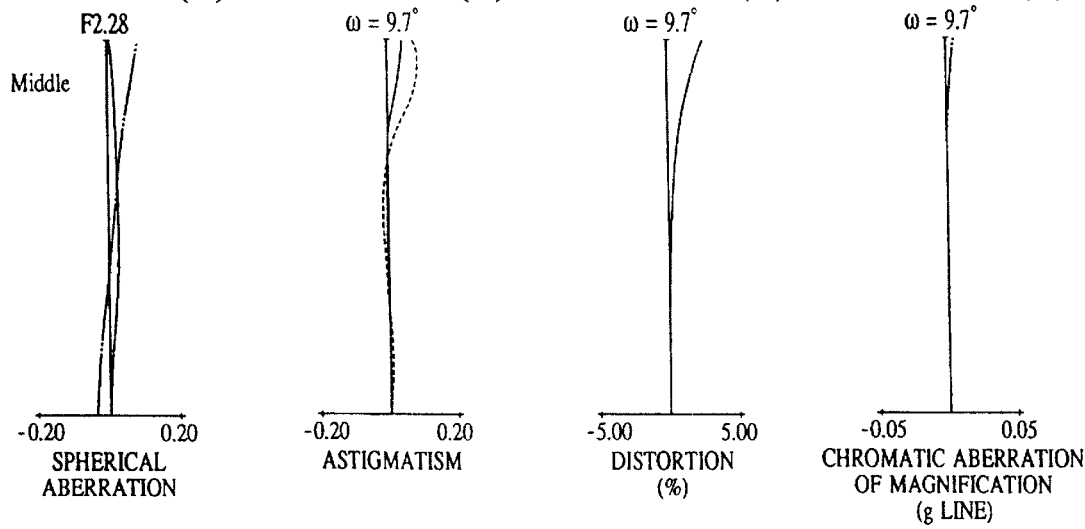
FIG. 34B(1)   FIG. 34B(2)   FIG. 34B(3)   FIG. 34B(4)
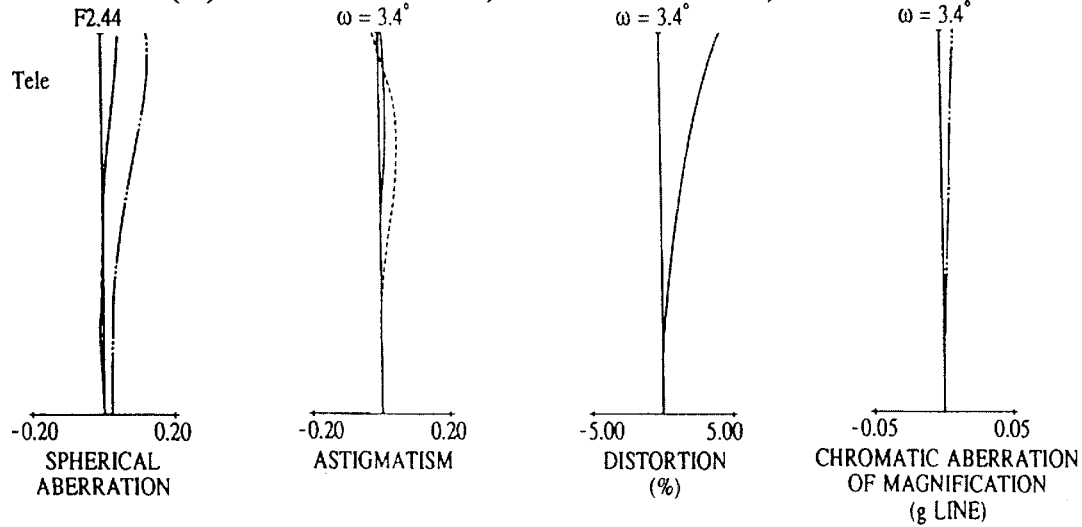
FIG. 34C(1)   FIG. 34C(2)   FIG. 34C(3)   FIG. 34C(4)

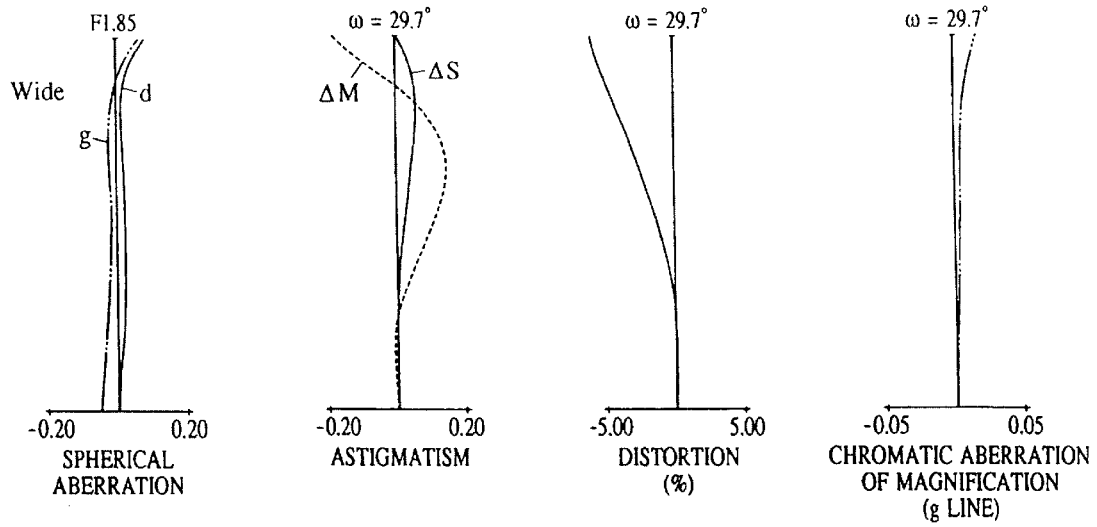
FIG. 35A(1)  FIG. 35A(2)  FIG. 35A(3)  FIG. 35A(4)
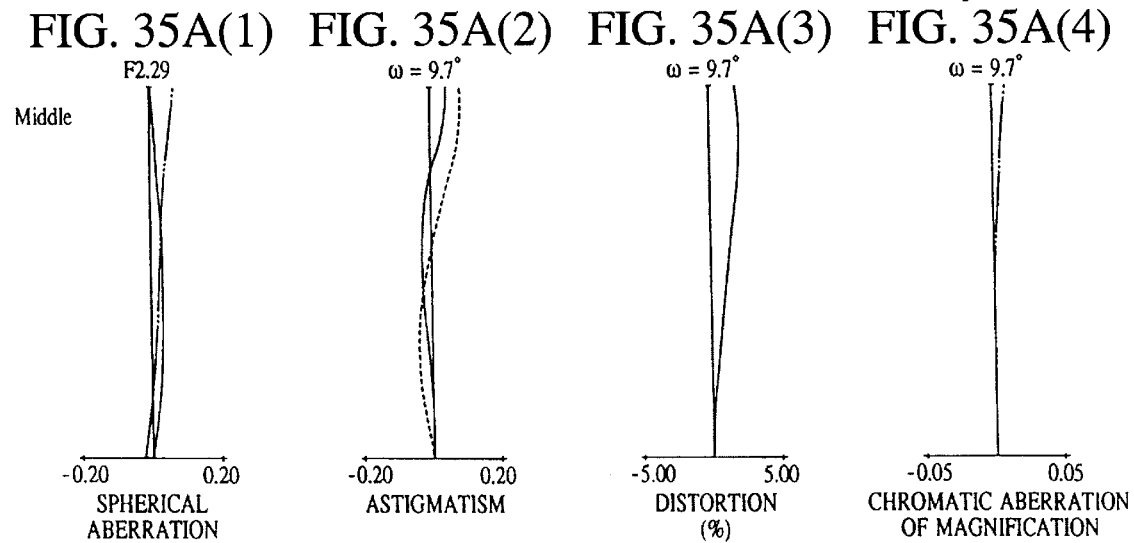
FIG. 35B(1)  FIG. 35B(2)  FIG. 35B(3)  FIG. 35B(4)
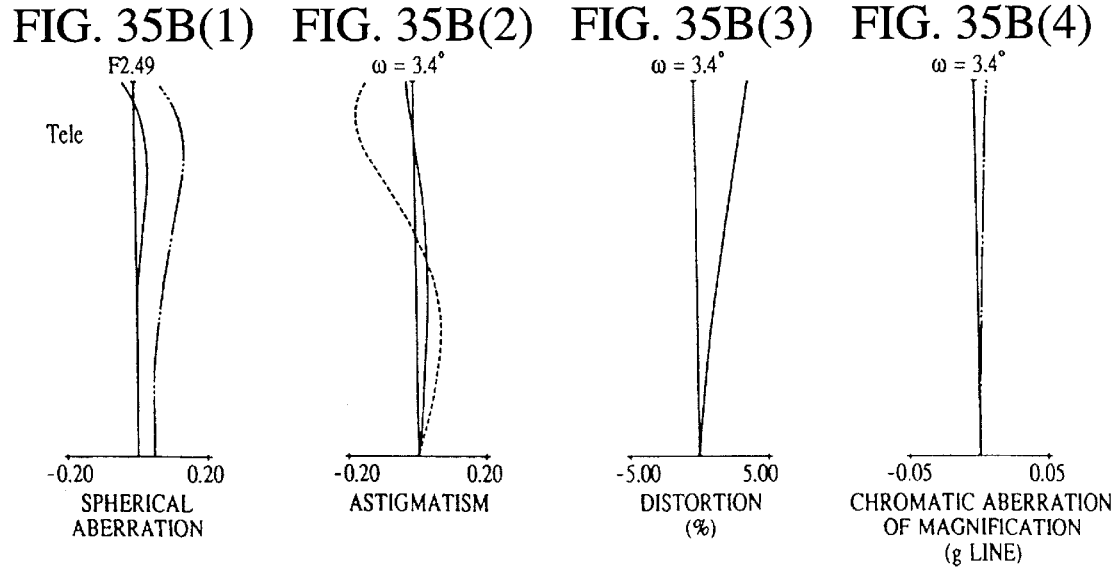
FIG. 35C(1)  FIG. 35C(2)  FIG. 35C(3)  FIG. 35C(4)

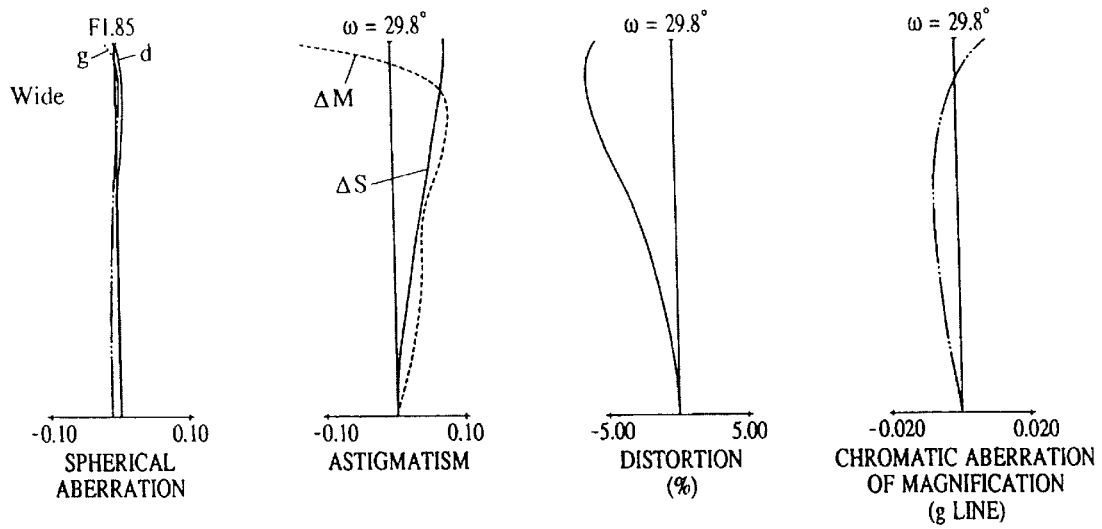
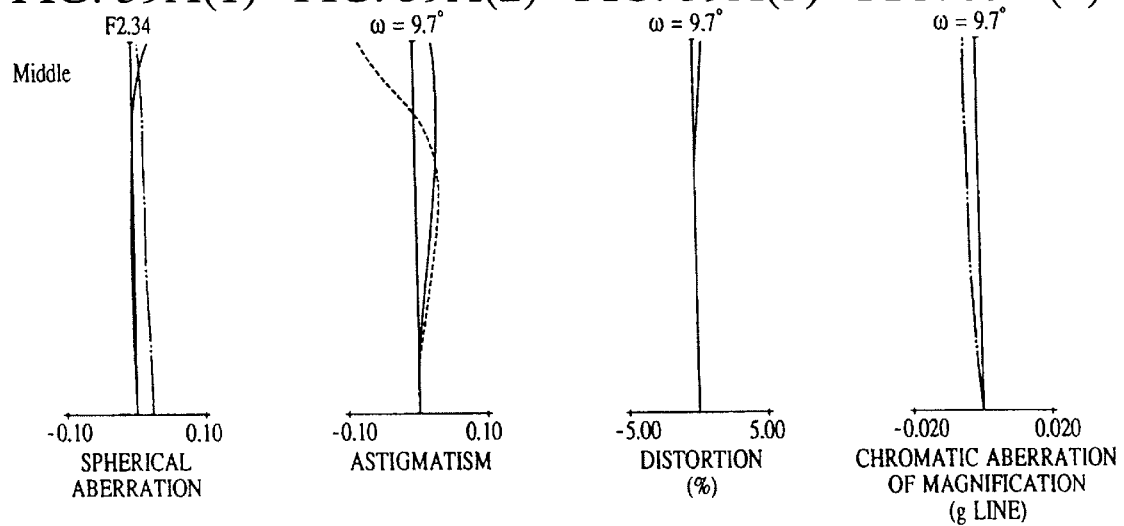
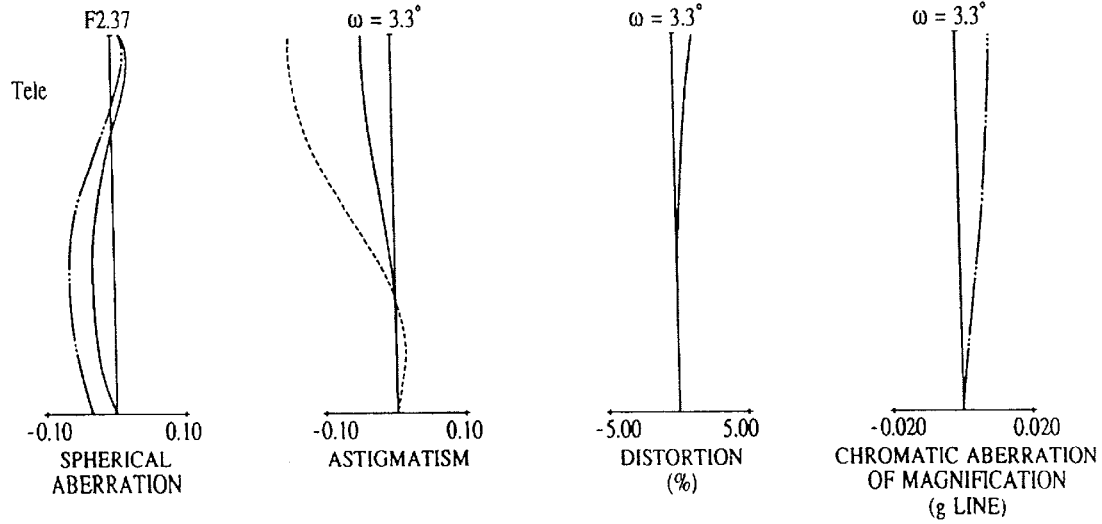

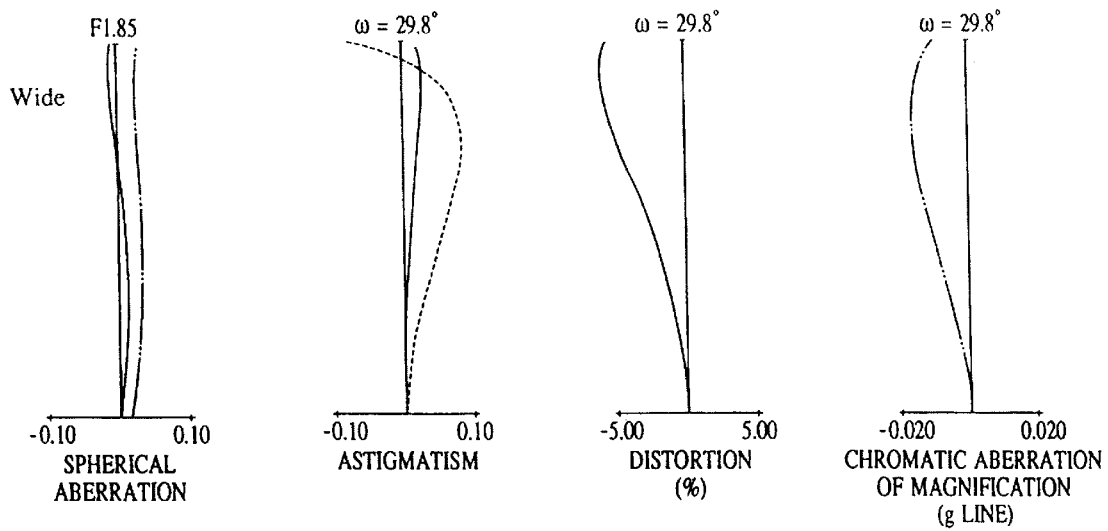
FIG. 40A(1)  FIG. 40A(2)  FIG. 40A(3)  FIG. 40A(4)
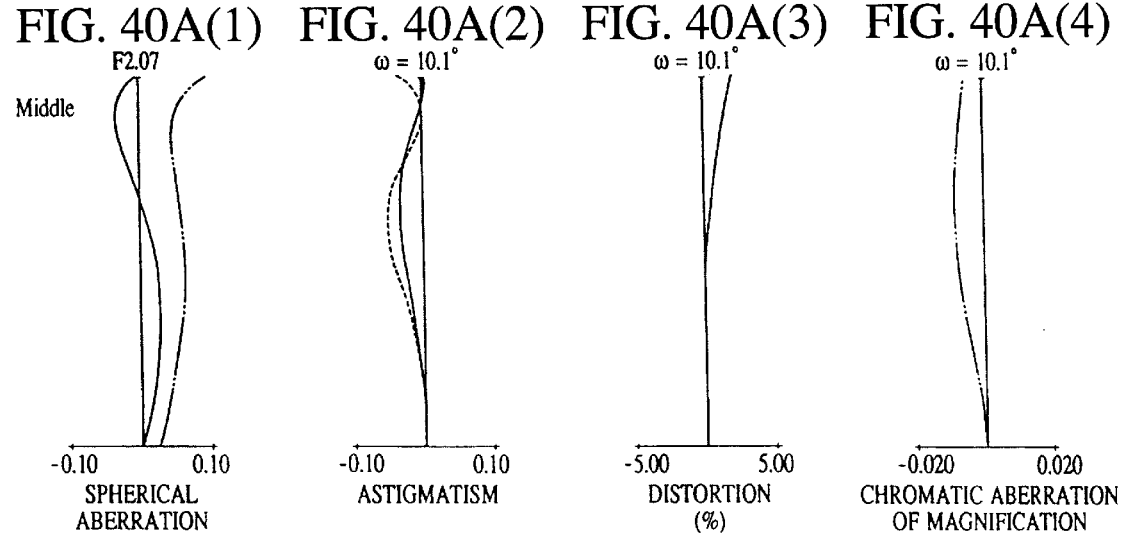
FIG. 40B(1)  FIG. 40B(2)  FIG. 40B(3)  FIG. 40B(4)
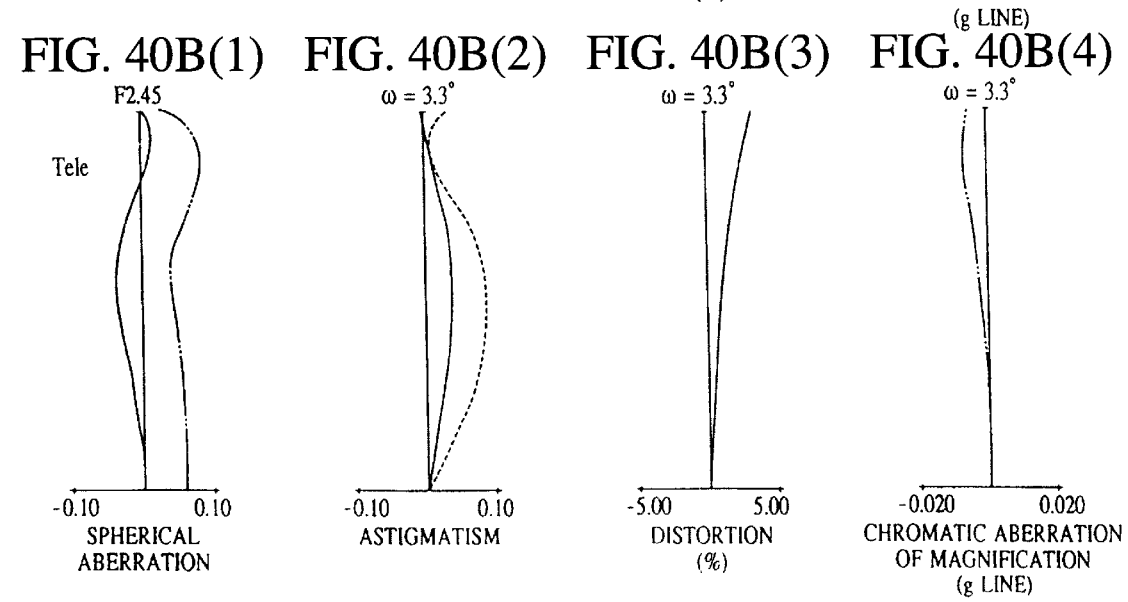
FIG. 40C(1)  FIG. 40C(2)  FIG. 40C(3)  FIG. 40C(4)

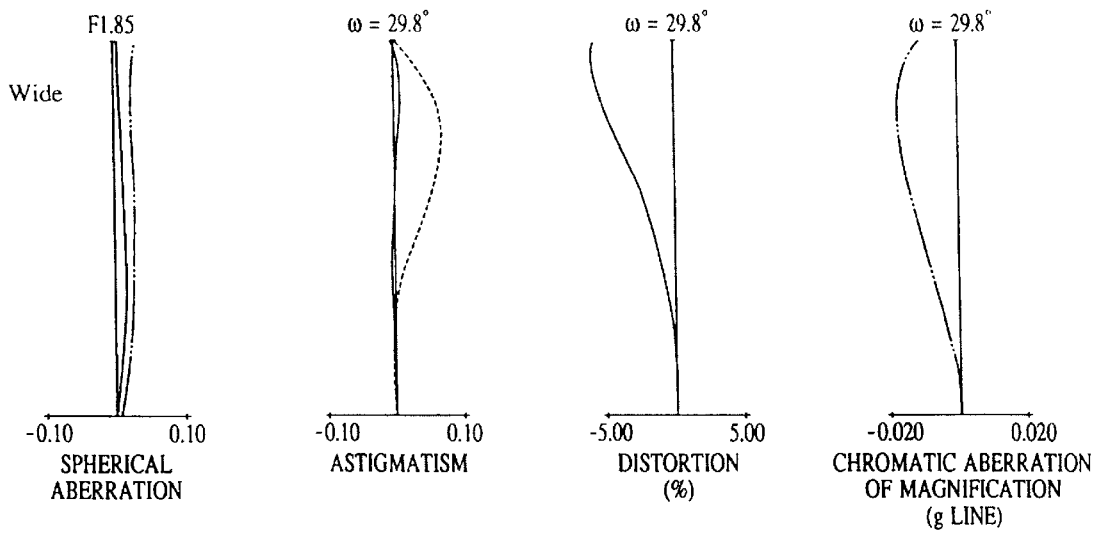
FIG. 41A(1)  FIG. 41A(2)  FIG. 41A(3)  FIG. 41A(4)
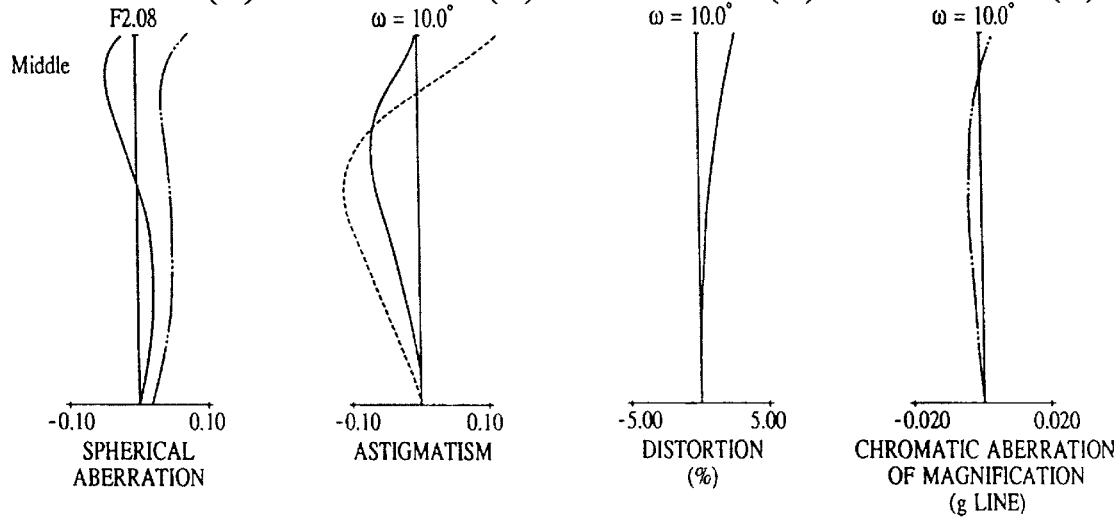
FIG. 41B(1)  FIG. 41B(2)  FIG. 41B(3)  FIG. 41B(4)
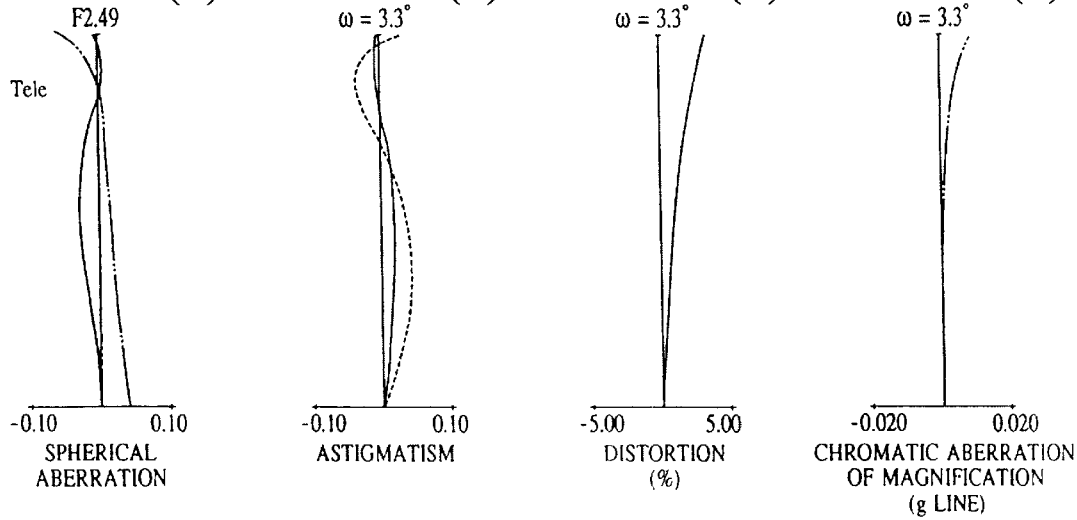
FIG. 41C(1)  FIG. 41C(2)  FIG. 41C(3)  FIG. 41C(4)

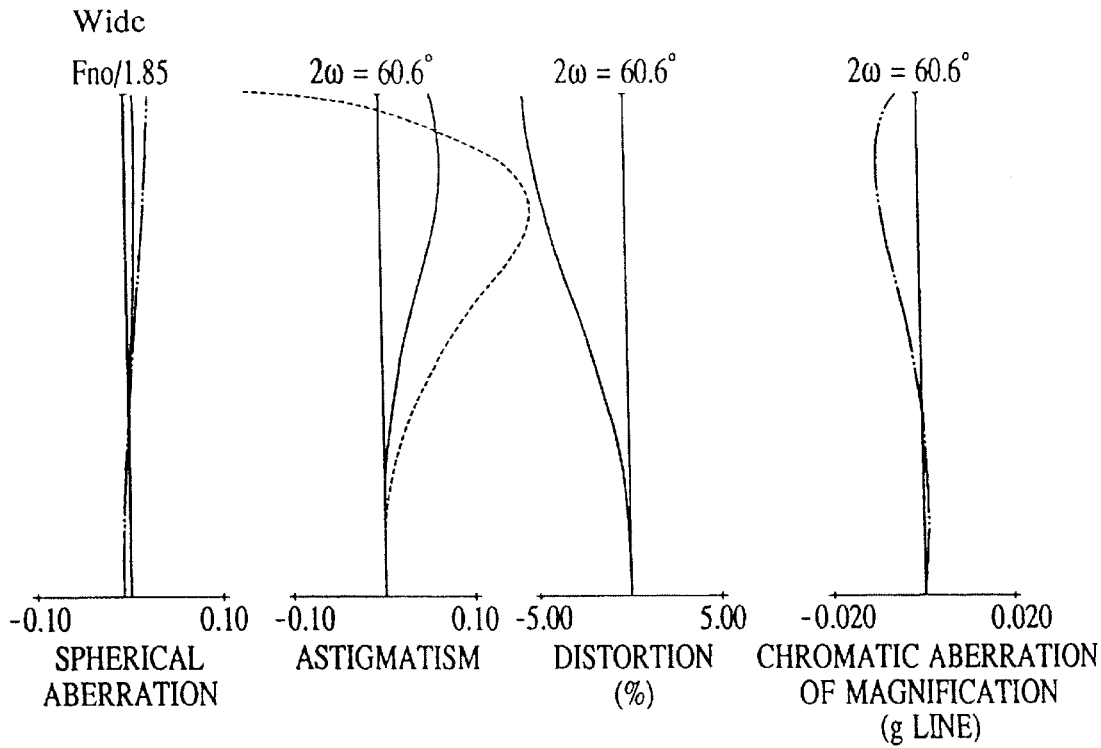
FIG. 44A(1)　FIG. 44A(2)　FIG. 44A(3)　FIG. 44A(4)
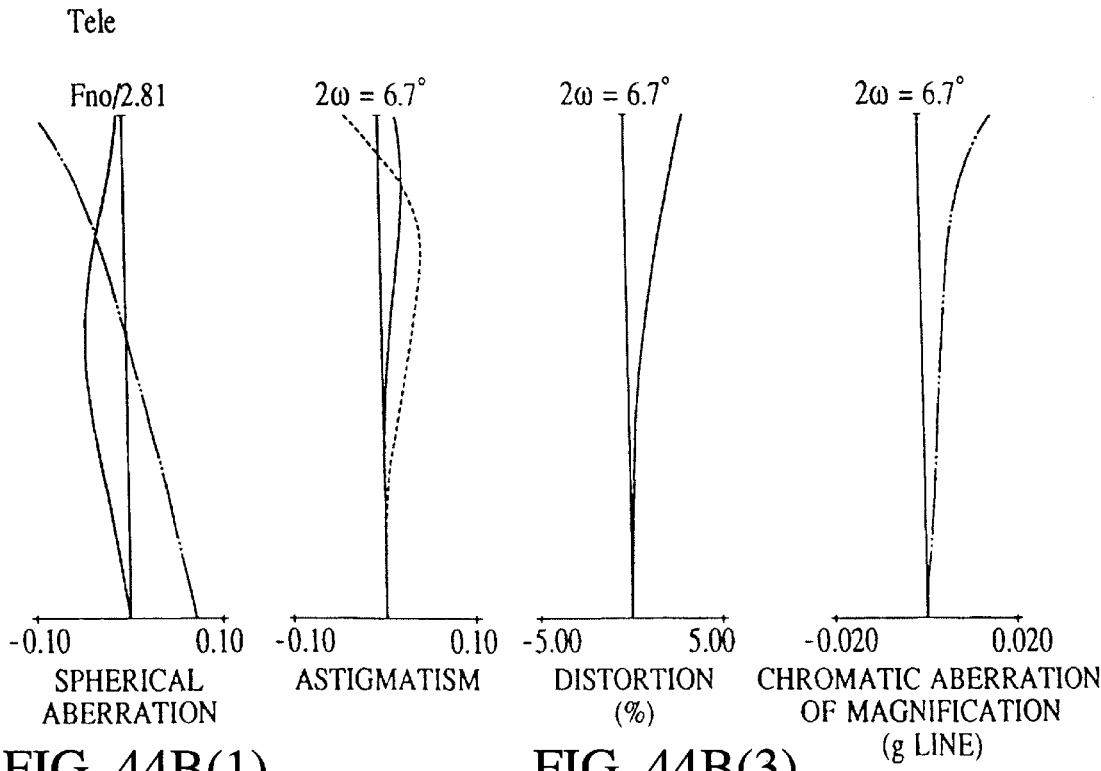
FIG. 44B(1)　FIG. 44B(2)　FIG. 44B(3)　FIG. 44B(4)

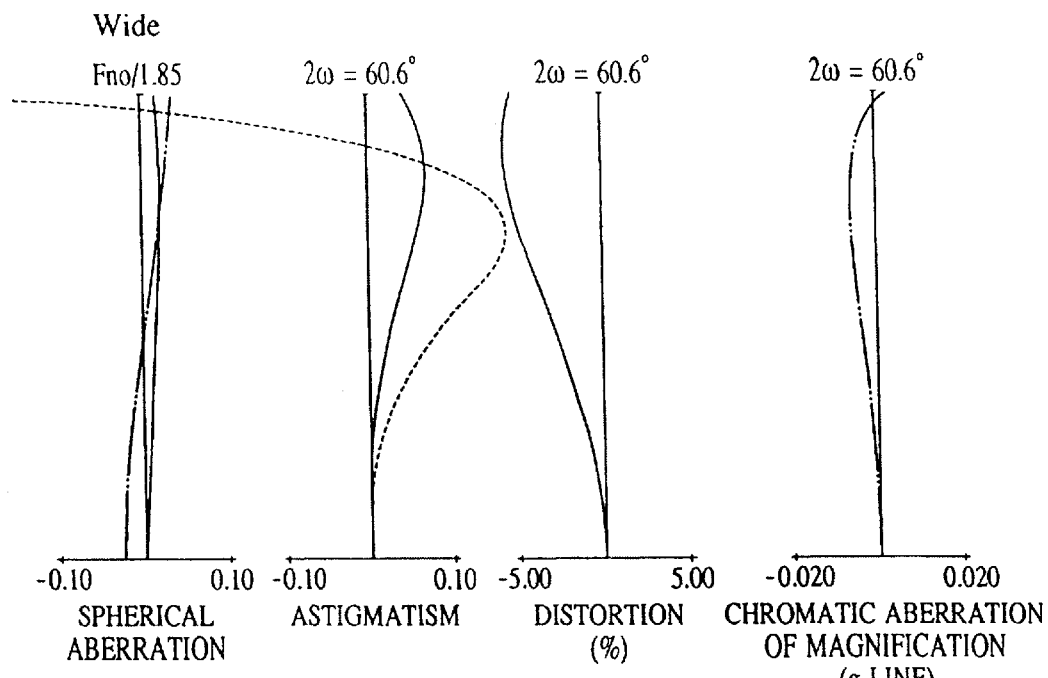
FIG. 45A(1) FIG. 45A(2) FIG. 45A(3) FIG. 45A(4)
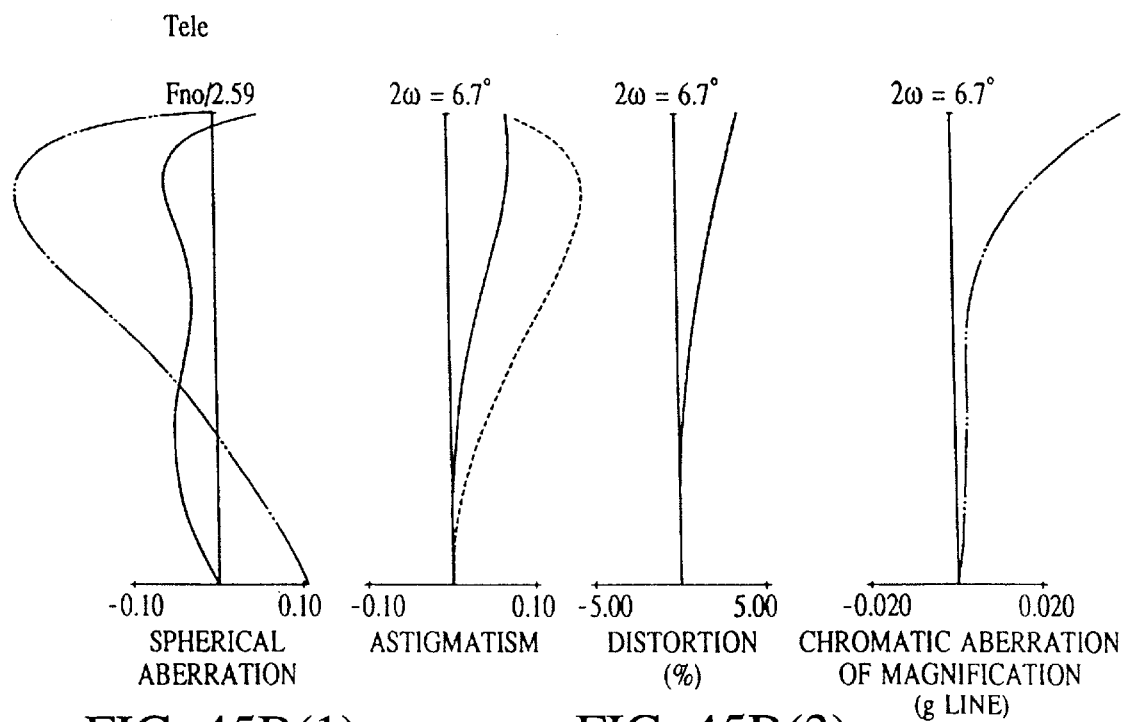
FIG. 45B(1) FIG. 45B(2) FIG. 45B(3) FIG. 45B(4)

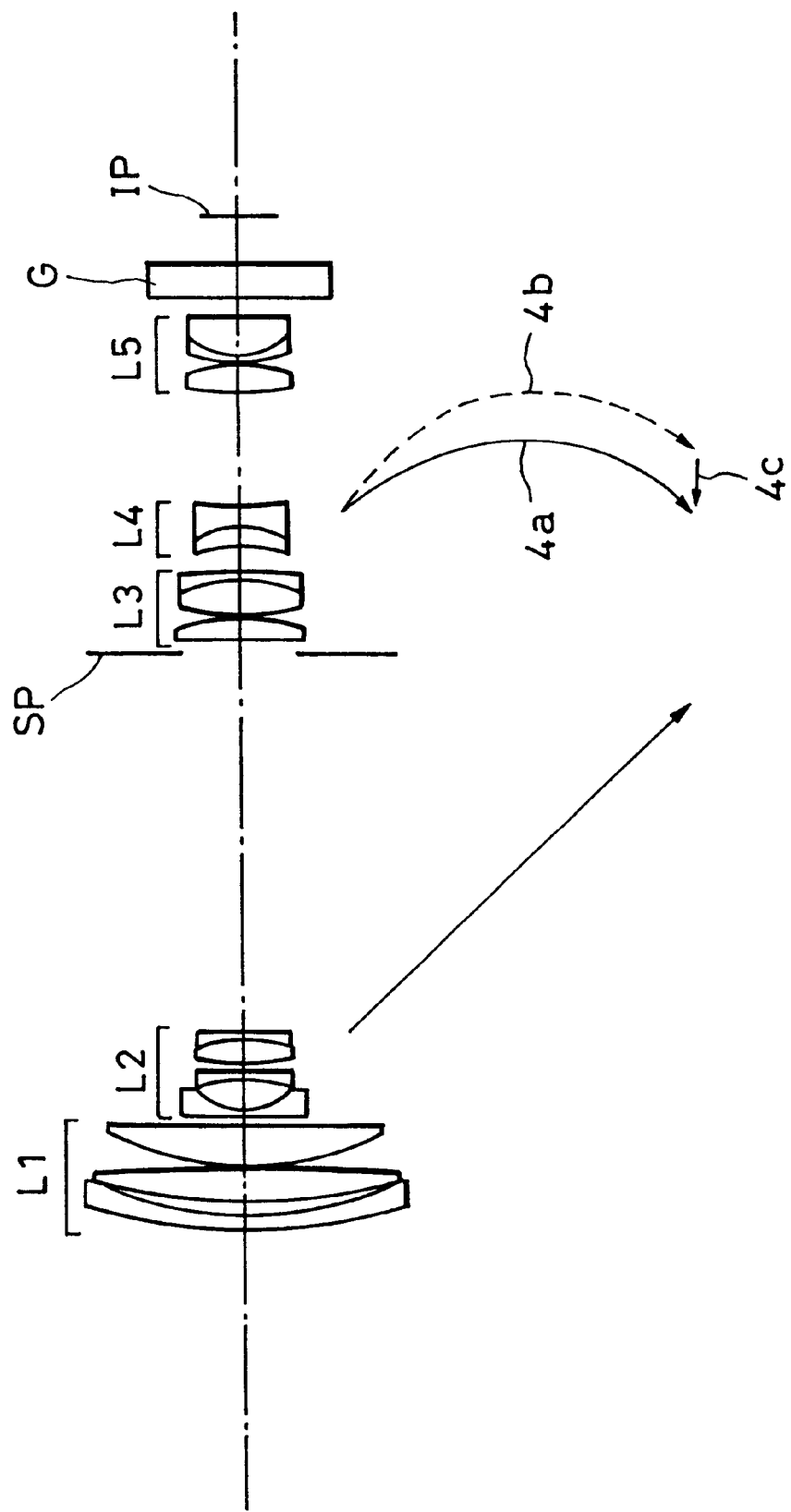

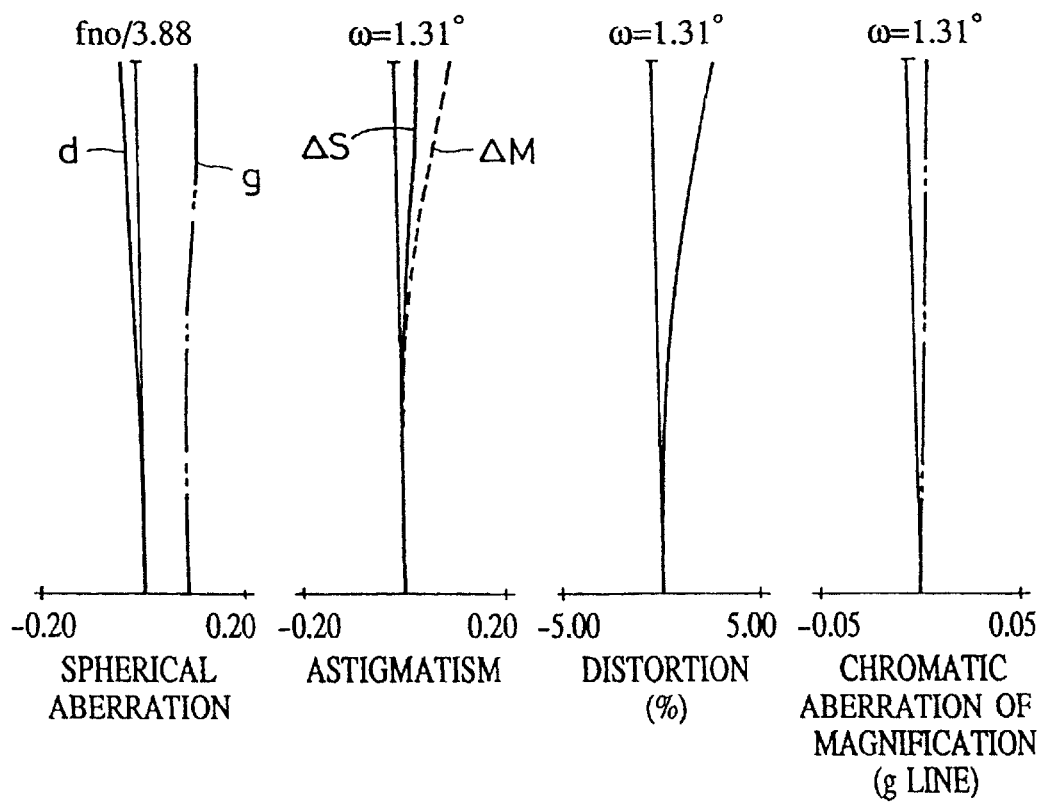

ZOOM LENS DEVICE AND OPTICAL APPARATUS PROVIDED WITH THE SAME

This application is a continuation-in-part of application Ser. No. 08/931,518 filed Sep. 16, 1997 now abandoned.

BACKGROUND OF THE INVENTION

1. Field of the Invention

The present invention relates to a zoom lens device suitable for use in a silver salt camera, a digital camera, a video camera, or the like, and an optical apparatus provided with the zoom lens device.

2. Description of the Related Art

Smaller and lighter home video cameras or the like have caused imaging zoom lens devices to be greatly reduced in size. In recent years, energy has been particularly put into, for example, shortening the length of the entire zoom lens device, reducing the diameter of the front lens, and simplifying the structure of the optical system.

The so-called rear focusing type zoom lens device which performs focusing by moving a lens unit other than the first lens unit at an object side is known as a means for attaining these objects. In general, compared to the zoom lens device which performs focusing by moving the first lens unit, the rear focusing type zoom lens device can have its first lens unit formed into a smaller effective diameter, thus facilitating reduction of the overall size of the lens system.

Such rear focusing type zoom lens devices, disclosed, for example, in Japanese Patent Laid-Open Nos. 62-24213 and 62-247316, comprise in order of lens units from the object side, a positive first lens unit, a negative second lens unit, a positive third lens unit, and a positive fourth lens unit. The second lens unit is moved to change the magnification, and the fourth lens unit is used for correcting changes in the image plane occurring as the magnification changes and for focusing.

On the other hand, there is an increasing need for a zoom lens device that can achieve magnification changes of more than 10. In order to achieve high magnification changes, while minimizing aberrations, however, it is necessary to use a large number of lenses for each of the lens units to cause each of the lens units to play a smaller part in correcting aberrations. Using a larger number of lenses for each of the lens units obviously increases the overall size of the zoom lens device. Therefore, in this case the zoom lens device cannot be reduced in size and at the same time made to attain high magnification changes.

Size reduction and a high magnification change can both be achieved by a known conventional method in which a surface of a lens of the zoom lens device is formed into an aspherical surface. However, when the magnification change is high at more than 10, it becomes difficult to correct chromatic aberration of a lens with an aspherical surface.

Proper correction of chromatic aberration and size reduction of the zoom lens device can be achieved by another known method which uses a diffraction optical element. Such a method is disclosed, for example, in U.S. Pat. No. 5,268,790. In this method, a diffraction optical element is used in the second lens unit, being a variator, and/or the third lens unit being a compensator.

SUMMARY OF THE INVENTION

Accordingly, it is an object of the present invention to provide a zoom lens device reduced in size and constructed in a way unknown in the prior art to achieve a high magnification change and to allow chromatic aberration to be properly corrected.

To this end, in a preferred form of the present invention, there is provided a zoom lens device in which a lens unit which is stationary when the magnification is being changed includes a diffraction optical element.

In the zoom lens device of the preferred form of the present invention, when the lens unit which is stationary during magnification changes is the lens unit closest to the object side, the diffraction optical element has a diffraction optical surface at the image plane side.

In another preferred form of the present invention, there is provided a zoom lens device having an overall positive refractive power and comprising in order of lenses from a long conjugate side, at least a first lens unit, a second lens unit, and a third lens unit. During zooming, the size of the image is changed by moving the second lens unit, and changes in the image plane occurring as the magnification changes is corrected by moving at least one of the lens units among the third lens unit and onwards. The first lens unit includes a diffraction optical element.

In still another preferred form of the present invention, there is provided a zoom lens device comprising in order of lens units from a long conjugate side, at least a first lens unit, a second lens unit, a third lens unit which is stationary during zooming, and a fourth lens unit. The size of an image is changed by moving the second lens unit, and changes in an image plane occurring as the magnification changes is corrected by moving at least one of the lens units among the fourth lens unit and onwards. The second lens unit includes a diffraction optical element.

In still another preferred form of the present invention, there is provided a zoom lens device comprising in order of lens units from a long conjugate side, at least a first lens unit, a second lens unit, a third lens unit which is stationary during zooming, and a fourth lens unit. The size of an image is changed by moving the second lens unit, and changes in an image plane occurring as the magnification changes is corrected by moving at least one of the lens units among the fourth lens unit and onwards. The third lens unit includes a diffraction optical element.

BRIEF DESCRIPTION OF THE DRAWINGS

FIGS. 11A–11F illustrate diagrams showing aberrations at a wide angle end and at a telephoto end of the zoom lens device of Numerical Example 3 in accordance with the present invention.

FIGS. 15A–15F illustrate diagrams showing aberrations at a wide angle end and at a telephoto end of the zoom lens device of Numerical Example 7 in accordance with the present invention.

FIGS. 31A(1)–31A(4), 31B(1)–31B(4), and 31C(1)–31C(4) illustrate diagrams showing the aberrations of the zoom lens device of Numerical Example 9 in accordance with the present invention.

FIGS. 32A(1)–32A(4), 32B(1)–32B(4), and 32C(1)–32C(4) illustrate diagrams showing the aberrations of the zoom lens device of Numerical Example 10 in accordance with the present invention.

FIGS. 33A(1)–33A(4), 33B(1)–33B(4), and 33C(1)–33C(4) illustrate diagrams showing the aberrations of the zoom lens device of Numerical Example 11 in accordance with the present invention.

FIGS. 34A(1)–34A(4), 34B(1)–34B(4), and 34C(1)–34C(4) illustrate diagrams showing the aberrations of the zoom lens device of Numerical Example 12 in accordance with the present invention.

FIGS. 35A(1)–35A(4), 35B(1)–35B(4), and 35C(1)–35C(4) illustrate diagrams showing the aberrations of the zoom lens device of Numerical Example 13 in accordance with the present invention.

FIGS. 39A(1)–39A(4), 39B(1)–39B(4), and 39C(1)–39C(4) illustrate diagrams showing the aberrations of the zoom lens :device of Numerical Example 14 in accordance with the present invention.

FIGS. 40A(1)–40A(4), 40B(1)–40B(4), and 40C(1)–40C(4) illustrate diagrams showing the aberrations of the zoom lens device of Numerical Example 15 in accordance with the present invention.

FIGS. 41A(1)–41A(4), 41B(1)–41B(4), and 41C(1)–41C(4) illustrate diagrams showing the aberrations of the zoom lens device of Numerical Example 16 in accordance with the present invention.

FIGS. 44A(1)–44(4) and 44B(1)–44B(4) illustrate diagrams showing the aberrations of the zoom lens device of Numerical Example 17 in accordance with the present invention.

FIGS. 45A(1)–45A(4) and 45B(1)–45B(4) illustrate diagrams showing the aberrations of the zoom lens device of Numerical Example 18 in accordance with the present invention.

FIG. 54 is a sectional view of the lens device of Numerical Example 1.

FIGS. 61A through 61D are a diagram showing aberrations of Numerical Example 20 at telephoto end.

DESCRIPTION OF THE PREFERRED EMBODIMENTS

Figure 1:
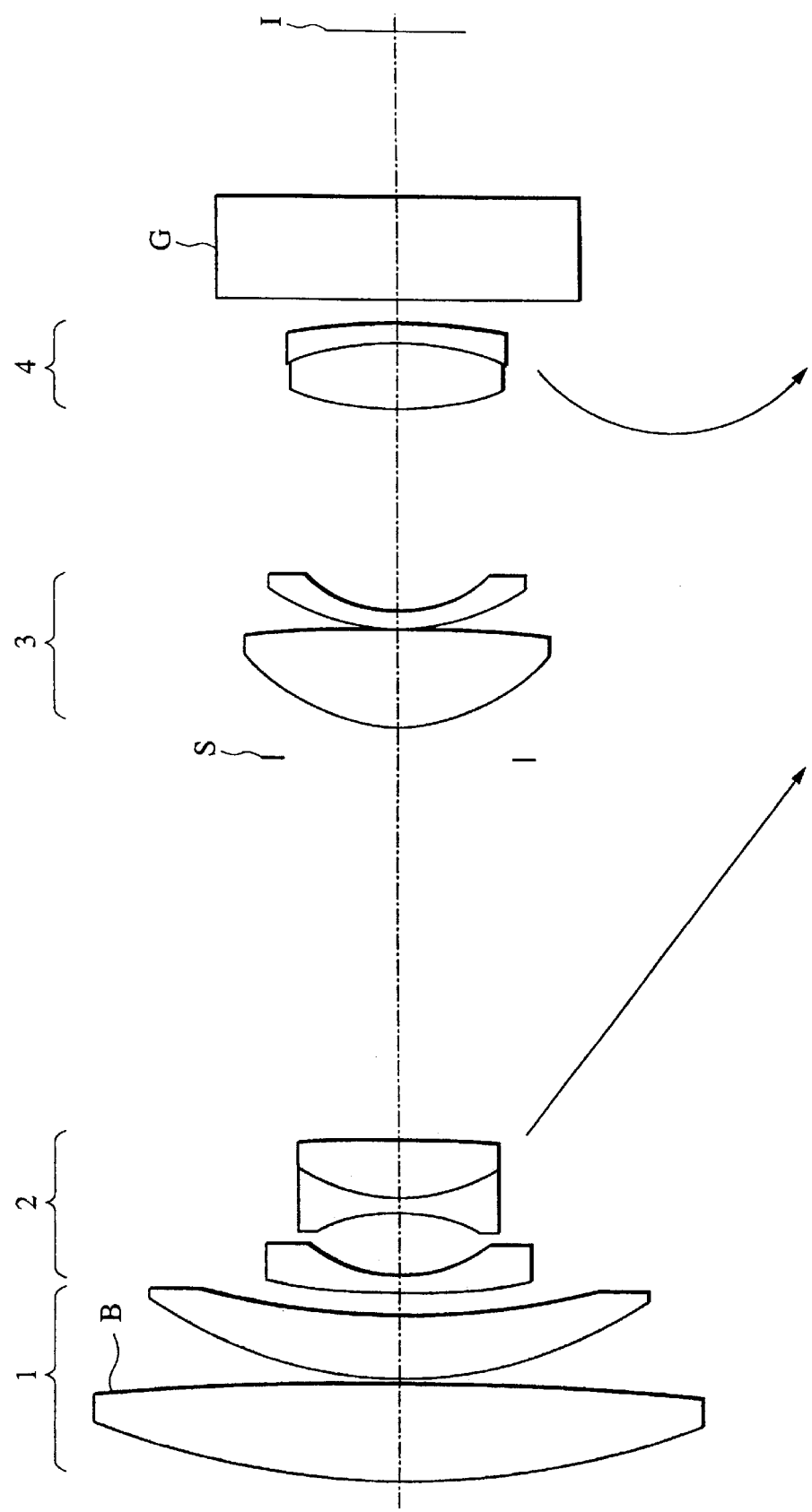
FIG. 1 is a section of a zoom lens device of Numerical Example 1 in accordance with the present invention.

FIGS. 1 to 8 are views showing the zoom lens devices of Numerical Examples 1 to 8. Each figure shows the zoom lens device with its lenses arranged at the wide angle end, with the movements of the lenses from the wide angle end to the telephoto end indicated by arrows FIGS. 9A–9F to 16A–16F illustrate diagrams showing the aberrations at the wide angle end and at the telephoto end of the lens systems of FIGS. 1 to 8, respectively.

In the figures, from an object side (long conjugate side), reference numeral 1 denotes a stationary first lens unit with a positive refractive power, reference numeral 2 denotes a second lens unit used for changing magnification and having a negative refractive power, reference numeral 3 denotes a stationary third lens unit having a positive refractive power, reference numeral 4 denotes a fourth lens unit having a positive or a negative refractive power and used for correcting an image plane that changes as the magnification changes and for focusing, reference numeral 5 denotes a stationary fifth lens unit having a positive refractive power, reference character S denotes a stop, reference character G denotes an optical filter, a face plate, or the like, reference character I denotes an image plane, and reference character B denotes a diffraction optical surface.

In the numerical examples illustrated in FIGS. 1, 2, 4, 5, and 7, the zoom lens devices comprise four lens units. In the numerical examples illustrated in FIGS. 3 and 6, the zoom lens devices comprise five lens units, with the fourth lens units of each having a negative refractive power.

Figure 2:
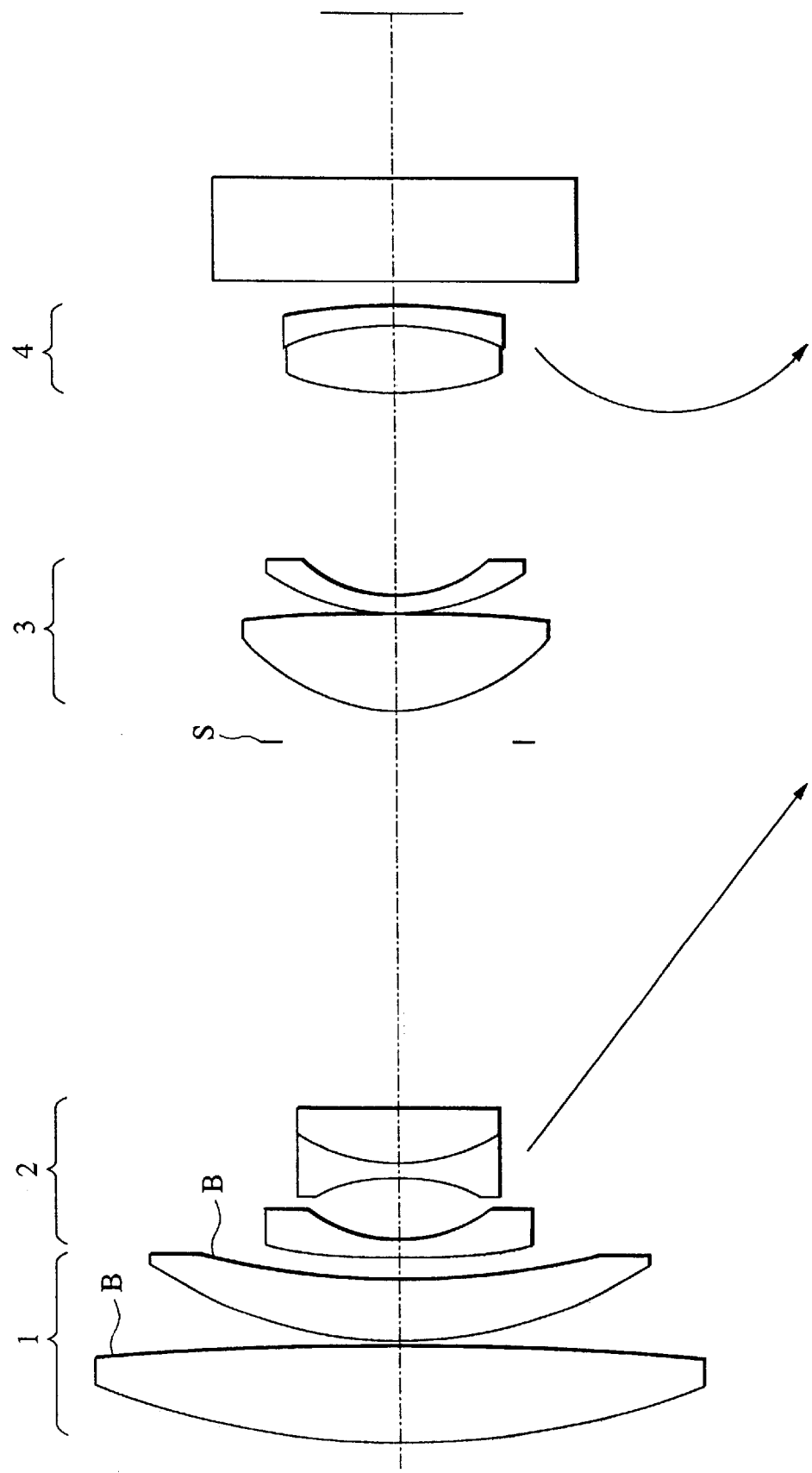
FIG. 2 is a section of a zoom lens device of Numerical Example 2 in accordance with the present invention.
Figure 3:
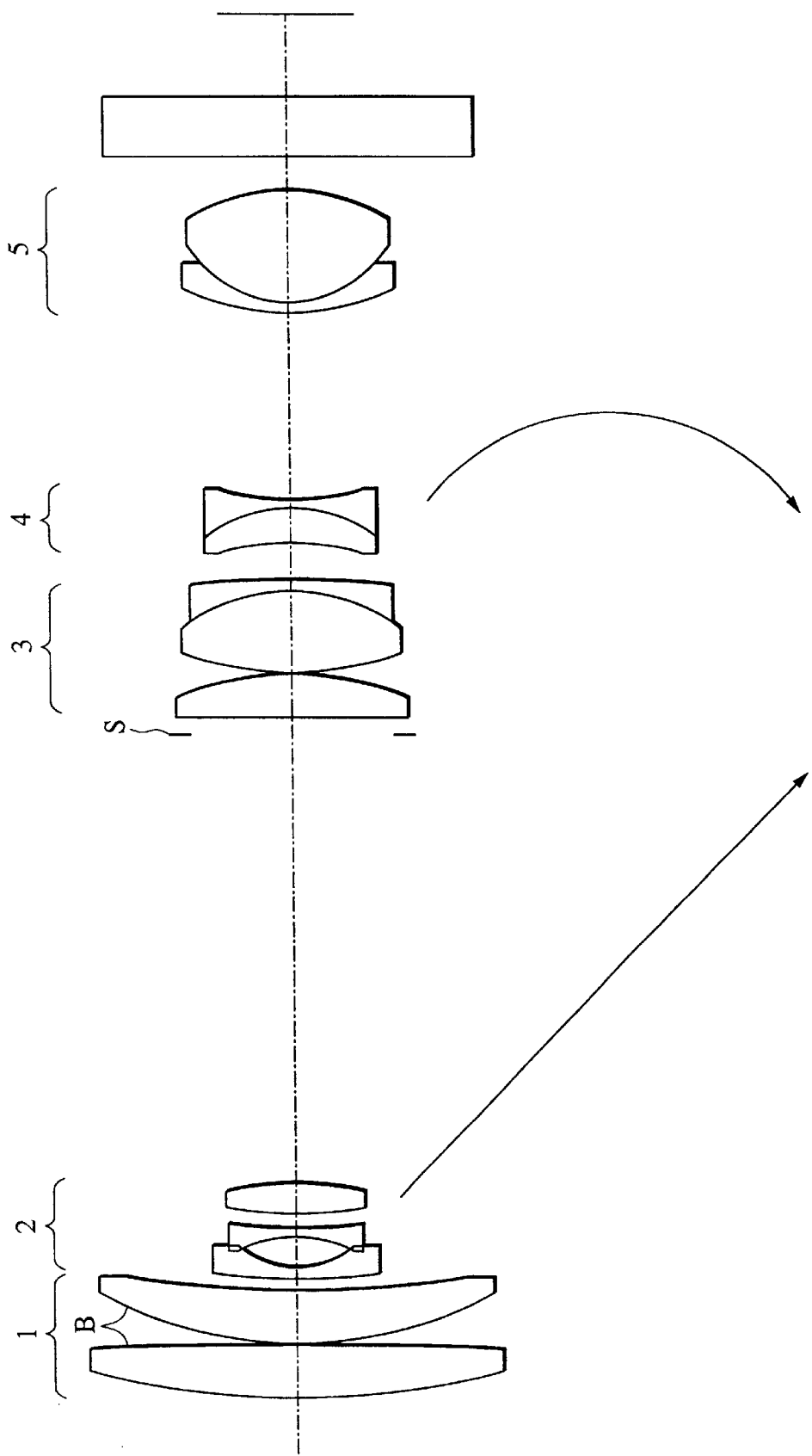
FIG. 3 is a section of a zoom lens device of Numerical Example 3 in accordance with the present invention.
Figure 4:
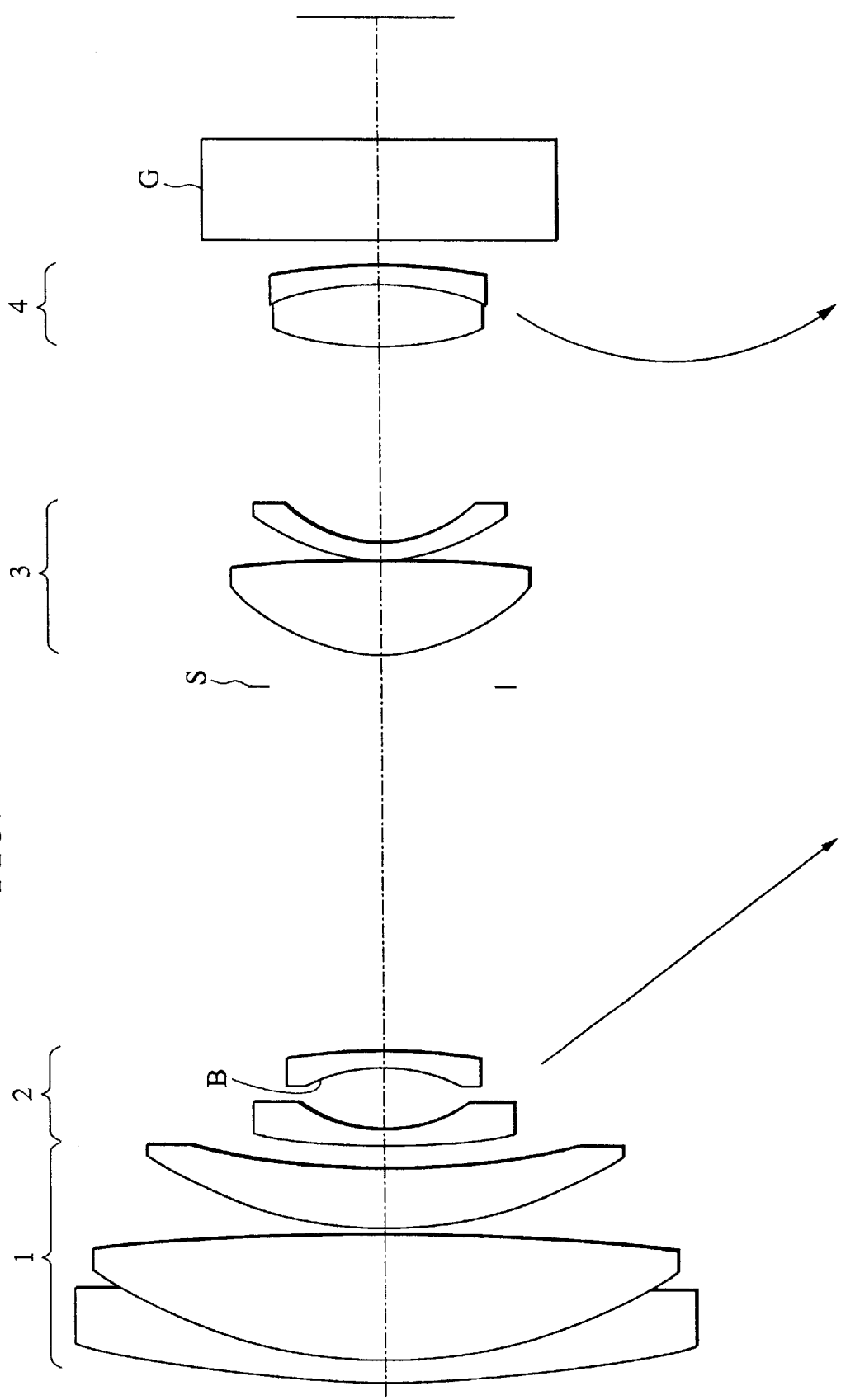
FIG. 4 is a section of a zoom lens device of Numerical Example 4 in accordance with the present invention.

In the numerical examples of FIGS. 1 to 3 (Group A), a surface of a lens of the stationary first lens unit is formed into a diffraction optical surface. In the numerical examples of FIGS. 4 to 6 (Group B), a surface of a lens of the second lens unit used for changing magnification is formed into a diffraction optical surface. In the numerical examples of FIGS. 7 and 8 (Group C), a surface of a lens of the stationary third lens unit is formed into a diffraction optical surface. In each of the numerical examples, the lens with the diffraction optical surface is the equivalent of a diffraction optical element.

In the zoom lenses of each of the numerical examples, when the phase at the diffraction optical element is given by the following Formula (1):

$$\phi(h) = \frac{2\pi}{\lambda}(C1 \cdot h^2 + C2 \cdot h^4 + C3 \cdot h^6 + \cdots Ci \cdot h^{2i}) \quad (1)$$

where $\lambda$ is the wavelength of an incident light ray, $Ci$ is a coefficient representing the phase, and $h$ is the height measured from an optical axis, it is preferable that the following Condition (2) be satisfied:

$$\Psi i \cdot C1 < 0 \quad (2)$$

where $\Psi i$ is the refractive power of the lens unit containing the diffraction optical element.

In particular, when the refractive power due to the curvature of the diffraction optical surface is $\psi i$, it is preferable that the following Condition (3) be satisfied:

$$\psi i \cdot C1 < 0 \quad (3)$$

In Formula (1), it is preferable that the zoom lens devices of the Group A numerical examples satisfy the following Conditions (4a) and (5a):

$$1 \times 10^{-4} < |C2/C1| < 1 \times 10^{-1} \quad (4a)$$

$$1 \times 10^{-7} < |C3/C1| < 1 \times 10^{-4} \quad (5a)$$

In Formula (1), it is preferable that the zoom lens devices of the Group B numerical examples satisfy the following Conditions (4b) and (5b):

$$1 \times 10^{-4} < |C2/C1| < 1 \times 10^{-1} \quad (4b)$$

$$1 \times 10^{-5} < |C3/C1| < 1 \times 10^{-3} \quad (5b)$$

In Formula (1), it is preferable that the zoom lens devices of the Group C numerical examples satisfy the following Conditions (4c) and (5c):

$$1 \times 10^{-4} < |C2/C1| < 1 \times 10^{-1} \quad (4c)$$

$$1 \times 10^{-5} < |C2/C1| < 1 \times 10^{-2} \quad (5c)$$

In each zoom lens device of the Group A numerical examples, when the focal length of the first lens unit is F1, and the focal length of only the diffraction optical surface is Fbo, it is preferable that the following Condition (6a) be satisfied:

$$0.05 < F1/Fbo < 0.7 \quad (6a)$$

In each zoom lens device of the Group B numerical examples, when the focal length of the second lens unit is F2, and the focal length of only the diffraction optical surface is Fbo, it is preferable that the following Condition (6b) be satisfied:

$$0.1 < |F2/Fbo| < 0.7 \quad (6b)$$

In each zoom lens device of the Group C numerical examples, when the focal length of the third lens unit is F3, and the focal length of only the diffraction optical surface is Fbo, it is preferable that the following Condition (6c) be satisfied:

$$0.05 < F3/Fbo < 0.2 \quad (6b)$$

In each zoom lens device of the Group A numerical examples, when the focal length of the first lens unit is F1, and the focal lengths of the entire lens system at a wide angle end and at a telephoto end are Fw and Ft, respectively, it is preferable that the following Condition (7a) be satisfied:

$$1.0 < F1/\sqrt{Fw \cdot Ft} < 2.5 \quad (7a)$$

In each zoom lens device of the Group B numerical examples, when the focal length of the second lens unit is F2, and the focal lengths of the entire lens system at a wide angle end and at a telephoto end are Fw and Ft, respectively, it is preferable that the following Condition (7b) be satisfied:

$$0.25 < |F2/\sqrt{Fw \cdot Ft}| < 0.45 \quad (7b)$$

In each zoom lens device of the Group C numerical examples, when the focal length of the third lens unit is F3, and the focal lengths of the entire lens system at a wide angle end and at a telephoto end are Fw and Ft, respectively, it is preferable that the following Condition (7c) be satisfied:

$$0.5 < F3/\sqrt{Fw \cdot Ft} < 1.0 \quad (7c)$$

In each zoom lens device of the Group A numerical examples, when there is only one diffraction optical surface, the focal length of the first lens unit is F1, and the curvature of the lens surface formed into the diffraction optical surface is Rbo, it is preferable that the following Condition (8a) be satisfied:

$$|F1/Rbo| < 1.8 \quad (8a)$$

In each zoom lens device of the Group B numerical examples, when there is only one diffraction optical surface, the focal length of the second lens unit is F2, and the curvature of the lens surface formed into the diffraction optical surface is Rbo, it is preferable that the following Condition (8b) be satisfied:

$$|F2/Rbo| < 1.8 \quad (8b)$$

In each zoom lens device of the Group C numerical examples, when there is only one diffraction optical surface, the focal length of the third lens unit is F3, and the curvature of the lens surface formed into the diffraction optical surface is Rbo, it is preferable that the following Condition (8c) be satisfied:

$$|F3/Rbo| < 1.8 \quad (8C)$$

In each zoom lens device of the Group A numerical examples, when the thickness of a portion of the first lens unit on the optical axis is t1, and the focal length of the first lens unit is F1, it is preferable that the following Condition (9a) be satisfied:

$$0.1 < t1/F1 < 0.27 \quad (9a)$$

In each zoom lens device of the Group B numerical examples, when the axial thickness of the second lens unit is t2, and the focal length of the second lens unit is F2, it is preferable that the following Condition (9b) be satisfied:

$$0.05 < |t2/F2| < 0.4 \quad (9b)$$

In each zoom lens device of the Group C numerical examples, when the axial thickness of the third lens unit is t3, and the focal length of the third lens unit is F3, it is preferable that the following Condition (9c) be satisfied:

$$0.1 < t3/F3 < 0.27 \quad (9c)$$

A description will now be given of the aforementioned conditions.

In Condition (2), C1 represents a paraxial refractive power of a diffraction optical surface. When this condition is satisfied, regardless of whether the lens unit containing the diffraction optical element has a positive or a negative refractive power, aberrations can be effectively corrected, since the curvature of each lens making up the lens unit can be made low.

In particular, if the Condition (3) is satisfied, the various aberrations including chromatic aberration can be minimized, thereby greatly making it easier to correct aberrations, since the curvature can be made low, even when a surface having the same refractive power is formed.

The Conditions (4a) to (4c) and (5a) to (5c) are conditions for effectively correcting aberrations in a small diameter zoom lens device such as a video zoom lens device. When these conditions are not satisfied, it not only becomes difficult to correct aberrations, but it also becomes difficult to manufacture the diffraction optical element precisely.

The Conditions (6a) to (6c) are conditions for determining the refractive power of the diffraction optical element in order to correct slight non-axial aberrations, particularly curvature of field and distortion. When the Conditions (6a) to (6c) are satisfied, it becomes easier to manufacture the diffraction optical element and to properly correct aberrations.

When the Conditions (7a) to (7c) are satisfied, it is possible to make full use of the functions of the diffraction optical element. On the other hand, when the lower limits of the Conditions (7a) to (7c) are not satisfied, the refractive power of the lens unit containing the diffraction optical element becomes too large, preventing correction of chromatic aberration and thus making it difficult to manufacture it. When the upper limits of the Conditions (7a) to (7c) are not satisfied, chromatic aberration can be easily eliminated without using a diffraction optical element. However, when the upper limits are not satisfied and it is the first lens unit which contains the diffraction optical element, the refractive power of the second lens unit in particular is made large in order for the lens to have a desired focal length. As a result, the Petzval sum becomes a large negative value, so that the curvature of field is corrected excessively. In addition, when the upper limits are not satisfied, and it is the second lens unit that contains the diffraction optical element, the second lens unit is moved by a large amount, thereby increasing the overall length of the zoom lens devices.

When there is only one diffraction optical surface, and the Conditions 8(a) to (8c) are not satisfied, the aberrations occurring at the curved surface of the base cannot be completely corrected by the diffraction optical element, so that effective use cannot be satisfactorily made of the diffraction optical system.

The Conditions (9a) to (9c) indicate the ranges within which the diffraction optical element can be effectively used. As in the discussion of Conditions (2) and (3), the diffraction optical element permits a desired refractive power to be obtained even when the curvature is low. If the diffraction optical element can be used to eliminate the use of a combination lens used for correcting chromatic aberration, the overall length of the lens system is decreased, resulting in the effective use of the diffraction optical element.

When the upper limits of the Conditions (9a) to (9c) are not satisfied, effective use is not made of the diffraction optical element, since even an ordinary glass lens can also be formed into those thicknesses. On the other hand, when the lower limits of the Conditions (9a) to (9c) are not satisfied, aberrations become large because of the necessity of a large refractive power due to diffraction.

The diffraction optical elements used in the numerical examples are the so-called binary optics type diffraction gratings, which are phase-type, annular diffraction gratings. They are produced using lithography which is a technique for producing a holographic optical element (HOE). In this case, in order to further increase the diffraction efficiency, the grating may be sectionally formed into the shape of saw teeth. In addition, if molding is performed using a die produced by the lithography technique, the diffraction optical elements of the numerical examples can be manufactured at a low cost.

From the viewpoint of chromatic aberration coefficient, a discussion of which is given on page 98 in "The Method of Designing a Lens", written by Yoshiya Matsui and published by Kyoritsu Shuppan, for lens units closer to the object side than the stop, it is preferable that a surface in which the axial chromatic aberration coefficient L and the magnification chromatic aberration coefficient T have the same sign is formed into the diffraction optical surface. On the other hand, for the lens units closer to the image side than the stop, it is preferable that a surface in which the coefficients L and T have opposite signs is formed into the diffraction optical surface.

When binary optics are used to produce the diffraction optical element as in the present numerical examples, except for cases where aberrations must be corrected, it is preferable not to form the surface nearest the object side into a diffraction optical element surface. This is to protect the grooves with a width in the order of a few microns or submicrons of the binary optics type diffraction grating from dust or the like.

A description will now be given of the numerical examples. In the numerical examples, ri represents the radius of curvature of the ith lens surface from the object; di represents the thickness of the ith lens from the object or the air gap; and ni and vi represent the refractive index and the Abbe number, respectively, of the ith lens from the object side.

The aspherical shape is defined by the following Formula (10):

$$X = \frac{(1/r)Y^2}{1+\sqrt{1-(1+k)(Y/r)^2}} + A2Y^4 + A3Y^6 + A4Y^8 + A5Y^{10} \quad (10)$$

where the X axis extends along the optical axis, the Y axis extends along a direction perpendicular to the optical axis, the direction of travel of light is defined as positive, r is the paraxial radius of curvature of a lens surface, and K, A2, A3, A4, and A5 represent aspherical surface coefficients. E-03 means $10^{-3}$, and the length is given in mm.

NUMERICAL EXAMPLE 1

| | f4.19~42.0 ri | F1.85~2.69 di | ni | vd |
|---|---|---|---|---|
| 1: | 27.72788 | 3.000000 | 1.8475 | 70.81 |
| 2: | −89.54359 | 0.170000 | | |
| 3: | 13.20837 | 1.930000 | 1.5687 | 63.16 |
| 4: | 28.40020 | variable | | |
| 5: | 26.28312 | 0.500000 | 1.8348 | 42.72 |
| 6: | 4.21116 | 2.014630 | | |
| 7: | −5.63301 | 0.500000 | 1.6667 | 48.32 |
| 8: | 6.09920 | 1.800000 | 1.8467 | 23.78 |
| 9: | −59.03524 | variable | | |
| 10: | ∞ | 1.000000 | | |
| ‡11: | 5.22920 | 3.020000 | 1.5831 | 59.38 |
| 12: | −52.47342 | 0.075090 | | |
| 13: | 6.84892 | 0.550000 | 1.8467 | 23.78 |
| 14: | 4.35003 | variable | | |
| ‡15: | 9.80646 | 2.090000 | 1.5831 | 59.38 |
| 16: | −8.23844 | 0.500000 | 1.8467 | 23.78 |
| 17: | −16.31366 | 0.750000 | | |

-continued

| | f4.19~42.0 ri | F1.85~2.69 di | ni | vd |
|---|---|---|---|---|
| 18: | ∞ | 3.268400 | 1.5163 | 64.15 |
| 19: | ∞ | | | |

2nd Surface (Diffraction Optical Surface)

C1: −1.4509E-03  C2: 3.2642E-06  C3: 2.9646E-10

11th Surface (Aspherical Surface)

K: −1.314270

A2: 0.339629E-03  A3: 0.613133E-06  A4: −0.240623E-08  A5: −0.760543E-09

15th Surface (Aspherical Surface)

K: −0.590639

A2: −0.666600E-04  A3: −0.660839E-05  A4: 0.615013E-06  A5: −0.368742E-08

| | Wide | Tele | $F_1/F_{b0} = 0.239$ | $|C2/C1| = 2.24 \times 10^{-3}$ |
|---|---|---|---|---|
| d 4 | 0.71 | 11.86 | $F_1/\sqrt{F_w \cdot F_t} = 1.526$ | $|C3/C1| = 9.08 \times 10^{-5}$ |
| d 9 | 11.95 | 0.8 | $F_1/R_2 = 0.226$ | |
| d14 | 6.37 | 6.36 | $t_1/F_1 = 0.24$ | |

NUMERICAL EXAMPLE 2

| | f4.2~42 ri | F1.85~2.69 di | ni | vd |
|---|---|---|---|---|
| 1: | 29.31999 | 3.000000 | 1.4875 | 70.81 |
| 2: | −100.19825 | 0.170000 | | |
| 3: | 13.19629 | 2.000000 | 1.5687 | 63.16 |
| 4: | 30.56813 | variable | | |
| 5: | 37.02494 | 0.500000 | 1.8348 | 40.72 |
| 6: | 4.25213 | 2.274373 | | |
| 7: | −5.95437 | 0.500000 | 1.5687 | 63.16 |
| 8: | 6.40937 | 1.800000 | 1.8467 | 23.78 |
| 9: | 98.65562 | variable | | |
| 10: | ∞ | 1.000000 | | |
| ‡11: | 5.24683 | 3.020000 | 1.5831 | 59.38 |
| 12: | −50.05577 | 0.075090 | | |
| 13: | 6.76376 | 0.550000 | 1.8467 | 23.78 |
| 14: | 4.32051 | variable | | |
| ‡15: | 9.55453 | 2.090000 | 1.5831 | 59.38 |
| 16: | −8.48200 | 0.500000 | 1.8467 | 23.78 |
| 17: | −17.47262 | 0.750000 | | |
| 18: | ∞ | 3.268400 | 1.5163 | 64.15 |
| 19: | ∞ | | | |

2nd Surface (Diffraction Optical Surface)

C1: −9.5960E-04  C2: −2.1077E-06  C3: 1.0417E-08

4th Surface (Diffraction Optical Surface)

C1: −5.5163E-04  C2: 7.5480E-06  C3: −1.9986E-08

11th Surface (Aspherical Surface)

K: −1.314270

A2: 0.350496E-03  A3: −0.122406E-05  A4: 0.839804E-07  A5: −0.224382E-08

15th Surface (Aspherical Surface)

K: −0.590639

A2: −0.469281E04  A3: −0.113165E-04  A4: 0.163721E-05  A5: −0.684564E-07

|     | Wide  | Tele  |                  | 2nd surface | 4th surface |         | 2nd surface            | 4th surface            |
|-----|-------|-------|------------------|-------------|-------------|---------|------------------------|------------------------|
| d 4 | 0.76  | 11.91 | $F_1/F_{b0}$     | 0.138       | 0.335       | $|C2/C1|$ | $2.20 \times 10^{-3}$ | $1.23 \times 10^{-2}$ |
| d 9 | 11.95 | 0.8   | $F_1/\sqrt{F_w \cdot F_t}$ | 1.530 |          |         |                        |                        |
| d14 | 6.37  | 6.36  | $|F_1/R_{b0}|$   | 0.206       | 0.644       | $|C3/C1|$ | $1.09 \times 10^{-5}$ | $3.62 \times 10^{-5}$ |
| $t_1/F_1 = 0.25$ | | | | | | | | |

NUMERICAL EXAMPLE 3

| | f4.06~80.87 ri | F1.65~3.69 di | ni | vd |
|---|---|---|---|---|
| 1: | 46.66792 | 3.270923 | 1.4875 | 70.21 |
| 2: | −237.31798 | 0.100000 | | |
| 3: | 24.15896 | 3.196417 | 1.4878 | 66.83 |
| 4: | 62.25904 | variable | | |
| 5: | 51.10923 | 0.600000 | 1.8503 | 32.29 |
| 6: | 5.36783 | 1.788024 | 1.8503 | 32.29 |
| 7: | −7.63184 | 0.600000 | | |
| 8: | 47.83811 | 0.850000 | 1.8467 | 23.78 |
| 9: | 25.40888 | 1.800000 | | |
| 10: | −17.73230 | variable | | |
| 11: | ∞ | 1.300000 | | |
| 12: | −336.34169 | 2.500000 | 1.6779 | 50.72 |
| 13: | −16.62985 | 0.200000 | | |
| 14: | 19.56553 | 4.900000 | 1.7200 | 50.25 |
| 15: | −10.69174 | 0.700000 | 1.8467 | 23.78 |
| 16: | −48.74990 | variable | | |
| 17: | −12.86906 | 2.000000 | 1.8467 | 23.78 |
| 18: | −7.79100 | 0.600000 | 1.6031 | 60.70 |
| 19: | 19.21189 | variable | | |
| 20: | 15.58928 | 0.600000 | 1.8467 | 23.78 |
| 21: | 7.27700 | 6.800000 | 1.5831 | 59.38 |
| 22: | −9.54349 | 2.000000 | | |
| 23: | ∞ | 3.694000 | 1.5163 | 64.15 |
| 24: | ∞ | | | |

2nd Surface (Diffraction Optical Surface)

C1: −2.4886E−04 C2: 1.4719E−06 C3: 2.3638E−10

3rd Surface (Diffraction Optical Surface)

C1: −2.9123E−04 C2: −6.1547E−07 C3: −3.5844E−09

22nd Surface (Aspherical Surface)

K: −0.984713

A2: 0.154065E−03 A3: −0.387351E−06 A4: −0.517244E−07 A5: 0.92852E−10

|     | Wide  | Tele  |                  | 2nd surface | 4th surface |         | 2nd surface            | 4th surface            |
|-----|-------|-------|------------------|-------------|-------------|---------|------------------------|------------------------|
| d 4 | 0.83  | 26.83 | $F_1/F_{b0}$     | 0.067       | 0.536       | $|C2/C1|$ | $5.92 \times 10^{-3}$ | $2.11 \times 10^{-3}$ |
| d10 | 27.2  | 1.2   | $F_1/\sqrt{F_w \cdot F_t}$ | 2.09 |          |         |                        |                        |
| d16 | 2.38  | 2.50  | $|F_1/R_{b0}|$   | 0.160       | 1.56        | $|C3/C1|$ | $9.50 \times 10^{-7}$ | $1.23 \times 10^{-5}$ |
| d19 | 10.87 | 10.74 | | | | | | |
| $t_1/F_1 = 0.17$ | | | | | | | | |

NUMERICAL EXAMPLE 4

| | f4.19~42 ri | F1.85~2.94 di | ni | vd |
|---|---|---|---|---|
| 1: | 45.09031 | 0.70000 | 1.846660 | 23.8 |
| 2: | 17.82446 | 4.08000 | 1.696797 | 55.5 |

-continued

| | f4.19~42 ri | F1.85~2.94 di | ni | vd |
|---|---|---|---|---|
| 3: | −73.83207 | 0.17000 | | |
| 4: | 13.73082 | 1.93000 | 1.712995 | 53.9 |
| 5: | 30.99116 | variable | | |
| 6: | 28.23576 | 0.50000 | 1.834807 | 42.7 |
| 7: | 4.88384 | 2.01463 | | |
| 8: | −5.90501 | 0.50000 | 1.666718 | 48.3 |
| 9: | −17.42349 | variable | | |
| 10: | ∞ | 1.00000 | | |
| 11: | 4.96433 | 3.02000 | 1.583126 | 59.4 |
| 12: | −39.74591 | 0.07509 | | |
| 13: | 6.45555 | 0.55000 | 1.846660 | 23.8 |
| 14: | 4.11192 | variable | | |
| 15: | 8.93152 | 2.09000 | 1.583126 | 59.4 |
| 16: | −7.25754 | 0.50000 | 1.846660 | 23.8 |
| 17: | −14.99600 | 0.75000 | | |
| 18: | ∞ | 3.26840 | 1.516330 | 64.1 |
| 19: | ∞ | 3.98316 | 1.000000 | |

8th Surface (Diffraction Optical Surface)

C1: 9.3192E−03 C2: −2.3954E−04 C3: −2.9846E−06

11th Surface (Aspherical Surface)

K: −1.31427E+00

A2: 3.39629E−04 A3: 6.13133E−07 A4: −2.40623E−09 A5: −7.60542E−10

15th Surface (Aspherical Surface)

K: −5.90639E−01

A2: −6.66600E−05 A3: −6.60839E−06 A4: 6.15013E−07 A5: −3.68742E−09

|     | Wide  | Tele   | | | |
|-----|-------|--------|---|---|---|
| d 5 | 0.715 | 11.862 | $|F_2|/F_{b0} = 0.309$ | $|C2/C1| = 2.57 \times 10^{-2}$ | |
| d 9 | 11.947 | 0.8   | $|F_2|/\sqrt{F_w \cdot F_t} = 0.295$ | $|C3/C1| = 3.203 \times 10^{-4}$ | |
| d14 | 6.369 | 3.887  | $|F_2|/R_{b0}| = 1.507$ | | |
| | | | $t_2/|F_2| = 0.255$ | | |

NUMERICAL EXAMPLE 5

| | f5.04~35.5 ri | F1.85~2.94 di | ni | νd |
|---|---|---|---|---|
| 1: | 58.37473 | 0.70000 | 1.846660 | 23.8 |
| 2: | 19.55279 | 4.31011 | 1.696797 | 55.5 |
| 3: | −54.32426 | 0.17000 | 1.000000 | |
| 4: | 13.17499 | 2.69132 | 1.712995 | 53.9 |
| 5: | 20.67382 | variable | 1.000000 | |
| 6: | −14.88664 | 0.50000 | 1.834807 | 42.7 |
| 7: | 7.50001 | variable | 1.000000 | |
| 8: | ∞ | 1.00000 | 1.000000 | |
| 9: | 5.56943 | 3.10000 | 1.583126 | 59.4 |
| 10: | −11.97409 | 0.07509 | 1.000000 | |
| 11: | 7.45940 | 0.55000 | 1.846660 | 23.8 |
| 12: | 4.29317 | variable | 1.000000 | |
| 13: | 12.10380 | 3.00000 | 1.583126 | 59.4 |
| 14: | −5.81407 | 0.50000 | 1.846660 | 23.8 |
| 15: | −10.11419 | 0.75000 | 1.000000 | |
| 16: | ∞ | 3.26840 | 1.516330 | 64.1 |
| 17: | ∞ | 2.82450 | 1.000000 | |

6th Surface (Diffraction Optical Surface)

C1: −2.9837E-04 C2: 3.7119E-04 C3: 1.6427E-05

7th Surface (Diffraction Optical Surface)

C1: 1.1128E-02 C2: −9.8388E-04 C3: −3.1534E-05

9th Surface (Aspherical Surface)

K: −1.87057E+00

A2: 9.41390E-06 A3: 6.26194E-06 A4: −1.65777E-06 A5: 5.82872E-08

13th Surface (Aspherical Surface)

K: 7.18471E-00

A2: 6.84831E-05 A3: −1.700558E-05 A5: −1.78210E-06

| | Wide | Tele | | 6th surface | 7th surface | | 6th surface | 7th surface |
|---|---|---|---|---|---|---|---|---|
| d 5 | 2.275 | 13.422 | $\|F_2\|/F_{b0}$ | 0.158 | 0.699 | $\|C2/C1\|$ | 1.244 | $5.505 \times 10^{-2}$ |
| d 7 | 12.884 | 1.737 | $\|F_2\|/\sqrt{F_w F_t}$ | 0.391 | | | | |
| d12 | 3.791 | 5.317 | $\|F_2/R_{b0}\|$ | 0.352 | 1.433 | $\|C3/C1\|$ | $5.505 \times 10^{-2}$ | $2.834 \times 10^{-3}$ |
| $t_2/\|F_2\| = 0.0955$ | | | | | | | | |

NUMERICAL EXAMPLE 6

| | f4.60~80.97 ri | F1.65~3.69 di | ni | νd |
|---|---|---|---|---|
| 1: | 65.74034 | 1.20000 | 1.846660 | 23.8 |
| 2: | 32.13450 | 0.30842 | 1.000000 | |
| 3: | 38.82454 | 3.70000 | 1.603112 | 60.7 |
| 4: | −187.58422 | 0.15000 | 1.000000 | |
| 5: | 23.57227 | 2.90000 | 1.603112 | 60.7 |
| 6: | 129.76912 | variable | 1.000000 | |
| 7: | 72.65002 | 0.60000 | 1.882997 | 40.8 |
| 8: | 8.12976 | 2.22916 | 1.000000 | |
| 9: | −11.54943 | 0.60000 | 1.804000 | 46.6 |
| 10: | −34.52217 | variable | 1.000000 | |
| 11: | ∞ | 1.30000 | 1.000000 | |
| 12: | −526.94567 | 2.50000 | 1.719995 | 50.2 |
| 13: | −20.52361 | 0.20000 | 1.000000 | |
| 14: | 18.17685 | 4.90000 | 1.696797 | 55.5 |
| 15: | −11.35273 | 0.70000 | 1.846660 | 23.8 |
| 16: | −36.46444 | variable | 1.000000 | |
| 17: | −13.94541 | 2.00000 | 1.846660 | 23.8 |
| 18: | −7.82927 | 0.60000 | 1.603112 | 60.7 |
| 19: | 16.78478 | variable | 1.000000 | |

-continued

| | f4.60~80.97 ri | F1.65~3.69 di | ni | νd |
|---|---|---|---|---|
| 20: | 9.14787 | 0.60000 | 1.846660 | 23.8 |
| 21: | 5.48103 | 6.80000 | 1.583126 | 59.4 |
| 22: | −14.53224 | 2.00000 | 1.000000 | |
| 23: | ∞ | 3.69400 | 1.516330 | 64.1 |
| 24: | ∞ | 3.60770 | 1.000000 | |

9th Surface (Diffraction Optical Surface)

C1: 4.9195E-03 C2: −3.3494E-05 C3: −2.2608E-06

22nd Surface (Aspherical Surface)

K: −1.26931E+00

A2: 1.78261E-04 A3: −3.9171E-06 A4: 5.31697E-08 A5: −6.85706E-09

| | Wide | Tele | $\|F_2\|/F_{b0} = 0.271$ | $\|C2/C1\| = 6.808 \times 10^{-3}$ |
|---|---|---|---|---|
| d 6 | 0.8 | 26.8 | $\|F_2\|/\sqrt{F_w F_t} = 0.339$ | $\|C3/C1\| = 4.596 \times 10^{-4}$ |
| d10 | 27.2 | 1.2 | $\|F_2 R_{b0}\| = 0.533$ | |
| d16 | 2.378 | 2.503 | $t_2/\|F_2\| = 0.195$ | |
| d19 | 10.873 | 10.748 | | |

NUMERICAL EXAMPLE 7

| | f4.19~42.0 ri | F1.85~2.94 di | ni | νd |
|---|---|---|---|---|
| 1: | 37.70517 | 0.700000 | 1.8467 | 23.78 |
| 2: | 17.19288 | 4.080000 | 1.6968 | 55.53 |
| 3: | −102.86764 | 0.170000 | | |
| 4: | 14.07159 | 1.930000 | 1.7130 | 53.84 |
| 5: | 32.22461 | variable | | |
| 6: | 23.15286 | 0.500000 | 1.8348 | 42.72 |
| 7: | 4.22374 | 2.014630 | | |
| 8: | −5.41469 | 0.500000 | 1.6667 | 48.32 |
| 9: | 6.03262 | 1.800000 | 1.8467 | 23.78 |
| 10: | −59.58703 | variable | | |
| 11: | ∞ | 1.000000 | | |
| 12: | 4.81561 | 3.020000 | 1.5831 | 59.38 |
| 13: | −104.00046 | 0.075090 | | |
| 14: | 5.95904 | 0.550000 | 1.8467 | 23.78 |
| 15: | 3.81575 | variable | | |
| 16: | 7.32136 | 2.000000 | 1.5163 | 64.15 |

-continued

|  | f4.19~42.0 | F1.85~2.94 | | |
|---|---|---|---|---|
|  | ri | di | ni | vd |
| 17: | −93.88687 | 0.500000 | | |
| 18: | ∞ | 3.268400 | 1.5163 | 64.15 |
| 19: | ∞ | | | |

13th Surface (Diffraction Optical Surface)

C1: −2.4472E-03  A2: 8.0292E-05  C3: −2.5459E-06

12th Surface (Aspherical Surface)

K: −0.178267

A2: −0.610271E-03  A3: −0.270788E-04  A4: 0.811220E-06:  A5: −0.549452E-07

16th Surface (Aspherical Surface)

K: −0.421241

A2: −0.124827E-03  A3: −0.598390E-04  A4: 0.941507E-05  A5: −0.471873E-06

|  | Wide | Tele | $F_3/F_{b0} = 0.125$ | $|C2/C1| = 3.28 \times 10^{-2}$ |
|---|---|---|---|---|
| d 5 | 0.71 | 11.86 | $F_3/\sqrt{F_w \cdot F_t}$ 0.895 | $|C3/C1| = 1.04 \times 10^{-3}$ |
| d10 | 11.95 | 0.8 | $|F_3/R_{b0}| = 0.114$ | |
| d15 | 6.37 | 6.36 | $t_3/F_3 = 0.3$ | |

NUMERICAL EXAMPLE 8

|  | f4.06~80.87 | F1.65~3.69 | | |
|---|---|---|---|---|
|  | ri | di | ni | vd |
| 1: | 61.73724 | 1.200000 | 1.8467 | 23.78 |
| 2: | 32.58878 | 0.510035 | | |
| 3: | 37.68191 | 3.700000 | 1.6031 | 60.70 |
| 4: | −163.94953 | 0.150000 | | |
| 5: | 22.82522 | 2.900000 | 1.6031 | 60.70 |
| 6: | 76.97670 | variable | | |
| 7: | 27.83513 | 0.600000 | 1.8830 | 40.78 |
| 8: | 6.33205 | 2.150000 | | |
| 9: | −9.46850 | 0.600000 | 1.8040 | 46.58 |
| 10: | 31.40292 | 0.850000 | | |
| 11: | 23.58993 | 1.800000 | 1.8467 | 23.78 |
| 12: | −53.50305 | variable | | |
| 13: | ∞ | 1.300000 | | |
| 14: | 19.51254 | 4.000000 | 1.7859 | 44.19 |
| 15: | −20.62883 | variable | | |
| 16: | −36.01900 | 1.000000 | 1.8040 | 46.58 |
| 17: | 18.53945 | variable | | |
| 18: | 12.69953 | 0.600000 | 1.8467 | 23.78 |
| 19: | 7.70518 | 6.800000 | 1.5831 | 59.38 |
| 20: | −12.66926 | 2.000000 | | |
| 21: | ∞ | 3.694000 | 1.5163 | 64.15 |
| 22: | ∞ | | | |

15th Surface (Diffraction Optical Surface)

C1: −2.0903E-03  C2: 1.1414E-05  C3: −2.0970E-07

14th Surface (Aspherical Surface)

K: −2.061869

A2: −0.595692E-04  A3: 0.482231E-06  A4: −0.196325E-07  A5: 0.194441E-09

20th Surface (Aspherical Surface)

K: −1.483540

A2: 0.725275E-04  A3: 0.544473E-05  A4: −0.338139E-06  A5: 0.544889E-08

|  | Wide | Tele | $F_3/F_{b0} = 0.537$ | $|C2/C1| = 5.46 \times 10^{-3}$ |
|---|---|---|---|---|
| d 6 | 0.9 | 26.9 | $F_3/\sqrt{F_w \cdot F_t}$ 0.70 | $|C3/C1| = 1.00 \times 10^{-4}$ |
| d12 | 27.2 | 1.2 | $|F_3/R_{b0}| = 0.616$ | |
| d15 | 3.88 | .00 | $t_3/F_3 = 0.31$ | |
| d17 | 10.87 | 10.75 | | |

FIGS. 26 to 30 are sectional views each showing the arrangement of its component lenses at the wide angle end in the rear focusing zoom lens devices of Numerical Examples 9 to 13 in accordance with the present invention. FIGS. 31A(1) to 31C(4) are diagrams showing the aberrations of the zoom lens device of Numerical Example 9. FIGS. 32A(1) to 32C(4) are diagrams showing the aberrations of the zoom lens device of Numerical Example 10. FIGS. 33A(1) to 33C(4) are diagrams showing the aberrations of the zoom lens device of Numerical Example 11. FIGS. 34A(1) to 34C(4) are diagrams showing the aberrations of the zoom lens device of Numerical Example 12. FIGS. 35A(1) to 35C(4) are diagrams showing the aberrations of the zoom lens device of Numerical Example 13. In Numerical Examples 9 and 10, a lens surface of the fourth lens unit used for correcting an image plane and for focusing is formed into a diffraction optical surface (Group D Numerical Examples). In Numerical Examples 11 to 13, which are modifications of the Group A numerical examples, a lens surface of the stationary first lens unit is formed into a diffraction optical surface (Group E Numerical Examples). In the figures illustrating the aberrations, the "A figures" illustrate the aberrations at the wide angle end, the "B figures" illustrate the aberrations at an intermediate stage between the wide angle end and the telephoto end, and the "C figures" illustrate the aberrations at the telephoto end.

Figure 26:
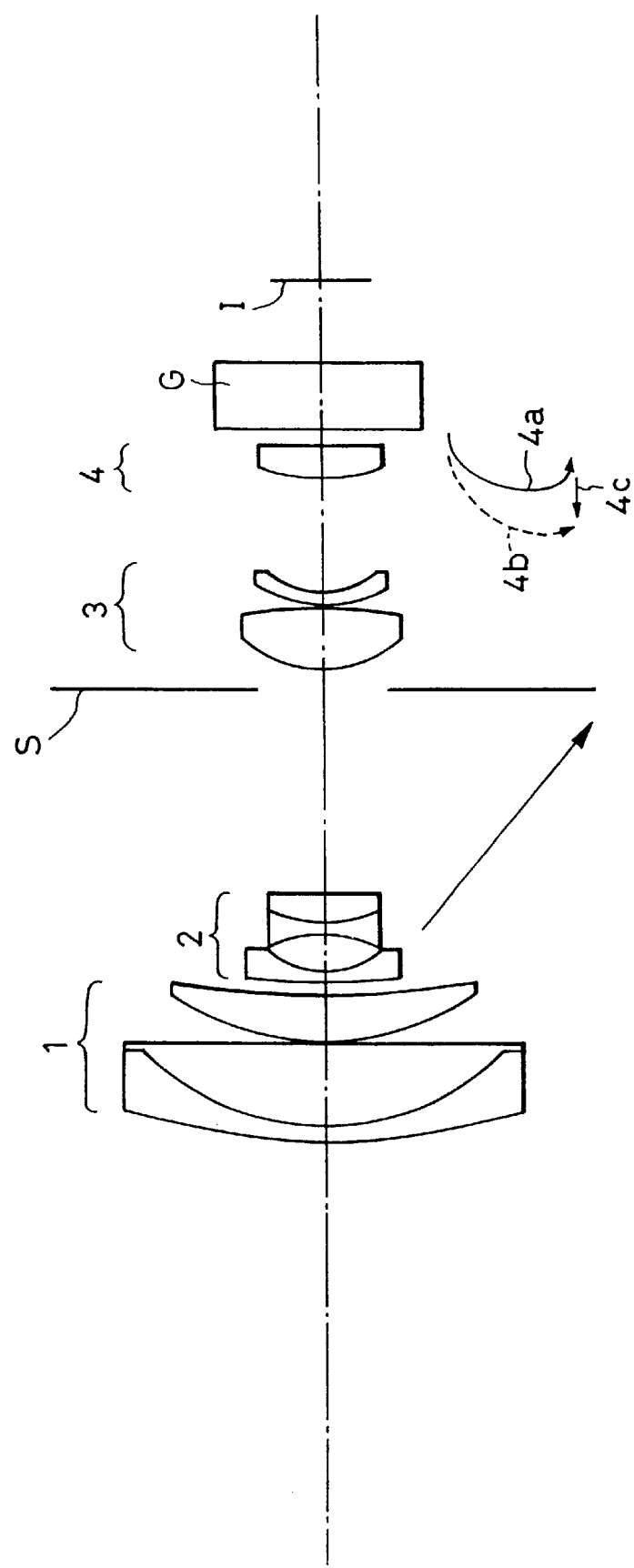
FIG. 26 is a section of a zoom lens device of Numerical Example 9 in accordance with the present invention.
Figure 27:
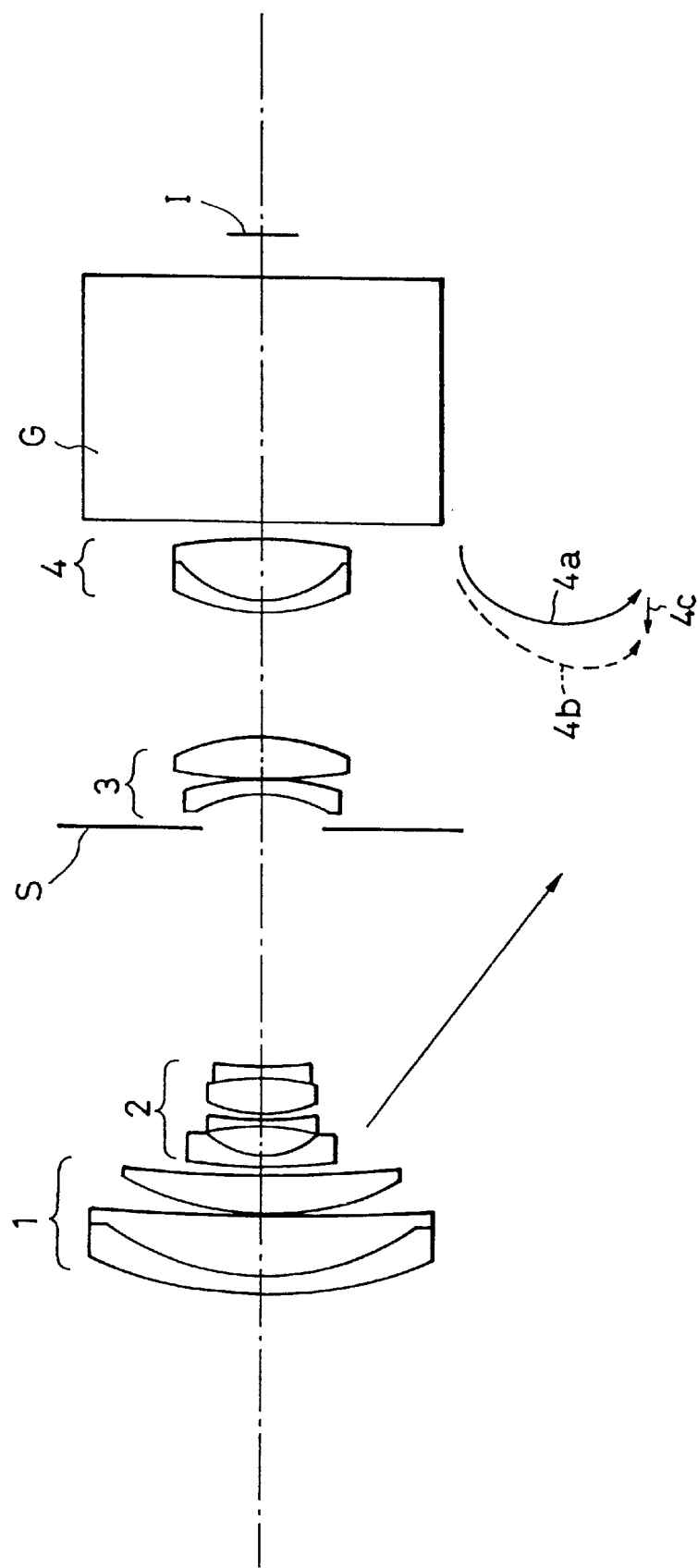
FIG. 27 is a section of a zoom lens device of Numerical Example 10 in accordance with the present invention.

A description will now be given of the lens structures of the Group D Numerical Examples 9 and 10 of FIGS. 26 and 27. In FIGS. 26 and 27, reference numeral 1 denotes a first lens unit with a positive refractive power, reference numeral 2 denotes a second lens unit with a negative refractive power, reference numeral 3 denotes a third lens unit with a positive refractive power, and reference numeral 4 denotes a fourth lens unit with a positive refractive power. Reference character S denotes an aperture stop and is disposed forwardly of the third lens unit 3. Reference character G denotes a glass block such as a color separation optical system or a faceplate, or a filter. Reference character I denotes an image plane.

In the Group D Numerical Examples, when the magnification changes from the wide angle end to the telephoto end, each second lens unit is moved toward the image plane side as shown by the arrow of its corresponding figure, and each fourth lens unit is moved in paths which curve toward the object side to correct changes in the image plane occurring as the magnification changes.

Rear focusing is used to perform focusing by moving the fourth lens unit on the optical axis. In the same figures, each fourth lens unit moves in a path indicated by a solid curve 4a to correct the changes that occur in the image plane as the magnification changes from the wide angle end to the telephoto end when an object at infinity is being focused, whereas each fourth lens is moved in a path indicated by a dotted curve 4b to correct the changes that occur in the image plane as the magnification changes from the wide angle end to the telephoto end when a nearby object is being focused. The first and third lens units are stationary during magnification change-over operations and focusing. However, each first lens unit may be moved during magnification change-over operations in order to reduce the extent to which the second lens unit is involved in magnification change-over operations.

In the numerical examples, each fourth lens unit is moved to correct changes in the image plane that occur as the magnification changes and to perform focusing. More specifically, each of the fourth lens units is moved such that each of them moves in paths curving toward the object side as indicated by the curves 4a and 4b during magnification changes from the wide angle end to the telephoto end. This allows the gap between the third lens unit and the fourth lens unit to be used efficiently, which is effective in reducing the overall length of the lens system.

In the numerical examples, each of the fourth lens units is moved forward as indicated by a straight line 4c in each of the figures in order to, for example, at the telephoto end change the object to be focused from an object at infinity to a nearby object.

In the numerical examples, at least one diffraction optical element is formed in each of the fourth lens units, with the phases at each of the diffraction optical elements properly set in order to reduce chromatic aberration occurring at each of the fourth lens units, thereby properly correcting chromatic aberration within the entire magnification change-over range.

A description will now be given of the other structural features of the Group D Numerical Examples.

When the diffraction optical element of the fourth lens unit has a negative refractive power, the chromatic aberration occurring due to the negative refractive power is the same sign as that of the chromatic aberration occurring at a refractive optical system, so that the diffraction optical element is not effective in correcting chromatic aberration.

Therefore, in the numerical examples, each of the diffraction optical elements is formed so as to have a positive refractive power, so that the elements can effectively and properly correct chromatic aberration throughout the entire magnification change-over range.

At least one lens surface of one of the lenses of the fourth lens unit, most preferably the lens surface closest to the object side, is formed into an aspherical surface in order to properly correct various aberrations such as spherical aberration, coma, and distortion, thereby providing a high optical performance. When the aspherical surface is shaped such that the positive refractive power becomes weaker towards the peripheral portion of the lens, both spherical aberration and coma are properly corrected.

The structure of each of the fourth lens units includes either one positive lens or one positive lens and one negative lens. The former structure is effective in making the lens system compact, whereas the latter structure is effective in correcting curvature of field and distortion.

The lens units are formed such that the following Condition (10) is satisfied:

$$f4\{(1/f4d)-(1/f4d')\}<1.56\times10^{-2} \quad (10)$$

where f4 is the focal length of the fourth lens unit with a surface of one of its lenses formed into a diffraction optical element surface, f4d is the focal length of the lens having the diffraction optical element surface, and f4d' is the focal length of this lens after elimination of the diffraction optical element portion.

When this condition is satisfied, chromatic aberration is corrected more effectively. When the value becomes greater than the upper limit of Condition (10), and the refractive power of the diffraction optical element becomes too strong, the chromatic aberration correcting effect becomes too large, resulting in considerable deterioration in the optical performance due to the second order spectrum.

In Numerical Example 9, the lens surface closest to the image side in the fourth lens unit is formed into a diffraction optical element surface. In Numerical Example 10, the lens surface closest to the object side (in the fourth lens unit) is formed into a diffraction optical element surface. Each of the optical elements surfaces permits over the entire change-over range correction of the chromatic aberration occurring at the second lens unit, thereby providing high optical performance.

In Numerical Example 9, the third lens unit includes, from the object side, a positive lens with its convex surface facing the object side and a meniscus negative lens with its convex surface facing the object side in order to properly correct the various aberrations.

In Numerical Example 10, the third lens unit includes, from the object side, a meniscus negative lens with its convex surface facing the image side and a positive lens with its convex surface facing the object side in order to properly correct aberrations, such as spherical aberration and coma, over the entire magnification change-over range.

According to the present invention, in order for the chromatic aberration to be sufficiently corrected at the fourth lens unit, it is desirable that the following Condition (11) be satisfied:

$$|0.5797 \cdot C14 + \Sigma(1/(f4i \cdot v4i)| \cdot f4 < 9.8\times10^{-3} \quad (11)$$

where f4i and v4i (i=1, 2, ...) are, respectively, the focal length and the Abbe number of all of the lenses of the fourth lens unit, and C14 is a coefficient in the second order term of Formula (1) of the diffraction optical surface of the fourth lens unit.

When this condition is satisfied, chromatic aberration is sufficiently corrected at the fourth lens unit. Condition (11) is a condition for sufficiently correcting chromatic aberration at the fourth lens unit by combining the chromatic aberration correcting effects of the refractive optical surface and diffraction optical element surface.

In general, when Nd, NC, and NF are the refractive powers for each of the wavelengths of the d line, the C line, and the F line, the Abbe number (dispersion value) of the refractive optical system is given by $$vd=(Nd-1)/(NF-NC).$$

On the other hand, when: the wavelengths of the d line, C line, and the F line are represented by λd, λC, and λF, respectively, the dispersion value vd of the diffraction optical element surface is given by $$vd=\lambda d/(\lambda F-\lambda C)$$

where vd=−3.45.

The refractive power φ of the paraxial first order diffraction light for the principal wavelength of the diffraction optical element surface is given by $$\phi=-2\cdot C1$$

where C1 is a coefficient in the second order term representing the phase at the diffraction optical element surface.

Since the chromatic aberration of a particular lens unit is proportional to φ/ν, the amount corresponding thereto for the diffraction optical element is $$-2\cdot C1/(-3.45)=0.5797\cdot C1.$$

For the refractive optical system, this amount is $$\Sigma 1/(f\cdot v).$$

Therefore, the closer this sum is to zero, the more properly is the chromatic aberration of the lens unit corrected.

When Condition (11) is not satisfied, the chromatic aberration of the fourth lens unit is not sufficiently corrected.

It is desirable that the ratio of the focal length of the fourth lens unit to the focal length of the third lens unit satisfy the following Condition (12):

$$0.3 < f4/f3 < 1.3 \tag{12}$$

If the ratio is greater than the upper limit of condition (12) and the refractive-power of the third lens unit becomes too strong, the back focus becomes too short, so that there is not enough space to insert the optical filter or the like. On the other hand, when the ratio is less than the lower limit of Condition (12) and the refractive power of the third lens unit becomes too weak, the back focus becomes too long, so that the lens system cannot be reduced in size.

A description will now be given of the lens structures of the Group E Numerical Examples 11 to 13 of FIGS. 28 to 30.

Figure 28:
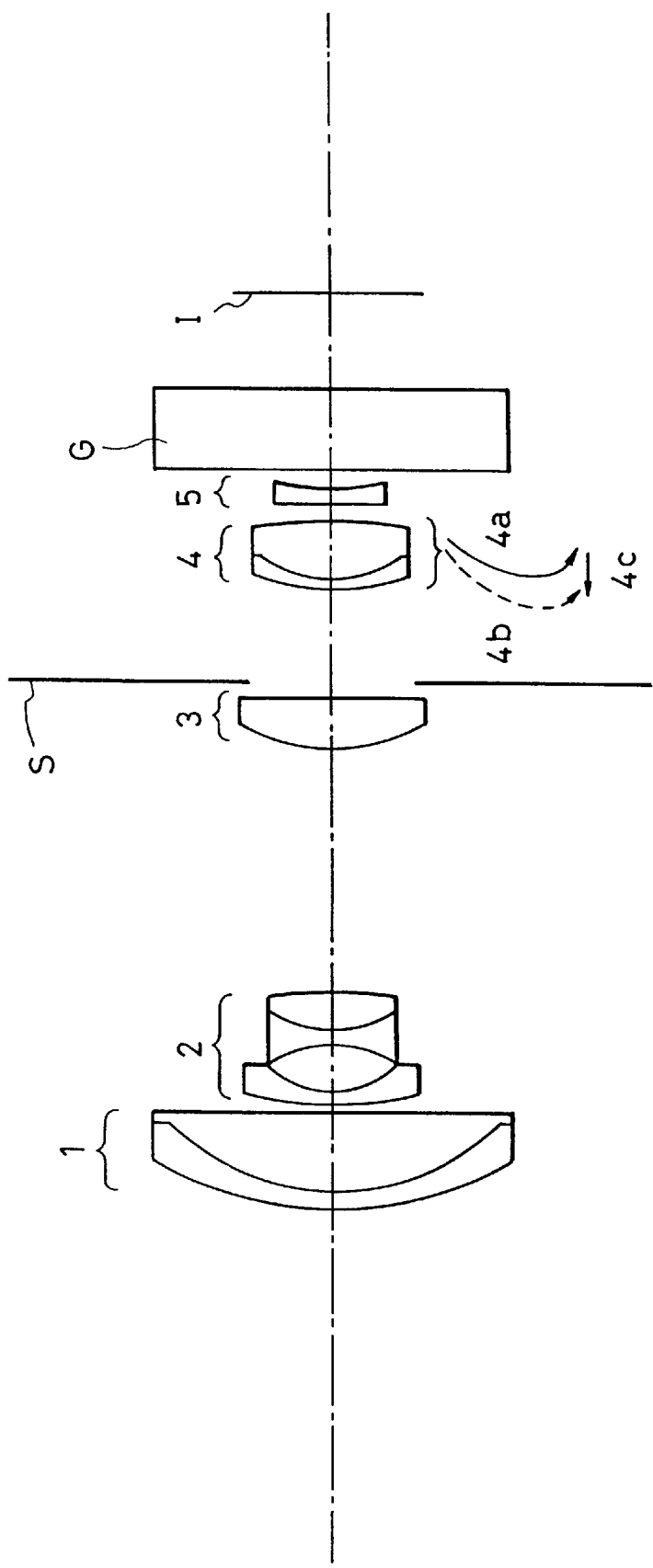
FIG. 28 is a section of a zoom lens device of Numerical Example 11 in accordance with the present invention.
Figure 29:
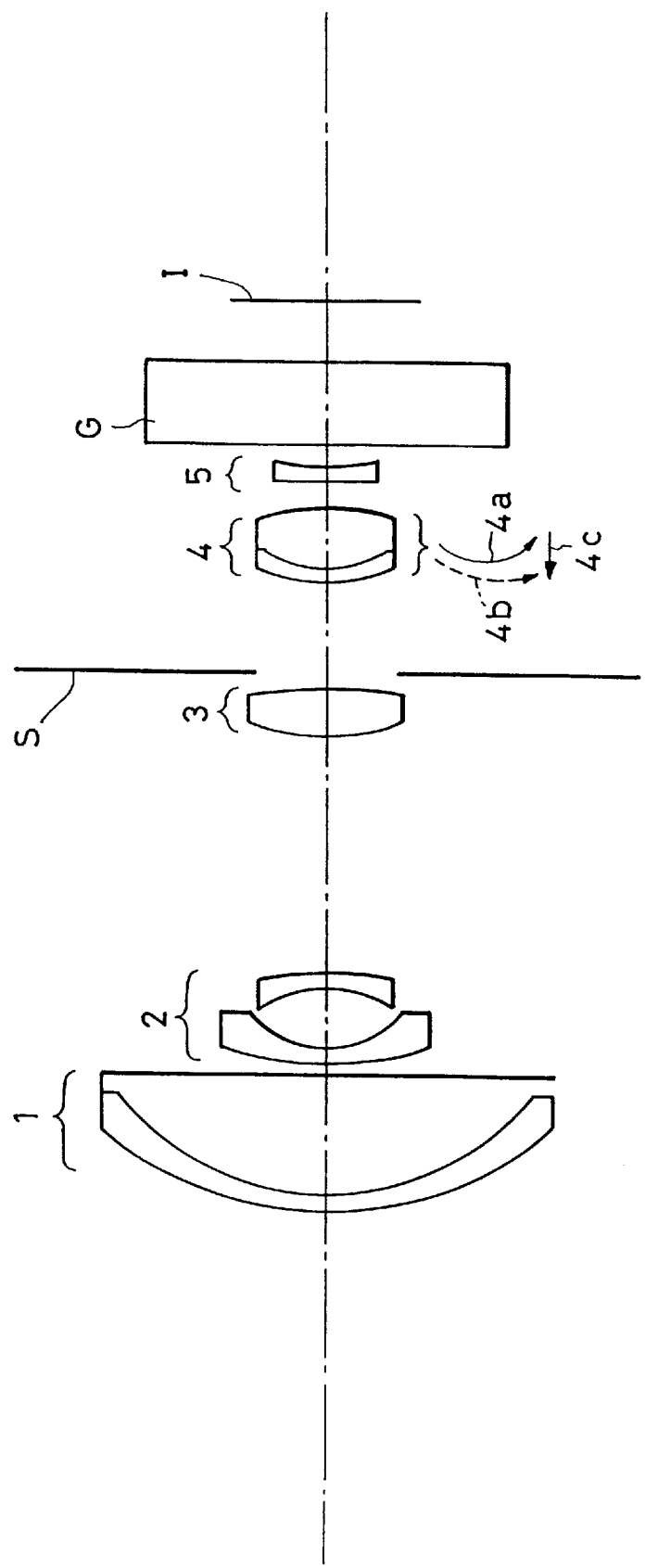
FIG. 29 is a section of a zoom lens device of Numerical Example 12 in accordance with the present invention.
Figure 30:
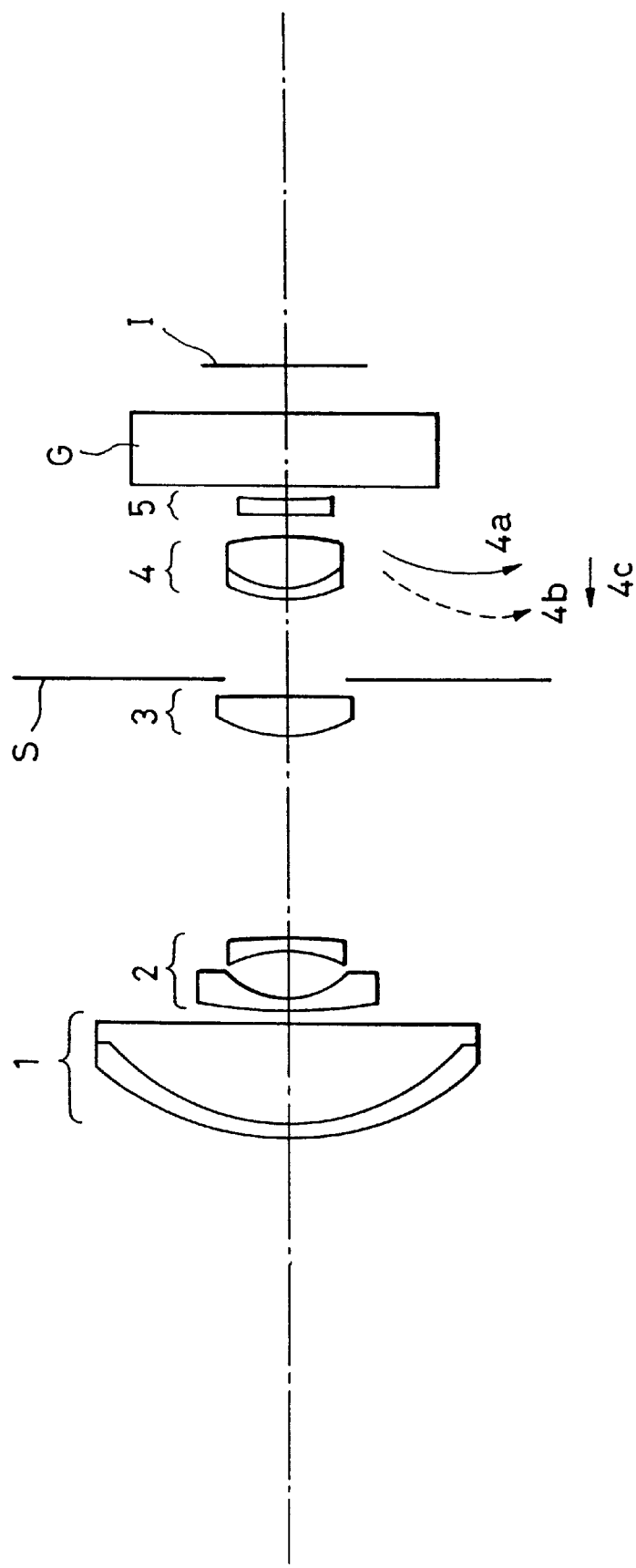
FIG. 30 is a section of a zoom lens device of Numerical Example 13 in accordance with the present invention.

In FIGS. 28 to 30, reference numeral 1 denotes a first lens unit with a positive refractive power, reference numeral 2 denotes a second lens unit with a negative refractive power, reference numeral 3 denotes a third lens unit with a positive refractive power, reference numeral 4 denotes a fourth lens unit with a positive refractive power, and reference numeral 5 denotes a fifth lens unit with a negative refractive power. Reference character S denotes an aperture stop which is disposed forwardly of the third lens unit 3. Reference character I denotes an image plane.

Reference character G denotes a glass block, such as a color separation optical system or a faceplate, or a filter.

When the magnification is being changed from the wide angle end to the telephoto end, each second lens unit 2 is moved toward the image plane side as indicated by the arrow in its associated figure, and each fourth lens unit is moved into paths curving toward the object side to correct changes in the image plane that occur as the magnification changes. Rear focusing is used to perform focusing by moving each fourth lens unit on the optical axis.

In FIGS. 28 to 30, each fourth lens unit moves in a path indicated by a solid curve 4a to correct the changes that occur in the image plane as the magnification changes from the wide angle end to the telephoto end when an object at infinity is being focused, whereas each fourth lens moves in a path indicated by a dotted curve 4b to correct the changes that occur in the image plane as the magnification changes from the wide angle end to the telephoto end when a nearby object is being focused. The first and third lens units are stationary during magnification change-over operations and focusing.

In the numerical examples, each fourth lens unit is moved to correct changes in the image plane that occur as the magnification changes and to perform focusing. More specifically, each fourth lens unit is moved into paths curving toward the object side as indicated by the curved arrows 4a and 4b during magnification changes from the wide angle end to the telephoto end. This permits the gap between the third lens unit and the fourth lens unit to be effectively used and to effectively reduce the overall length of the lens system.

In the numerical examples, each of the fourth lens units is moved forward as indicated by a straight line 4c in each of the figures in order to, for example, at the telephoto end change the object to be focused from an object at infinity to a nearby object.

In the zoom lens device with five lens units of the numerical examples, if the first lens unit has only one positive lens with a diffraction optical element surface, it is possible to minimize chromatic aberration when taking into account the chromatic aberrations for only two wavelengths of, for example, the d line and the g line. However, since the diffraction optical element has abnormal dispersion properties, chromatic aberration for the wavelengths other than the two wavelengths, particularly at the telephoto end, or the so-called secondary spectrum becomes large, thus making it difficult to properly correct chromatic aberration within the visible wavelength range.

When an attempt is made to correct chromatic aberration only by using a refractive surface without forming the first lens unit so as to have a diffraction optical element surface, the refractive powers of the positive lens and negative lens for correcting chromatic aberration becomes too strong.

Accordingly, according to the numerical examples, the first lens unit has a positive lens with both of its surfaces formed into convex surfaces and a negative meniscus lens with its concave surface facing the object side. In addition, it has a diffraction optical element surface which is rotationally symmetrical to the optical axis. Properly setting the phase at the diffraction optical element reduces the overall length of the lens system and properly corrects the chromatic aberration occurring at the first lens unit.

A description will now be given of the other structural features of the Group E Numerical Examples.

When the diffraction optical element of the first lens unit has a negative refractive power, the amount of chromatic aberration produced thereby and the amount of chromatic aberration of the refractive optical system become about the same, so that the diffraction optical element no longer effectively corrects chromatic aberration.

Accordingly, in the numerical examples, the diffraction optical element has a positive refractive power in order to effectively and properly correct chromatic aberration over the entire magnification change-over range.

It is preferable that the following Condition (13) be satisfied:

$$1.9 < |f1n/f1| < 5 \tag{13}$$

where f1 is the focal length of the first lens unit, and f1$n$ is the focal length of the negative lens of the first lens unit.

When the ratio is less than the lower limit of Condition (13) and the refractive power of the negative lens of the first lens unit becomes too strong, the refractive power of the positive lens also becomes too strong, thereby increasing the curvature of the lens surface thereof and thus making it difficult to form the first lens unit using two lenses.

In contrast, when the refractive power of the negative lens is too weak, the diffraction optical element corrects chromatic aberration excessively, thus considerably deteriorating the optical performance due to second spectrum.

It is preferable that the range of Condition (13) is made narrower as follows:

$$1.9 < |f1n/f1| < 4.5 \tag{13'}$$

It is preferable that the following Condition (14) be satisfied:

$$1.2 < \beta5 < 2 \tag{14}$$

where $\beta5$ is the lateral magnification of the fifth lens unit.

When Condition (14) is satisfied, good optical performance is maintained and the overall length of the lens system is reduced.

When $\beta5$ is less than the lower limit of Condition (14), and the magnification of the fifth lens unit becomes small, the overall length of the lens system cannot be effectively reduced. On the other hand, when β5 is greater than the upper limit of Condition (14), the overall length of the lens system can be reduced, but the Petzval sum increases in the negative direction, making it difficult to correct curvature of field. In addition, the distance between the image plane and the exit pupil becomes too short, thus making it difficult to use the lens device in, for example, a video camera.

The first lens unit is formed so as to have an aspherical surface, which permits satisfactory correction of various aberrations, such as spherical aberration, coma, and distortion, over the entire magnification change-over range.

In the numerical examples, the lens surface of the first lens unit closest to the object side is formed into an aspherical surface in order to properly correct particularly spherical aberration and coma occurring at the telephoto end. Forming the aspherical surface of the first lens unit such that the positive refractive power becomes weaker towards the peripheral portion is effective in correcting spherical aberration and coma.

Various aberrations, such as chromatic aberration occurring at the second lens unit, are properly corrected by forming the second lens unit with at least two negative lenses and one positive lens. The second lens unit may comprise in order of lenses from the lens closest to the object side, a meniscus negative lens with its highly concave surface facing the image plane side, a negative lens with both surfaces formed into concave surfaces, and a positive lens with its highly convex surface facing the object side.

The second lens unit is formed by two negative lenses, with at least one surface formed into a diffraction optical element surface. This allows chromatic aberration occurring in the second lens unit to be properly corrected using fewer lenses, and reduces the occurrence of chromatic aberration over the entire magnification change-over range.

Here, when the diffraction optical element of the second lens unit has a negative refractive power, chromatic aberration in the second lens unit is effectively corrected.

The first and second lens units each have at least one diffraction optical element surface. When only the second lens unit has a diffraction optical element surface, chromatic aberrations for two wavelengths can be corrected, but secondary spectrum becomes difficult to correct.

Accordingly, as mentioned above, the effects of color secondary spectrum occurring in the second lens unit are canceled to properly correct chromatic aberration over the entire magnification change-over range as well as over the entire visible light wavelength range by forming the first lens unit into a two lens structure containing a positive lens and a negative lens and including a diffraction optical element surface.

In the numerical examples, the second lens unit can be constructed using fewer lenses, namely two lenses, thus allowing further reduction of the overall length of the lens system.

In the numerical examples, in order to correct distortion or astigmatism occurring in the second lens unit and to prevent changes in such aberrations resulting from changes in the magnification, it is preferable that the second lens unit be formed from the object side, a meniscus negative lens with a highly concave surface facing the image plane side and a meniscus negative lens with its highly concave surface facing the object side.

When the second lens unit contains two independent negative lenses, it is preferable that the following Condition (15) be satisfied:

$$1<(Rb+Ra)/(Rb-Ra)<2.5 \qquad (15)$$

where Ra and Rb are, respectively, the radius of curvature of the object side lens surface of the image plane side negative lens and the radius of curvature of the image plane side lens surface (in the case where the surface is an aspherical surface, it is the reference spherical surface determined by the on-axis and effective diameter).

It is preferable that the range of Condition (15) be narrowed down as follows:

$$1<(Rb+Ra)/(Rb-Ra)<2 \qquad (15').$$

When the ratio becomes less than the lower limit of Condition (15), the distortion occurring at the wide angle end becomes too negative. On the other hand, when the ratio becomes greater than the upper limit, distortion at the telephoto end cannot be completely corrected.

The second lens unit may have at least one aspherical surface independently of the diffraction optical element surface, or the base lens surface of the diffraction optical element may be formed into an aspherical surface. In such a case, optical performance is, further improved.

It is desirable that the following Formula (16) be satisfied:

$$|0.5797 \cdot C11 + \Sigma\{1/(f1i \cdot v1i)\}| \cdot f1 < 4.5 \times 10^{-3} \qquad (16)$$

where f1i and v1i (i=1, 2) are the focal length and the Abbe number of the two lenses of the first lens unit, respectively, and C11 is a coefficient in the second order term in Formula (1) of the diffraction optical element of the first lens unit.

When this condition is satisfied, chromatic aberration is sufficiently corrected at the first lens unit. Condition (16) is the condition for sufficient correction of chromatic aberration for the first lens unit as a result of the combined chromatic aberration correcting effects of the refractive optical surface and the diffraction optical element.

When Condition (16) is not satisfied, chromatic aberration is not sufficiently corrected at the first lens unit.

It is preferable that the range of Condition (16) be narrowed as follows:

$$|0.5797 \cdot C11 + \Sigma(1/(1i \cdot v1i))| \cdot f1 < 0.02 \qquad (16')$$

It is desirable that the following Condition (17) be satisfied:

$$0.2<|f2/(Fw \cdot Ft)^{1/2}|<0.3 \qquad (17)$$

where f2, Fw, and Ft are the focal length of the second lens unit, the focal length of the entire lens system at the wide angle end, and the focal length of the entire lens system at the telephoto end, respectively.

Condition (17) is related to the refractive power of the second lens unit and is the condition for effectively obtaining a predetermined magnification change-over ratio, while reducing changes in aberration occurring as the magnification changes. When the value becomes smaller than the lower limit and the refractive power of the second lens unit becomes too strong, the lens system can be made smaller, but the Petzval sum increases in the negative direction, increasing the curvature of field as well as changes in aberrations that occur as the magnification changes. In contrast, when the value becomes greater than the upper limit, the amount of movement of the second lens becomes too large, which increases the overall length of the lens system.

It is preferable that the range of Condition (17) be narrowed down as follows:

$$0.25<|f2/(Fw \cdot Ft)^{1/2}|<0.3 \quad (17')$$

The numerical data of the Numerical Examples 9 to 13 are given below. The symbols mean the same as the symbols of Numerical Examples 1 to 8.

The aspherical shape is defined by the following formula:

$$X = \frac{(1/r)Y^2}{1+\sqrt{1-(1+K)(Y/r)^2}} + A2Y^4 + A3Y^6 + A4Y^8 + A5Y^{10} + A6Y^{12}$$

where the X-axis extends along the optical axis, the Y-axis extends along a direction perpendicular to the optical axis, the direction of travel of light is defined as positive, r is the paraxial radius of curvature, and k, A2, A3, A4, A5, and A6 each represent an aspherical coefficient. E-0X and D-0X represent $10^{-x}$. The length is given in mm.

NUMERICAL EXAMPLE 9

| f = 4.00~38.78 | | fno = 1.85~2.56 | | 2ω = 61.9°~7.08° | |
|---|---|---|---|---|---|
| r 1 = 30.653 | d 1 = 0.70 | n 1 = 1.84666 | ν 1 = 23.8 |
| r 2 = 11.925 | d 2 = 4.10 | n 2 = 1.72000 | ν 2 = 50.3 |
| r 3 = 606.409 | d 3 = 0.17 | | |
| r 4 = 13.325 | d 4 = 2.25 | n 3 = 1.78590 | ν 3 = 44.2 |
| r 5 = 47.005 | d 5 = variable | | |
| r 6 = 29.830 | d 6 = 0.50 | n 4 = 1.88300 | ν 4 = 40.8 |
| r 7 = 3.829 | d 7 = 1.96 | | |
| r 8 = −5.652 | d 8 = 0.50 | n 5 = 1.66672 | ν 5 = 48.3 |
| r 9 = 5.351 | d 9 = 1.55 | n 6 = 1.84666 | ν 6 = 23.8 |
| r10 = −51.160 | d10 = variable | | |
| r11 = 0.000 stop | d11 = 1.00 | | |
| r12 = 4.789 | d12 = 3.00 | n 7 = 1.58313 | ν 7 = 59.4 |
| r13 = −24.852 | d13 = 0.20 | | |
| r14 = 7.124 | d14 = 0.55 | n 8 = 1.84666 | ν 8 = 23.8 |
| r15 = 4.107 | d15 = variable | | |
| r16 = 7.078 | d16 = 1.80 | n 9 = 1.48749 | ν 9 = 70.2 |
| r17 = −34.049 | d17 = 0.75 | | |
| r18 = ∞ | d18 = 3.25 | n10 = 1.51633 | ν10 = 64.2 |
| r19 = ∞ | | | |

17th Surface (Diffraction Optical Surface)
C1: −2.91225E-03 C2: −9.61959E-05
Aspherical Surface Coefficients

| Aspherical Surface Coefficients | | | |
|---|---|---|---|
| k | A2 | A3 | A4 |
| 12th surface −1.35778E+00 | 3.25400E-04 | −1.04863E-07 | −1.05177E-07 |
| 16th surface −1.61439E+00 | 9.50952E-05 | −3.90335E-05 | 2.22719E-06 |

| Focal Length Variable Interval | 4.00 | 12.20 | 38.78 |
|---|---|---|---|
| d 5 | 0.54 | 6.19 | 9.80 |
| d 11 | 10.06 | 4.41 | 0.80 |
| d 16 | 5.68 | 3.16 | 7.11 |

NUMERICAL EXAMPLE 10

| f = 4.25~50.14 | | fno = 1.65~2.35 | | 2ω = 58.9°~5.48° | |
|---|---|---|---|---|---|
| r 1 = 30.264 | d 1 = 1.00 | n 1 = 1.85504 | ν 1 = 23.8 |
| r 2 = 17.959 | d 2 = 4.70 | n 2 = 1.60548 | ν 2 = 60.6 |
| r 3 = 242.518 | d 3 = 0.17 | | |
| r 4 = 20.903 | d 4 = 2.70 | n 3 = 1.69979 | ν 3 = 55.5 |
| r 5 = 75.589 | d 5 = variable | | |
| r 6 = 37.611 | d 6 = 0.65 | n 4 = 1.88815 | ν 4 = 40.8 |
| r 7 = 5.444 | d 7 = 2.32 | | |
| r 8 = −16.985 | d 8 = 0.60 | n 5 = 1.88815 | ν 5 = 40.8 |
| r 9 = 34.204 | d 9 = 0.45 | | |
| r10 = 10.819 | d10 = 2.45 | n 6 = 1.85504 | ν 6 = 23.8 |
| r11 = −15.058 stop | d11 = 0.22 | | |
| r12 = −10.736 | d12 = 0.60 | n 7 = 1.77621 | ν 7 = 49.6 |
| r13 = 29.571 | d13 = variable | | |
| r14 = 0 | d14 = 2.80 | | |
| r15 = −8.983 | d15 = 0.90 | n 8 = 1.60548 | ν 8 = 60.7 |
| r16 = −19.732 | d16 = 0.20 | | |
| r17 = 44.670 | d17 = 2.90 | n 9 = 1.58547 | ν 9 = 59.4 |
| r18 = −12.686 | d18 = variable | | |
| r19 = 12.589 | d19 = 0.80 | n10 = 1.85504 | ν10 = 23.8 |
| r20 = 7.406 | d20 = 4.70 | n11 = 1.59143 | ν11 = 61.2 |
| r21 = −25.218 | d21 = 1.50 | | |
| r22 = ∞ | d22 = 17.54 | n12 = 1.51825 | ν12 = 64.1 |
| r23 = ∞ | | | |

21st Surface (Diffraction Optical Surface)
C1: 3.78392E-04 C2: −1.79373E-05
Aspherical Surface Coefficients

| Aspherical Surface Coefficients | | | |
|---|---|---|---|
| | k | B | C | D |
| 18th surface | 1.50831D-00 | 1.57643D-04 | 1.32509D-06 | 2.89054D-08 |
| 19th surface | −8.76559D-01 | 4.01143D-05 | 5.66013D-07 | 3.00000D-09 |

| Focal Length Variable Interval | 4.25 | 13.67 | 50.14 |
|---|---|---|---|
| d 6 | 0.68 | 10.30 | 16.71 |
| d 14 | 17.23 | 7.61 | 1.20 |
| d 19 | 8.93 | 5.86 | 8.93 |

NUMERICAL EXAMPLE 11

| f = 4.1~39.93 | | fno = 1.85~2.88 | | 2ω = 60.6°~7.0° | |
|---|---|---|---|---|---|
| r 1 = 14.374 | d 1 = 0.70 | n 1 = 1.84666 | ν 1 = 23.8 |
| r 2 = 9.802 | d 2 = 3.50 | n 2 = 1.77250 | ν 2 = 49.6 |
| r 3 = −577.806 | d 3 = variable | | |
| r 4 = 14.959 | d 4 = 0.50 | n 3 = 1.88300 | ν 3 = 40.8 |
| r 5 = 3.764 | d 5 = 2.19 | | |
| r 6 = −4.896 | d 6 = 0.50 | n 4 = 1.73520 | ν 4 = 41.1 |
| r 7 = 4.881 | d 7 = 1.60 | n 5 = 1.84666 | ν 5 = 23.8 |
| r 8 = −22.491 | d 8 = variable | | |
| r 9 = 7.394 | d 9 = 2.04 | n 6 = 1.58913 | ν 6 = 61.2 |
| r10 = −270.406 | d10 = 0.70 | | |
| r11 = 0.0 (stop) | d11 = variable | | |
| r12 = 8.089 | d12 = 0.50 | n 7 = 1.92286 | ν 7 = 18.9 |
| r13 = 4.912 | d13 = 2.55 | n 8 = 1.66910 | ν 8 = 55.4 |
| r14 = −14.921 | d14 = variable | | |
| r15 = −22.774 | d15 = 0.70 | n 9 = 1.58913 | ν 9 = 61.2 |

-continued

| | | | | | |
|---|---|---|---|---|---|
| r16 = | 18.220 | d16 = | 0.75 | | |
| r17 = | ∞ | d17 = | 3.50 | n10 = 1.51633 | ν10 = 64.2 |
| r18 = | ∞ | | | | |

3rd Surface (Diffraction Optical Surface)
  C1: −8.192E-04  C2: 2.780E-06
  Aspherical Surface Coefficients 6th Surface (Diffraction Optical Surface)

C1: 1.133D-02  C2: −2.092D-04
  Aspherical Surface Coefficients

| | κ | A2 | A3 | A4 | A5 |
|---|---|---|---|---|---|
| 1st surface | −1.931 E − 01 | −1.027 E − 05 | −7.405 E − 08 | 9.386 E − 11 | 0 |
| 10th surface | −5.029 E + 04 | 4.198 E − 04 | 1.749 E − 05 | −1.105 E − 06 | 2.832 D − 08 |
| 14th surface | −7.954 E + 01 | −1.633 E − 03 | 1.916 E − 04 | −9.034 E − 06 | 1.122 D − 07 |
| 15th surface | −5.352 E + 02 | 2.537 E − 03 | −5.526 E − 05 | 0 | 0 |
| 16th surface | 2.121 E + 01 | 6.085 E − 03 | −5.112 E − 04 | 3.689 E − 05 | 0 |

| Focal Length Variable Interval | 4.10 | 13.55 | 39.43 |
|---|---|---|---|
| d 3 | 0.30 | 6.72 | 10.49 |
| d 8 | 10.60 | 4.17 | 0.40 |
| d 11 | 3.85 | 2.09 | 3.60 |
| d 14 | 0.80 | 2.56 | 1.05 |

NUMERICAL EXAMPLE 12

| f = 4.2~40.45 | fno = 1.85~2.99 | 2ω = 59.4°~6.8° | | | |
|---|---|---|---|---|---|
| r 1 = | 13.826 | d 1 = | 0.70 | n 1 = 1.84666 | ν 1 = 23.8 |
| r 2 = | 11.065 | d 2 = | 5.00 | n 2 = 1.69680 | ν 2 = 55.5 |
| r 3 = | −452.289 | d 3 = | variable | | |
| r 4 = | 14.494 | d 4 = | 0.60 | n 3 = 1.83481 | ν 3 = 42.7 |
| r 5 = | 4.259 | d 5 = | 2.45 | | |
| r 6 = | −5.278 | d 6 = | 0.60 | n 4 = 1.70154 | ν 4 = 41.2 |
| r 7 = | −16.464 | d 7 = | variable | | |
| r 8 = | 7.992 | d 8 = | 1.90 | n 5 = 1.48749 | ν 5 = 70.2 |
| r 9 = | −21.479 | d 9 = | 0.70 | | |
| r10 = | 0.000 stop | d10 = | variable | | |
| r11 = | 6.763 | d11 = | 0.50 | n 6 = 1.92286 | ν 6 = 18.9 |
| r12 = | 4.584 | d12 = | 2.53 | n 7 = 1.58913 | ν 7 = 61.2 |
| r13 = | −10.112 | d13 = | variable | | |
| r14 = | −17.242 | d14 = | 0.70 | n 8 = 1.66910 | ν 8 = 55.2 |
| r15 = | 36.396 | d15 = | 0.75 | | |
| r16 = | ∞ | d16 = | 3.50 | n 9 = 1.51633 | ν 9 = 64.2 |
| r17 = | ∞ | | | | |

3rd Surface (Diffraction Optical Surface)
  C1: −1.422D-03  C2: 7.878D-06

| | κ | A2 | A3 | A4 | A5 |
|---|---|---|---|---|---|
| 1st surface | −2.420 E − 01 | −5.543 E − 06 | −1.131 E − 08 | 0 | 0 |
| 5th surface | −1.365 E + 00 | 2.154 E − 03 | 5.464 E − 05 | 1.249 E − 06 | 0 |
| 8th surface | 4.818 E − 02 | −6.609 E − 04 | 2.470 E − 06 | −5.911 E − 07 | 1.261 E − 08 |
| 13th surface | −1.891 E + 01 | −7.086 E − 04 | 3.815 E − 05 | 1.338 E − 06 | −2.642 E − 07 |
| 14th surface | −1.588 E + 02 | 3.217 E − 03 | −2.359 E − 04 | 2.097 E − 05 | 0 |
| 15th surface | 1.259 E + 02 | 6.517 E − 03 | −6.629 E − 04 | 6.746 E − 05 | 0 |

| Focal Length Variable Interval | 4.20 | 14.11 | 40.45 |
|---|---|---|---|
| d 3 | 0.50 | 6.64 | 10.25 |
| d 7 | 10.15 | 4.01 | 0.40 |
| d 10 | 3.77 | 2.25 | 4.27 |
| d 13 | 1.29 | 2.81 | 0.80 |

NUMERICAL EXAMPLE 13

| f = 4.2~40.5 | fno = 1.85~2.49 | 2ω = 59.4°~6.8° | | | |
|---|---|---|---|---|---|
| r 1 = 13.754 | d 1 = 0.70 | n 1 = 1.92286 | ν 1 = 18.9 | | |
| r 2 = 11.371 | d 2 = 5.00 | n 2 = 1.69680 | ν 2 = 55.5 | | |
| r 3 = −211.575 | d 3 = variable | | | | |
| r 4 = 20.358 | d 4 = 0.60 | n 3 = 1.77250 | ν 3 = 49.6 | | |
| r 5 = 4.214 | d 5 = 2.45 | | | | |
| r 6 = −5.679 | d 6 = 0.60 | n 4 = 1.69680 | ν 4 = 55.5 | | |
| r 7 = −21.595 | d 7 = variable | | | | |
| r 8 = 6.726 | d 8 = 1.90 | n 5 = 1.48749 | ν 5 = 70.2 | | |
| r 9 = −31.399 | d 9 = 0.70 | | | | |
| r10 = 0.000 stop | d10 = variable | | | | |
| r11 = 6.867 | d11 = 0.50 | n 6 = 1.92286 | ν 6 = 18.9 | | |
| r12 = 4.561 | d12 = 2.53 | n 7 = 1.58913 | ν 7 = 61.2 | | |
| r13 = −10.057 | d13 = variable | | | | |
| r14 = −22.875 | d14 = 0.70 | n 8 = 1.67790 | ν 8 = 55.3 | | |
| r15 = 23.777 | d15 = 0.75 | | | | |
| r16 = ∞ | d16 = 3.50 | n 9 = 1.51633 | ν 8 = 64.2 | | |
| r17 = ∞ | | | | | |

3rd Surface (Diffraction Optical Surface)
  C1: −1.245E-03 C2: 4.892E-06
6th Surface (Diffraction Optical Surface)
  C1: 9.554E-03 C2: −2.280E-04
Aspherical Surface Coefficients

| | κ | A2 | A3 | A4 | A5 |
|---|---|---|---|---|---|
| 3rd surface | −1.793 E + 00 | 2.744 E − 03 | 4.827 E − 05 | 3.710 E − 06 | 0 |
| 5th surface | −2.860 E − 01 | −6.279 E − 04 | 9.860 E − 06 | −5.934 E − 07 | −2.989 E − 09 |
| 13th surface | −2.104 E + 01 | −8.820 E − 04 | 7.450 E − 05 | 3.597 E − 06 | −7.076 E − 07 |
| 14th surface | −1.499 E + 02 | 1.357 E − 03 | −3.704 E − 04 | 1.535 E − 05 | 0 |
| 15th surface | −1.078 E + 02 | 4.624 E − 03 | −9.464 E − 04 | 6.670 E − 05 | 0 |

| Focal Length Variable Interval | 4.20 | 14.05 | 40.50 |
|---|---|---|---|
| d 3 | 0.50 | 6.54 | 10.09 |
| d 7 | 9.99 | 3.95 | 0.40 |
| d 10 | 3.96 | 2.31 | 4.26 |
| d 13 | 1.23 | 2.88 | 0.92 |

TABLE 1

| | Numerical Examples | |
|---|---|---|
| Condition | 1 | 2 |
| (10)|f4[(1/f4d) − (1/f4d')]| | $3.1 \times 10^{-3}$ | $9.87 \times 10^{-3}$ |
| (11)|0.5797 · C1+Σ(1/(f4i·y1i))|·f1 | $5.69 \times 10^{-3}$ | $7.36 \times 10^{-3}$ |
| (12) F4/F3 | 1.02 | 0.518 |

| | Numerical Examples | | |
|---|---|---|---|
| Condition | 3 | 4 | 5 |
| (13)|f1n/f1| | 2.118 | 3.826 | 4.348 |
| (14)βS | 1.428 | 1.336 | 1.331 |
| (15) (Rb+Ra)/(Rb−Ra) | — | 1.944 | 1.713 |
| (16) |0.5797 · C1+Σ(1/(f1i · y1i))|· f1 | $1.688 \times 10^{-3}$ | $3.777 \times 10^{-3}$ | $3.274 \times 10^{-3}$ |
| (17)|f2/√fW·fT| | 0.285 | 0.276 | 0.268 |

Figure 36:
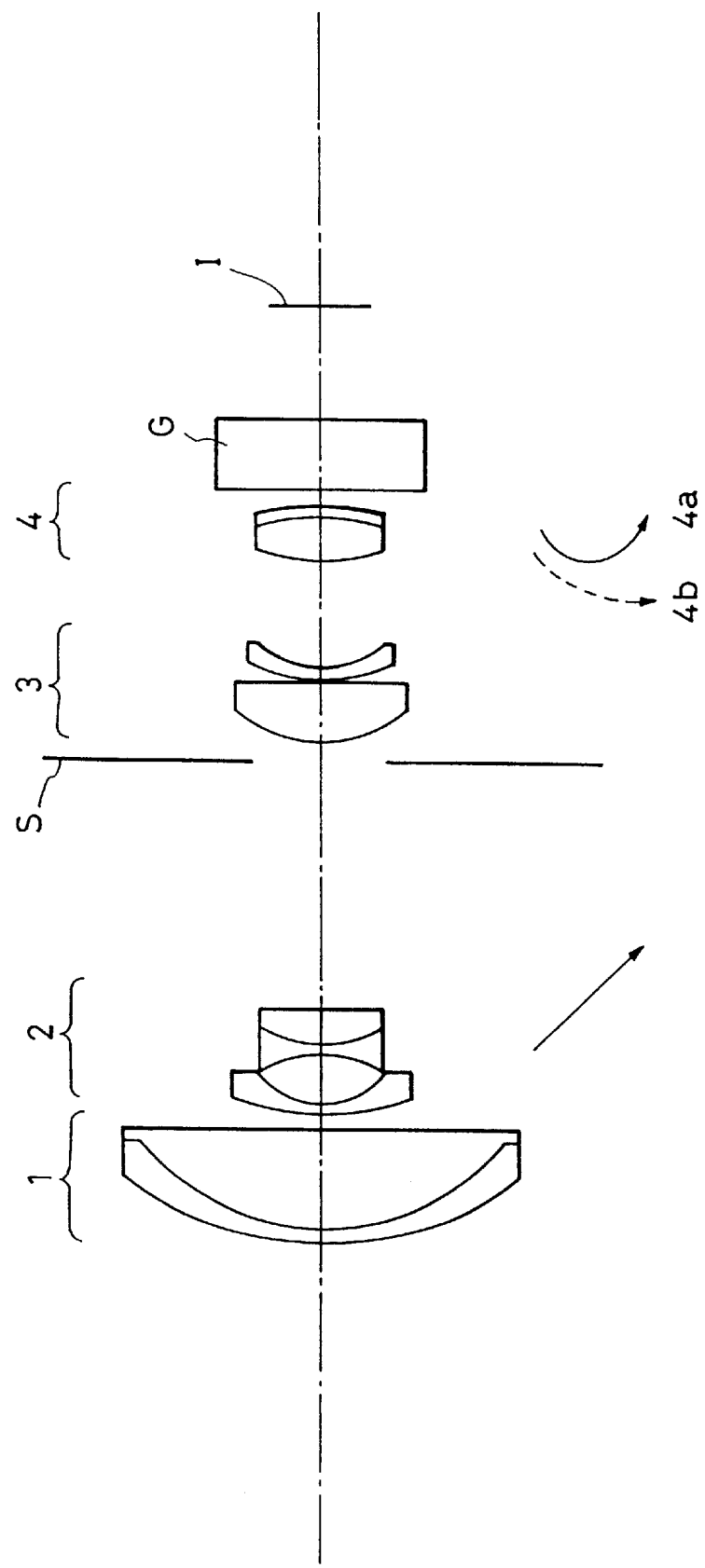
FIG. 36 is a section of a zoom lens device of Numerical Example 14 in accordance with the present invention.
Figure 37:
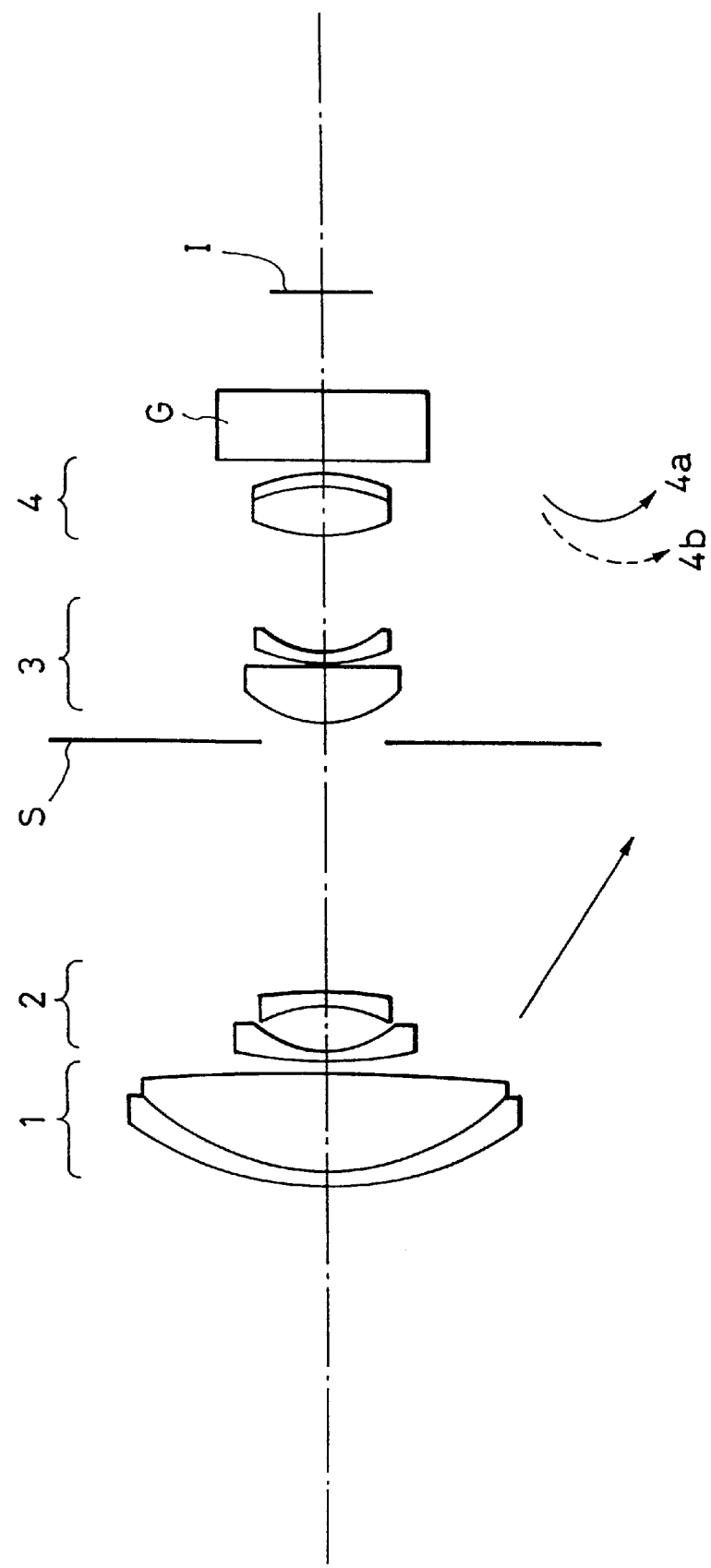
FIG. 37 is a section of a zoom lens device of Numerical Example 15 in accordance with the present invention.
Figure 38:
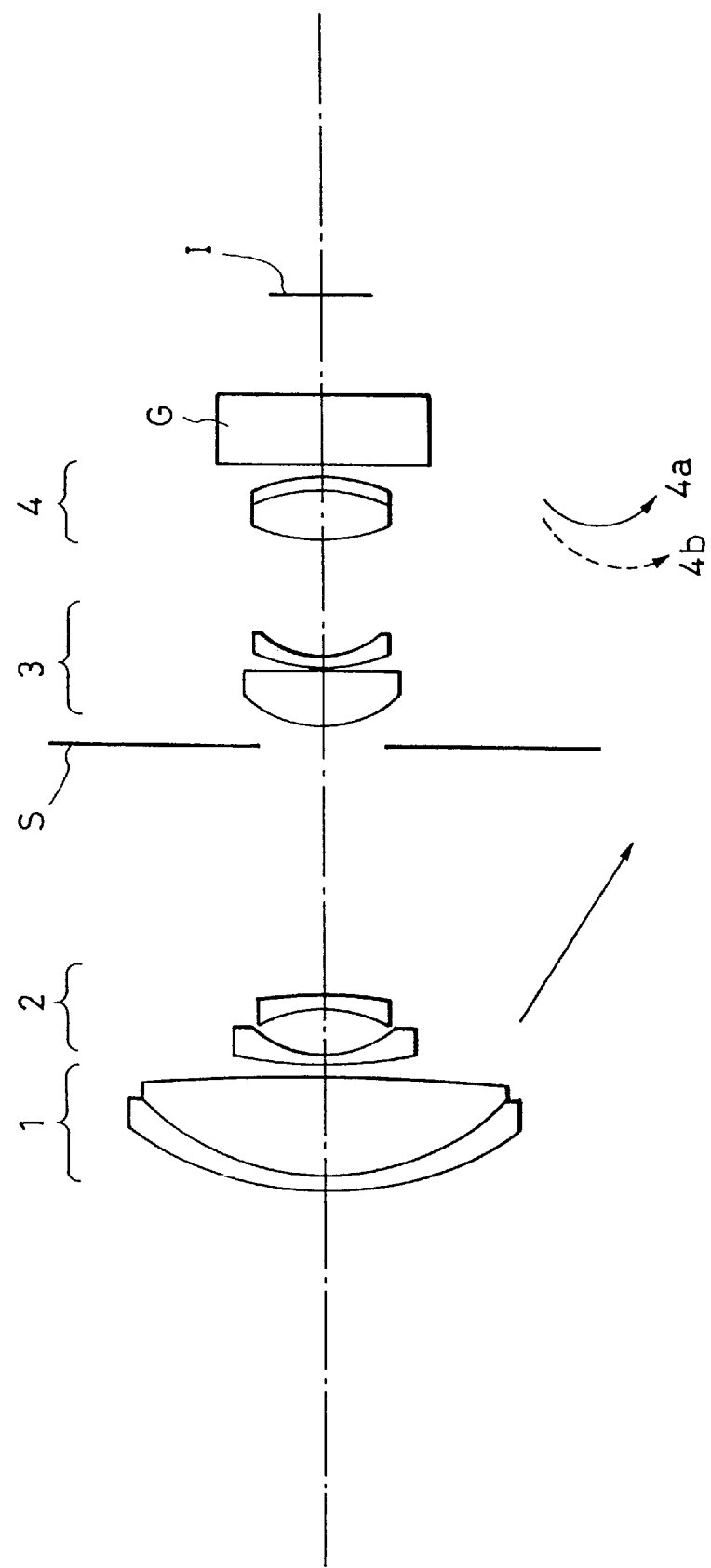
FIG. 38 is a section of a zoom lens device of Numerical Example 16 in accordance with the present invention.

FIGS. 36 to 38 are sections each showing the arrangement of the lenses at the wide angle end in the zoom lens devices of Numerical Examples 14 to 16. FIGS. 39A(1) to 41C(4) are graphs each showing the various aberrations of the zoom lens devices of Numerical Examples 14 to 16. In the figures illustrating the aberrations, the "A figures" illustrate the aberrations at the wide angle end, the "B figures" illustrate the aberrations at the intermediate stage between the wide angle end and the telephoto end, and the "C figures" illustrate the aberrations at the telephoto end. Numerical Examples 14 to 16 are Group F Numerical Examples that are modifications of the Group A and Group E Numerical Examples, in which a surface of a lens of the stationary first lens unit is formed into a diffraction optical surface.

A description will now be given of the structures of the zoom lens devices of the Group F Numerical Examples of FIGS. 36 to 38. The zoom lens devices of the Group F Numerical Examples each comprise in order of lenses closest to the object side a first lens unit 1 with a positive refractive power, a second lens unit 2 with a negative refractive power, a third lens unit 3 with a positive refractive power, and a fourth lens unit 4 with a positive refractive power. When the magnification is being changed from the wide angle end to the telephoto end, the second lens unit 2 is moved toward the image plane side, and the fourth lens unit 4 is moved in the direction of either of the arrows in order to correct changes in the image plane that occur as the magnification changes. Reference character S denotes a stop, reference character G denotes a color separating optical system or a faceplate, and reference character I denotes an image plane.

Rear focusing is used to perform focusing by moving the fourth lens unit on the optical axis. In the same figures, each fourth lens unit moves in a path indicated by a solid curve 4a to correct the changes that occur in the image plane as magnification changes from the wide angle end to the telephoto end when an object at infinity is being focused, whereas each fourth lens moves in a path indicated by a dotted curve 4b to correct the changes that occur in the image plane as magnification changes from the wide angle end to the telephoto end when a nearby object is being focused.

Although in the numerical examples the first lens unit 1 and the third lens unit 3 are stationary during changes in magnification and focusing, at least the first lens 1 may be moved in order to reduce the extent to which the second lens unit 2 is involved in changing the magnification.

In the numerical examples, the fourth lens unit 4 is moved to correct changes in the image plane that occur as the magnification changes as well as to perform focusing. During changes in the magnification from the wide angle end to the telephoto end, the fourth lens is moved in the paths curving toward the object side as indicated by the curved arrows 4a and 4b. This allows effective use of the space between the third lens unit 3 and the fourth lens unit, as a result of which the overall length of the lens system is effectively reduced.

In the numerical examples, the first lens unit 1 is formed in a two lens structure containing a negative meniscus lens and a biconcave lens, with at least one of the surfaces, more specifically the surface closest to the image plane side, being formed into a diffraction optical surface. Properly setting the phase at the first lens unit 1 reduces chromatic aberration of the first lens unit 1 and properly corrects chromatic aberration over the entire magnification change-over range.

A first lens unit with only a positive lens having a diffraction optical surface can reduce chromatic aberration when it is to correct chromatic aberration for only two wavelengths of, for example, the d line and the g line. However, since the diffraction optical element has abnormal dispersion properties, chromatic aberration for the wavelengths other than the two wavelengths, particularly at the telephoto end, or the so-called secondary spectrum becomes large, thus making it difficult to properly correct chromatic aberration within the visible light wavelength range.

When an attempt is made to correct chromatic aberration using only the refractive surface, so that a diffraction optical surface is not used, the refractive powers of the positive lens and the negative lens for correcting chromatic aberration become strong. Thus, it becomes difficult to correct chromatic aberration using only two single lenses, a positive lens and a negative lens, for the first lens unit, while maintaining the refractive powers thereof.

In order to make the diffraction optical surface take part in correcting the chromatic aberration of the first lens unit, it is desirable that the diffraction optical surface have a positive refractive power. If the diffraction optical surface has a negative refractive power, the amount of aberration of an ordinary refractive optical system and the amount of aberration of the diffractive optical surface become the same, so that the diffraction optical surface is not effective in correcting chromatic aberration, thus preventing the chromatic aberration from being sufficiently corrected over the entire area of the optical system.

In order to use fewer lenses to correct chromatic aberration of the first lens unit, it is preferable that the following Condition (13) be satisfied:

$$1.9 < |f1n/f1| < 5 \qquad (13)$$

where f1 and f1n are the focal length of the entire first lens unit L1 and the focal length of its negative lens, respectively.

When the ratio becomes less than the lower limit of Condition (13), and the refractive power of the negative lens becomes too strong, the refractive power of the positive lens also becomes strong, which increases the curvature thereof, thus making it difficult to form the first lens unit using two lenses. On the other hand, when the refractive power of the negative lens becomes too weak, the diffraction optical surface corrects chromatic aberration excessively, so that there is considerable deterioration in the optical performance due to secondary spectrum.

It is preferable that the range of Condition (13) be narrowed down as follows:

$$1.9 < |f1n/f1| < 4.5 \qquad (13')$$

In order to sufficiently correct various aberrations, such as spherical aberration, coma, or distortion, over the entire magnification change-over range, it is necessary to correct such aberrations as spherical aberration, coma, and distortion of the first lens unit 1. This may be achieved by forming at least one of the lens surfaces of the first lens unit 1 into an aspherical surface.

In Numerical Examples 14 and 15, forming the lens surface of the first lens unit closest to the object side into an aspherical surface allows proper correction of spherical aberration or coma occurring particularly at the telephoto end. Forming the aspherical shape of the first lens unit such that its positive refractive power becomes weaker toward the peripheral portion is effective in correcting spherical aberration or coma.

In Numerical Example 14, the second lens unit is composed of two negative lenses and one positive lens in order to properly correct such aberrations as chromatic aberration of the second lens unit. In addition, it is preferable that the second lens unit comprise, in order of lenses from the object side, a negative meniscus lens with its highly concave surface facing the image side, a biconcave lens, and a positive lens with its highly concave surface facing the object side.

In the numerical example, the lens surface of the third lens unit 3 closest to the object side and the lens surface of the fourth lens unit 4 closest to the object side are formed into aspherical surfaces.

In Numerical Examples 15 and 16, the second lens unit comprises two negative lenses, and the image plane side lens surface of the object side lens of the second lens unit 2 is formed into an aspherical surface.

In addition, the lens surface of the first lens unit closest to the object side and the object side lens surface of the image plane side lens of the second lens unit are formed into diffraction optical surfaces, so that chromatic aberration of the second lens unit 2 is corrected with the use of a few lenses, thereby reducing chromatic aberration over the entire magnification change-over range. Further, since the second lens unit 2 comprises only two lenses, the overall length of the lens system can be reduced.

Making the diffraction optical surface of the second lens unit have a negative refractive power is effective in correcting chromatic aberration in the second lens unit 2. When the diffraction optical surface is formed in only the second lens unit 2, chromatic aberration for two wavelengths can be corrected, but secondary spectrum is difficult to correct.

The effects of color secondary spectrum occurring in the second lens unit can be canceled to properly correct chromatic aberration over the entire magnification change-over range as well as over the entire visible wavelength range by forming the first lens unit into a two lens structure containing a positive lens and a negative lens and including a diffraction optical element surface, as mentioned above.

In Numerical Examples 15 and 16, in order to correct distortion or astigmatism occurring in the second lens unit and to prevent changes in such aberrations resulting from changes in the magnification, it is preferable that the second lens unit be formed from the object side, a meniscus negative lens with its highly concave surface facing the image plane side and a meniscus negative lens with its highly concave surface facing the object side.

It is preferable that the following Condition (15) be satisfied:

$$1 < (Rb+Ra)/(Rb-Ra) < 2.5 \quad (15)$$

where Ra and Rb are, respectively, the radius of curvature of the object side surface of the image side negative lens of the second lens unit 2 and the radius of curvature of the image side lens surface (in the case where the surface is an aspherical surface, it is the reference spherical surface determined by the on-axis and effective diameter).

When the value becomes less than the lower limit of Condition (15), distortion at the wide angle end becomes too negative, whereas when the value becomes greater than the upper limit of Condition (15), distortion at the telephoto end cannot be completely corrected.

It is preferable that the range of Condition (15) be narrowed down as follows:

$$1 < (Rb+Ra)/(Rb-Ra) < 2 \quad (15')$$

When, as in Numerical Examples 15 and 16, the second lens unit has at least one aspherical surface independently of the diffraction optical element surface, or the base lens surface of the diffraction optical element surface is formed into an aspherical surface, the optical performance is further improved.

In order to sufficiently correct chromatic aberration at the first lens unit 1, it is desirable that the following Condition (16) be satisfied:

$$|0.5797 \cdot C11 + \Sigma(1/(f1i \cdot v1i)| \cdot f1 < 4.5 \times 10^{-3} \quad (16)$$

where f1i and v1i (i=1, 2) are, respectively, the focal length and the Abbe number of the two lenses of the first lens unit, and C11 is a coefficient of a second order term of Formula (1) of the diffraction optical surface of the first lens unit 1.

Condition (16) is the condition for sufficiently correcting chromatic aberration for the first lens unit 1 as a result of the combined chromatic aberration correcting effects of the refractive optical surface and the diffraction optical surface. When the value falls outside the range of Condition (16), chromatic aberration of the first lens unit 1 is not sufficiently corrected.

It is preferable that the range of Condition 16 be narrowed down as follows:

$$(|0.5797 \cdot C11 + \Sigma(1/f1iv1i| \cdot f1 < 0.02)) \quad (16')$$

In the numerical examples, in order to reduce the overall length of the lens system of the zoom section by reducing the extent to which the second lens unit 2 moves, it is preferable that the following Condition (17) be satisfied:

$$0.2 < |f2/(Fw \cdot Ft)^{1/2}| < 0.3 \quad (17)$$

where f2 is the focal length of the second lens unit 2, Fw is the focal length of the entire lens system at the wide angle end, and Ft is the focal length of the entire lens system at the telephoto end.

Condition (17) is related to the refractive power of the second lens unit and is the condition for effectively obtaining a predetermined magnification change-over ratio, while reducing changes in aberrations occurring as the magnification changes. When the value becomes smaller than the lower limit and the refractive power of the second lens unit becomes too strong, the lens system can be made smaller, but the Petzval sum increases in the negative direction, increasing the curvature of field as well as changes in aberration that occur as the magnification changes. In contrast, when the value becomes greater than the upper limit, the amount of movement of the second lens becomes too large, so that the overall length of the lens system increases.

It is preferable that the range of Condition (17) be narrowed down as follows:

$$0.25 < |f2/(Fw \cdot Ft)^{1/2}| < 0.3 \quad (17')$$

The numerical data of the Numerical Examples 14 to 16 are given below. The symbols mean the same as the symbols of Numerical Examples 1 to 13.

NUMERICAL EXAMPLE 14

| f = 4.19000~41.78 | | fno = 1:1.85~2.37 | | 2ω = 59.6°~6.6° | |
|---|---|---|---|---|---|
| r1 = 14.921 | (aspherical surface) | d1 = 0.70 | n1 = 1.84666 | v1 = 23.8 |
| r2 = 11.300 | | d2 = 4.90 | n2 = 1.69680 | v2 = 55.5 |
| r3 = −263.343 | (diffraction surface) | d3 = variable | | |
| r4 = 11.229 | | d4 = 0.50 | n3 = 1.83481 | v3 = 42.7 |
| r5 = 3.919 | | d5 = 2.44 | | |
| r6 = −5.438 | | d6 = 0.50 | n4 = 1.67003 | v4 = 47.3 |
| r7 = 5.605 | | d7 = 1.80 | n5 = 1.84666 | v5 = 23.8 |
| r8 = 350.015 | | d8 = variable | | |
| r9 = 0.000 | (stop) | d9 = 1.00 | | |
| r10 = 5.130 | (aspherical surface) | d10 = 3.02 | n6 = 1.58313 | v6 = 59.4 |
| r11 = −2039.298 | | d11 = 0.08 | | |
| r12 = 7.029 | | d12 = 0.55 | n7 = 1.84666 | v7 = 23.8 |
| r13 = 4.337 | | d13 = variable | | |
| r14 = 8.962 | (aspherical surface) | d14 = 2.09 | n8 = 1.58313 | v8 = 59.4 |
| r15 = −9.351 | | d15 = 0.50 | n9 = 1.84666 | v9 = 23.8 |

-continued

| | | |
|---|---|---|
| r16 = −15.459 | d16 = 0.75 | |
| r17 = ∞ | d17 = 3.27 | n10 = 1.51633   ν10 = 64.2 |
| r18 = ∞ | | |

Aspherical Surface Coefficients

| | | | |
|---|---|---|---|
| 1st surface | κ = −5.34084 × 10$^{-1}$ | A2 = 6.74185 × 10$^{-6}$ | A3 = −9.64841 × 10$^{-9}$ |
| | A4 = 2.43360 × 10$^{-10}$ | A5 = 0.00000 × 10$^{0}$ | |
| 10th surface | κ = −1.31216 × 10$^{0}$ | A2 = 4.96251 × 10$^{-4}$ | A3 = −2.61862 × 10$^{-7}$ |
| | A4 = 3.09567 × 10$^{-8}$ | A5 = 1.87661 × 10$^{-9}$ | |
| 14th surface | κ = −1.97016 × 10$^{-1}$ | A2 = −2.58615 × 10$^{-4}$ | A3 = 2.43614 × 10$^{-3}$ |
| | A4 = 4.02213 × 10$^{-3}$ | A5 = −1.92905 × 10$^{-8}$ | |

Phase Coefficients

| | | |
|---|---|---|
| 3rd surface | C1 = −6.49067 × 10$^{-4}$ | C2 = 3.43622 × 10$^{-6}$ |

| | | | |
|---|---|---|---|
| f | 4.19 | 4.07 | 41.78 |
| d3 | 0.52 | 7.32 | 11.66 |
| d8 | 11.95 | 5.15 | 0.80 |
| d13 | 5.45 | 2.36 | 5.37 |

NUMERICAL EXAMPLE 15

| f = 4.19000~41.75 | | fno = 1:1.85~2.45 | | 2ω = 59.6°~6.6° | |
|---|---|---|---|---|---|
| r1 = 16.059 | (aspherical surface) | d1 = 0.70 | | n1 = 1.84666 | ν1 = 23.8 |
| r2 = 12.399 | | d2 = 0.10 | | | |
| r3 = 12.343 | | d3 = 4.60 | | n2 = 1.69680 | ν2 = 55.5 |
| r4 = −115.928 | (diffraction surface) | d4 = variable | | | |
| r5 = 20.044 | | d5 = 0.50 | | n3 = 1.83481 | ν3 = 42.7 |
| r6 = 4.936 | (aspherical surface) | d6 = 2.20 | | | |
| r7 = −6.451 | (diffraction surface) | d7 = 0.70 | | n4 = 1.60311 | ν1 = 60.7 |
| r8 = −26.325 | | d8 = variable | | | |
| r9 = 0.000 | (stop) | d9 = 1.00 | | | |
| r10 = 4.702 | (aspherical) | d10 = 2.70 | | n5 = 1.58313 | ν5 = 59.4 |
| r11 = −254.183 | | d11 = 0.08 | | | |
| r12 = 7.971 | | d12 = 0.55 | | n6 = 1.84666 | ν6 = 23.8 |
| r13 = 4.274 | | d13 = variable | | | |
| r14 = 7.324 | (aspherical surface) | d14 = 2.40 | | n7 = 1.48749 | ν7 = 70.2 |
| r15 = −7.852 | | d15 = 0.50 | | n8 = 1.84666 | ν8 = 23.8 |
| r16 = −9.884 | | d16 = 0.75 | | | |
| r17 = ∞ | | d17 = 3.27 | | n9 = 1.51633 | ν9 = 64.2 |
| r18 = ∞ | | | | | |

Aspherical Surface Coefficients

| | | | |
|---|---|---|---|
| 1st surface | κ = −7.63654 × 10$^{-1}$ | A2 = 8.96265 × 10$^{-6}$ | A3 = 3.99567 × 10$^{-9}$ |
| | A4 = 0.00000 × 10$^{0}$ | A5 = 0.00000 × 10$^{0}$ | |
| 6th surface | κ = −1.93285 × 10$^{-1}$ | A2 = 1.97008 × 10$^{-4}$ | A3 = 1.76009 × 10 |
| | A4 = 0.00000 × 10$^{0}$ | A5 = 0.00000 × 10$^{0}$ | |
| 10th surface | κ = −1.23635 × 10$^{0}$ | A2 = 5.72033 × 10$^{-4}$ | A3 = 4.16392 × 10$^{-6}$ |
| | A4 = −4.05099 × 10$^{-7}$ | A5 = 1.41200 × 10$^{-8}$ | |
| 14th surface | κ = −2.64097 × 10$^{0}$ | A2 = −5.22539 × 10$^{-5}$ | A3 = 2.27981 × 10 |
| | A4 = −1.19783 × 10$^{-6}$ | A5 = 2.91817 × 10$^{-8}$ | |

Phase Coefficients

| 4th surface | $=-1.13061 \cdot 10^{-3}$ | $=6.25966 \cdot 10^{-6}$ |
| --- | --- | --- |
| 7th surface | $=-8.67646 \cdot 10^{-3}$ | $=-1.66169 \cdot 10^{-4}$ |
| f | 4.19 | 13.50 | 41.75 |
| d4 | 0.50 | 7.32 | 11.68 |
| d8 | 12.00 | 5.18 | 0.82 |
| d13 | 5.67 | 3.44 | 7.53 |

NUMERICAL EXAMPLE 16

| f = 4.19000~41.75 | | fno = 1:1.85~2.44 | | 2ω~59.6°~6.6° | |
| --- | --- | --- | --- | --- | --- |
| r1 = 15.784 | | d1 = 0.70 | n1 = 1.84666 | ν1 = 23.8 |
| r2 = 12.311 | | d2 = 0.10 | | |
| r3 = 12.308 | | d3 = 4.60 | n2 = 1.69680 | ν2 = 55.5 |
| r4 = −110.908 | (diffraction surface) | d4 = variable | | |
| r5 = 17.955 | | d5 = 0.50 | n3 = 1.83481 | ν3 = 42.7 |
| r6 = 4.856 | (aspherical surface) | d6 = 2.20 | | |
| r7 = −6.316 | (diffraction surface) | d7 = 0.70 | n4 = 1.60311 | ν4 = 60.7 |
| r8 = −31.296 | | d8 = variable | | |
| r9 = 0.000 | (stop) | d9 = 1.00 | | |
| r10 = 4.743 | (aspherical surface) | d10 = 2.70 | n5 = 1.58313 | ν5 = 59.4 |
| r11 = 516.605 | | d11 = 0.08 | | |
| r12 = 7.272 | | d12 = 0.55 | n6 = 1.84666 | ν6 = 23.8 |
| r13 = 4.165 | | d13 = variable | | |
| r14 = 7.478 | (aspherical surface) | d14 = 2.40 | n7 = 1.48749 | ν7 = 70.2 |
| r15 = −7.398 | | d15 = 0.50 | n8 = 1.84666 | ν8 = 23.8 |
| r16 = −9.458 | | d16 = 0.75 | | |
| r17 = ∞ | | d17 = 3.27 | n9 = 1.51633 | ν9 = 64.2 |
| r18 = ∞ | | | | |

Aspherical Surface Coefficients

| 1st surface | $\kappa = -1.97516 \times 10^2$ | $A2 = 1.81711 \times 10^{-5}$ | $A3 = -7.53338 \times 10^{-9}$ |
| --- | --- | --- | --- |
| | $A4 = -1.04227 \times 10^{-10}$ | $A5 = 0.00000 \times 10^0$ | |
| 6th surface | $\kappa = -7.82659 \times 10^{-1}$ | $A2 = 6.74067 \times 10^{-4}$ | $A3 = 5.62605 \times 10^{-5}$ |
| | $A4 = 0.00000 \times 10^0$ | $A5 = 0.00000 \times 10^0$ | |
| 10th surface | $\kappa = -1.29090 \times 10^0$ | $A2 = 6.39965 \times 10^{-4}$ | $A3 = 3.53800 \times 10^{-6}$ |
| | $A4 = -1.82729 \times 10^{-8}$ | $A5 = 1.82729 \times 10^{-8}$ | |
| 14th surface | $\kappa = -3.70606 \times 10^0$ | $A2 = 2.46517 \times 10^{-4}$ | $A3 = 1.39476 \times 10^{-5}$ |
| | $A4 = -1.20129 \times 10^{-6}$ | $A5 = 1.76827 \times 10^{-9}$ | |

Phase Coefficients

| 4th surface | $=-1.10208 \cdot 10^{-3}$ | $=4.86972 \cdot 10^{-6}$ |
| --- | --- | --- |
| 7th surface | $=8.20287 \cdot 10^{-3}$ | $=-2.26796 \cdot 10^{-4}$ |

| | Focus Length | | |
| --- | --- | --- | --- |
| f | 4.19 | 13.60 | 41.75 |
| d4 | 0.46 | 7.20 | 11.51 |

-continued

| | Focus Length | | |
| --- | --- | --- | --- |
| d8 | 11.87 | 5.13 | 0.82 |
| d13 | 5.52 | 3.24 | 7.36 |

The following table shows the relationships between the Conditions (13), (15), (16), and (17) and the Numerical Examples 14 to 16.

| | Numerical Example 14 | Numerical Example 15 | Numerical Example 16 |
| --- | --- | --- | --- |
| Condition (13) | 2.844 | 3.410 | 3.479 |
| Condition (15) | | 1.649 | 1.506 |
| Condition (16) | $9.64 \cdot 10^{-3}$ | $1.062 \cdot 10^{-2}$ | $1.078 \cdot 10^{-2}$ |
| Condition (17) | 0.296 | 0.323 | 0.318 |

Figure 42:
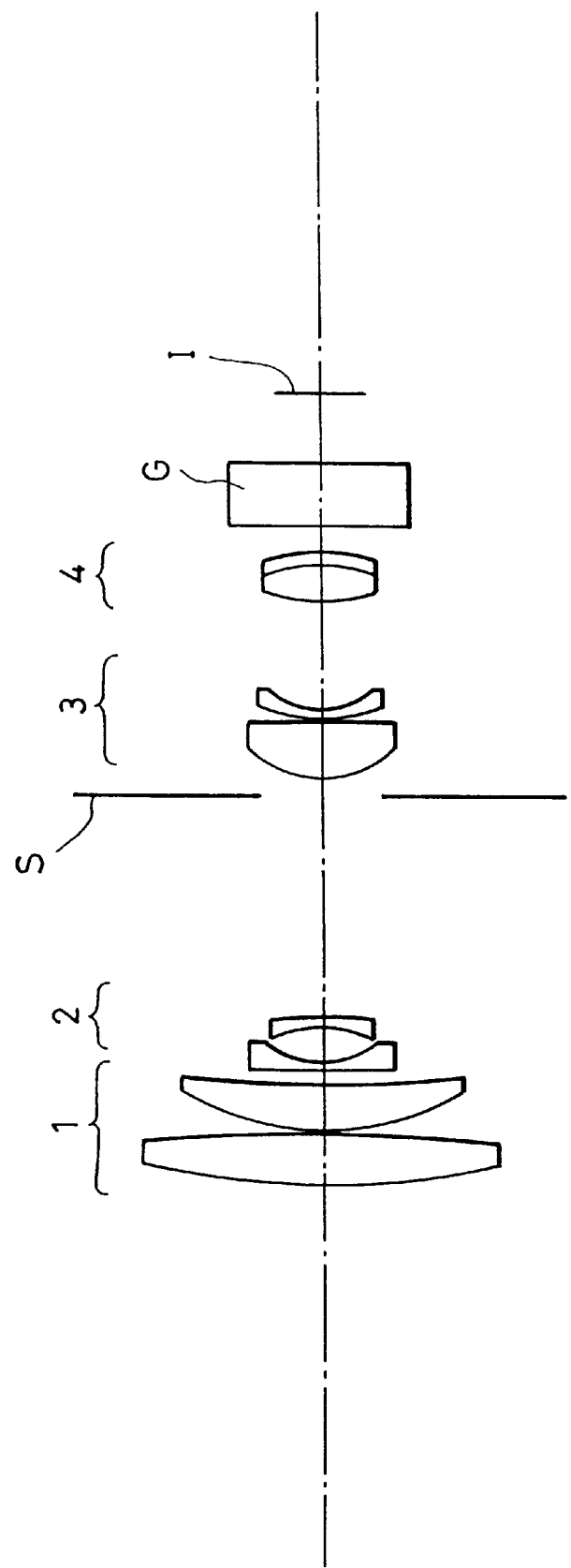
FIG. 42 is a section of a zoom lens device of Numerical Example 17 in accordance with the present invention.
Figure 43:
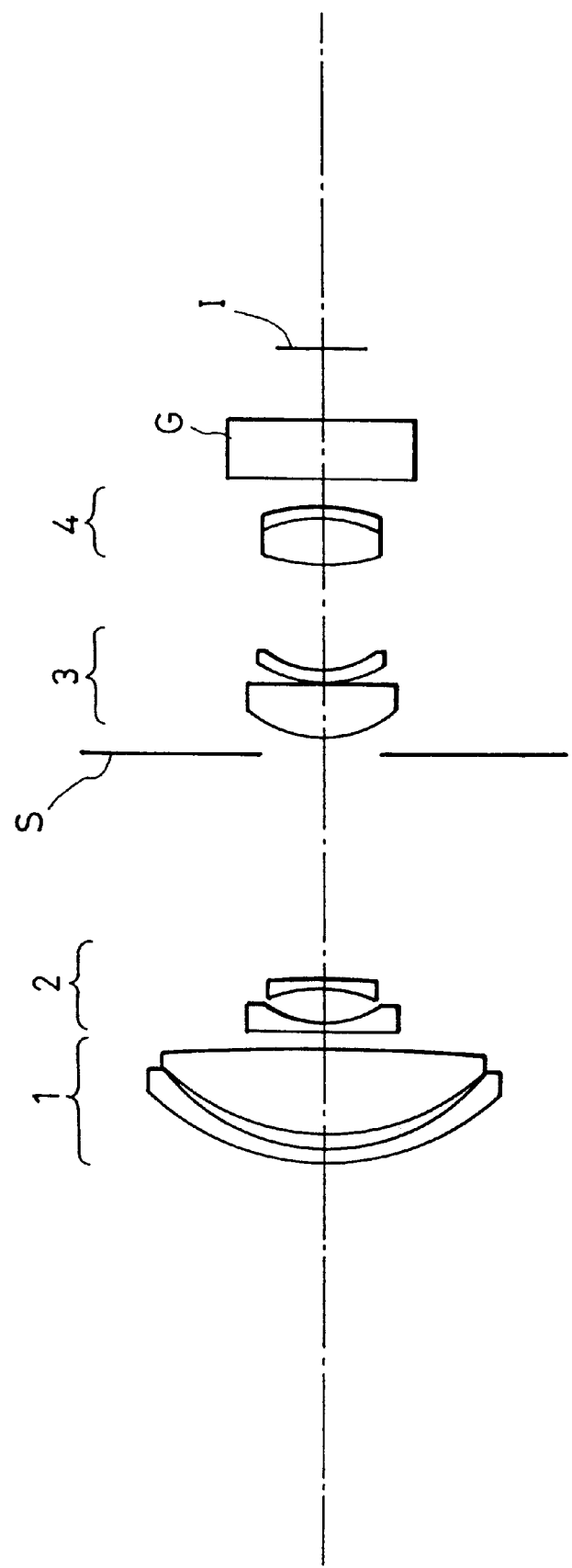
FIG. 43 is a section of a zoom lens device of Numerical Example 18 in accordance with the present invention.

FIGS. 42 and 43 are sections each showing the arrangement of the lenses at the wide angle end in the zoom lens devices of Numerical Examples 17 to 18. FIGS. 44A(1) to 45B(4) are graphs each showing the various aberrations of the zoom lens devices of Numerical Examples 17 to 18. In the figures illustrating the aberrations, the "A figures" illustrate the aberrations at the wide angle end, the "B figures" illustrate the aberrations at the intermediate stage between the wide angle end and the telephoto end, and the "C figures" illustrate the aberrations at the telephoto end. Numerical Examples 17 to 18 are Group G Numerical Examples, in which a lens surface of the stationary first lens unit and a lens surface of a second lens unit used for changing the magnification are formed into diffraction optical surfaces.

A description will now be given of the structures of the zoom lens devices of the Group G Numerical Examples of FIGS. 42 and 43. The zoom lens devices each comprises from the object side a magnification change-over lens group containing a first lens unit 1 and a second lens unit 2, a stop S, a third lens unit, and an image forming group containing lens units from a fourth lens unit onwards. The first lens unit 1 is stationary during zooming and has a positive refractive power. The second lens unit is movable during zooming and has a negative refractive power. The third lens unit has a positive refractive power. When the magnification is being changed from the wide angle end to the telephoto end, the second lens unit 2 is moved toward the image plane side, and lens units from the fourth lens unit onwards are used to correct changes in the image plane that occur as the magnification changes. In such zoom lens devices, the first lens unit 1 and the second lens unit 2 each have a diffraction optical surface which is rotationally symmetrical to the optical axis of its corresponding lens unit.

In Numerical Example 17, the first lens unit comprises two positive lenses, with the image plane side lens surface of the object side lens thereof formed into a diffraction optical surface. The second lens unit 2 comprises two negative lenses, with the object side lens surface of the image plane side lens formed into a diffraction optical surface. The lens surfaces of the third lens unit 3 and the fourth lens unit 4 which are closest to the object side are formed into aspherical surfaces.

In Numerical Example 18, the first lens unit 1 comprises a negative lens and a positive lens, with the image plane side lens surface of the image plane side lens being formed into a diffraction optical surface. The second lens unit 2 comprises two positive lenses. The lens surface of the third lens unit 3 closest to the object side is formed into an aspherical surface, while the lens surface of the fourth lens unit 4 closest to the object side is formed into a diffraction optical surface and an aspherical surface.

In these numerical examples, the third lens unit 3 is a stationary positive lens during zooming involving the stop. The fourth lens unit 4 is used for correcting changes in the image plane that occur as the magnification changes and preferably also used for distance matching.

In another structure of the first lens unit, there may be two positive lenses, as in the aforementioned Numerical Example 17, and at least one plate with a diffraction optical surface, which is disposed in the front or back of the positive lenses or therebetween.

In still another structure of the first lens unit, there may be two lenses, a positive lens and a negative lens, or a negative lens and a positive lens, with a surface of any one of the lenses formed into a diffraction optical element surface. Here, the positive lens and the negative lens may be adhered together. In this case, the chromatic aberration is corrected by the adhered lenses, so that it is necessary to increase the positive refractive power of the diffraction optical element.

In another structure of the second lens unit, there may be two negative lenses, as in Numerical Examples 17 and 18, and at least one plate with a diffraction optical surface, which is disposed in the front or back of the lenses or therebetween.

In still another structure of the second lens unit 2, there may be two lenses, a positive lens and a negative lens, or a negative lens and a positive lens, with a surface of any one of the lenses formed into a diffraction optical element surface.

In all of the above cases, it is preferable not to form the lens surface closest to the object side into a diffraction optical surface, except for the special case where aberration must inevitably be corrected. This is because the diffraction optical element, which includes narrow grooves in the order of, for example, a few $\mu$m or sub $\mu$m needs to be protected from dust or the like.

When the diffraction optical element is formed in the first lens unit 1, properly selecting the phase at the diffraction optical element permits minimization of the chromatic aberration for two wavelengths of, for example, the d line and the g line, so that changes in the overall chromatic aberration caused by zooming can be minimized, but the width of the chromatic aberration (secondary spectrum) remaining, in particular, at the telephoto end is large.

When the diffraction optical element is formed in the second lens unit, properly selecting the phase at the diffraction optical element permits minimization of the chromatic aberration of the second lens unit, such as the chromatic aberration for two wavelengths, such as those of the d line and the g line, and thus minimization of changes in the overall chromatic aberration caused by zooming, but the width of the chromatic aberration (second spectrum) remaining, in particular, at the telephoto end is large in the opposite direction from that of the first lens unit.

Accordingly, when the diffraction optical element surface is formed in either one of the lens units of the magnification change-over group which is closer to the object side than the stop S, that is in the first lens unit 1 and the second lens unit 2, the secondary spectrum becomes large due to magnification changes, which becomes a practical problem.

To overcome such a problem, at least one diffraction optical surface which is rotationally symmetrical to its corresponding optical axis is formed in each of the first lens unit 1 and the second lens unit 2 of the magnification change-over group. This allows minimization of chromatic aberration for the reference wavelengths (d line and g line) in the first lens unit 1 and the second lens unit, and causes the secondary spectrum produced in each of the lens units of the magnification change-over group to be produced in opposite directions. Thus, it is possible to properly correct the overall chromatic aberration as a result of the combined operational effects of the first lens unit 1 and the second lens unit 2.

With such a structure, fewer lenses can be used for the first lens unit 1, thus making it possible to reduce the number of lenses of the structure. In addition, fewer lenses can be used for the second lens unit 2, thus making it possible to reduce the number of lenses of the structure.

This makes it Possible to reduce the size of the zoom lens device, while maintaining good optical performance, even for a zoom lens device permitting high magnification changes of 10 or more.

In order to reduce chromatic aberration of the zoom lens device, it is preferable that at least one of the surfaces satisfy the following Condition (18):

$$Fi \cdot C1i < 0 \ (i=1, 2) \tag{18}$$

where Fi is the refractive power of the ith lens unit, and C1i is a coefficient of a second order term of the diffraction optical surface of the ith lens unit.

Here, C1i is the paraxial refractive power of the diffraction optical surface. When C1i is positive, the refractive power is negative, whereas when it is negative, the refractive power is positive. When the Condition (18) is satisfied, the lens unit with the diffraction optical element surface, regardless of whether the lens unit is a positive lens unit or a negative lens unit, can be formed with a lower curvature, which is effective in correcting aberration.

It can be seen that the phase can be adjusted by the distance h from the optical axis. That is, the larger the lens diameter, the greater the effect of a high order coefficient. In consumer-oriented zoom lens devices of the numerical examples, particularly video zoom lens devices, few large lenses, that is few lenses with a large h, are used to reduce the size of the zoom lens device. Thus, in order for the coefficient to be effective in correcting aberrations even for a small lens, it is preferable that the following Conditions (19) and (20) be satisfied:

$$1 \cdot 10^{-4} < |C2i/C1i| < 1 \cdot 10^{-1} \tag{19}$$

$$1 \cdot 10^{-7} < |C3i/C1i| < 1 \cdot 10^{-2} \tag{20}$$

where C2i and C3i are the coefficients in the fourth order term and the sixth order term of Formula (i) of a diffraction optical surface in the ith lens unit, respectively.

These conditions are conditions for effectively correcting aberration of a small diameter lens, as mentioned above. When these conditions are not satisfied, it not only becomes difficult to correct aberrations, but also becomes difficult to produce the diffraction optical surface.

As described above, the diffraction optical surfaces in the first lens unit 1 and the second lens unit 2 allow both of the lenses to function together to correct the chromatic aberrations (secondary spectrum) of each of the lens units, and minimize changes in the chromatic aberrations-caused by zooming, when the second lens unit 2 is moved. Here, a stationary fifth negative lens unit may be disposed at the image plane side of the fourth lens unit 4. In this case, further size reduction can be achieved by forming the fifth lens unit into one which is as a whole a telephoto type lens unit.

When the chromatic aberration, which is corrected by, for example, the adhered first lens unit 1 and the second lens unit 2 is to be corrected by diffraction optical surfaces, the refractive power thereof does not have to be made very strong.

Here, the lens units may have a refractive power permitting correction of slight nonaxial aberrations, particularly curvature of field and distortion. In this case, production can be facilitated and aberrations including chromatic aberration can be properly corrected, when the following Condition (21) is satisfied:

$$0.05 < F1/Fbo1 < 0.7$$

$$0.05 < F2/Fbo2 < 0.7 \tag{21}$$

where Fbo1 and Fbo2 are the focal lengths of the diffraction optical surfaces of the first lens unit 1 and the second lens unit 2, respectively, and F1 and F2 are the focal lengths of the first lens unit 1 and the second lens unit, respectively.

In particular, it is preferable that the ith lens unit with a diffraction optical element satisfy the following Condition (22):

$$1.0 < Fi/(Fw \cdot Ft)^{1/2} < 2.5 \tag{22}$$

where Fw and Ft are the focal lengths of the entire lens system at the wide angle end and at the telephoto end, respectively. When this condition is satisfied, the diffraction optical element can function effectively. When the value is less than the lower limit of Condition (22), the refractive power of the first lens unit 1 is made too strong, so that the chromatic aberration cannot be completely corrected with the diffraction optical system. In addition, it becomes difficult to produce. When the value becomes greater than the upper limit of Condition (22), chromatic aberration can be easily corrected without forming a diffraction optical element. In addition, in order for the lens to have a desired focal length, the refractive power of the second lens unit, in particular, becomes strong, thus increasing the amount of aberration of the second lens unit 2 that needs to be corrected. In other words, the Petzval sum becomes large, and the curvature of field is corrected excessively.

When the first lens unit has only one diffraction optical surface, it is preferable that the following Condition (23) be satisfied:

$$|Fi/Rboi| < 1.8 \tag{23}$$

where Rboi is the radius of curvature of the surface of the first lens unit which is formed into a diffraction optical surface. When Rboi=infinity, the base surface is a plane. When Condition (23) is not satisfied, the aberration at the curved surface of the base cannot be completely corrected by the diffraction optical system, so that the diffraction optical system is not sufficiently effective in correcting aberration.

It is preferable that the following Condition (24) be satisfied:

$$\left. \begin{array}{l} 0.1 < t1/F1 < 0.33 \\ 0.05 < t2/F1 < 0.4 \end{array} \right\} \tag{24}$$

where t1 is the axial thickness of the first lens unit 1 and t2 is the axial thickness of the second lens unit 2.

Condition (24) indicates the range in which the diffraction optical element can be effectively used. The diffraction optical element allows the desired refractive power to be obtained, even for a low curvature. If a diffraction optical element makes it unnecessary to use a combination of a concave lens and a convex lens for correcting chromatic aberration, the lens thickness can be made even thinner, resulting in effective use of the diffraction optical element.

When the value is greater than the upper limit of Condition (24), even an ordinary glass can be made into that thickness, so that the diffraction optical element is not effectively used. On the other hand, when the value is less than the lower limit, a large refractive power due to diffraction is required, thereby increasing the amount of aberration produced.

Although not previously mentioned, it is possible to properly correct aberration with either one of the first lens unit and the second lens unit, using the diffraction optical element.

The numerical data of Numerical Examples 17 and 18 are given below. The symbols used mean the same as those of Numerical Examples 1 to 16.

NUMERICAL EXAMPLE 17

| f = 4.19~41.89 | fno = 1:1.850~2.81 | 2ω = 60.6°~6.7° | | |
|---|---|---|---|---|
| r1 = 42.051 | | d1 = 2.80 | n1 = 1.51633 | ν1 = 64.2 |
| r2 = −95.964 | (diffraction surface) | d2 = 0.17 | | |
| r3 = 14.187 | | d3 = 2.60 | n2 = 1.51633 | ν2 = 64.2 |
| r4 = 61.567 | | d4 = variable | | |
| r5 = 50.589 | | d5 = 0.50 | n3 = 1.72000 | ν3 = 50.3 |
| r6 = 4.533 | | d6 = 2.17 | | |
| r7 = −5.516 | (diffraction surface) | d7 = 0.50 | n4 = 1.53172 | ν4 = 48.8 |
| r8 = −12.444 | | d8 = 1.53 | | |
| r9 = 0.000 | (stop) | d9 = 1.00 | | |
| *r10 = 5.044 | | d10 = 3.02 | n5 = 1.58313 | ν5 = 59.4 |
| r11 = −77.651 | | d11 = 0.08 | | |
| r12 = 6.832 | | d12 = 0.55 | n6 = 1.84666 | ν6 = 23.8 |
| r13 = 4.350 | | d13 = variable | | |
| *r14 = 9.425 | | d14 = 2.09 | n7 = 1.58313 | ν7 = 59.4 |
| r15 = −6.413 | | d15 = 0.50 | n8 = 1.84666 | ν8 = 23.8 |
| r16 = −12.465 | | d16 = 1.50 | | |
| r17 = 0.000 | | d17 = 3.27 | n9 = 1.51633 | ν9 = 64.2 |
| r18 = 0.000 | | | | |

| f | 4.19 | 22.02 | 41.89 |
|---|---|---|---|
| d4 | 0.70 | 9.40 | 11.85 |
| d8 | 11.95 | 3.25 | 0.80 |
| d13 | 6.22 | 2.50 | 6.20 |

Aspherical Surface Coefficients

| 10th surface | $\kappa = -1.35672 \times 10^0$ | $A2 = 4.42384 \times 10^{-4}$ | $A3 = 1.54512 \times 10^{-7}$ |
| | $A4 = -5.25350 \times 10^{-9}$ | $A5 = -2.87640 \times 10^{-10}$ | |
| 14th surface | $\kappa \times -1.65726 \times 10^0$ | $A2 = -8.73147 \times 10^{-5}$ | $A3 = -2.54226 \times 10^{-7}$ |
| | $A4 = 7.20396 \times 10^{-7}$ | $A5 = -5.63081 \times 10^{-9}$ | |

Phase Coefficients

| 2nd surface | $C1 = -1.58547 \cdot 10^{-3}$ | $C2 = 3.74388 \cdot 10^{-6}$ |
| | $C3 = -2.07446 \cdot 10^{-9}$ | $C4 = 2.71374 \cdot 10^{-11}$ |
| 7th surface | $C1 = 9.12449 \cdot 10^{-3}$ | $C2 = -4.40286 \cdot 10^{-4}$ |
| | $C3 = 4.76936 \cdot 10^{-5}$ | $C4 = -5.12756 \cdot 10^{-6}$ |

NUMERICAL EXAMPLE 18

| f = 4.19~41.91 | fno = 1:1.85~2.59 | 2ω = 60.6~6.7° | | |
|---|---|---|---|---|
| r1 = 13.837 | | d1 = 0.70 | n1 = 1.84666 | ν1 = 23.8 |
| r2 = 10.944 | (diffraction surface) | d2 = 0.81 | | |
| r3 = 12.206 | | d3 = 4.60 | n2 = 1.69680 | ν2 = 55.5 |
| r4 = −164.997 | | d4 = variable | | |
| r5 = 100.902 | | d5 = 0.50 | n3 = 1.72000 | ν3 = 50.3 |
| r6 = 4.643 | | d6 = 1.98 | | |
| r7 = −6.408 | (diffraction surface) | d7 = 0.50 | n4 = 1.53172 | ν4 = 48.8 |
| r8 = −32.148 | | d8 = variable | | |
| r9 = 0.000 | (stop) | d9 = 1.00 | | |
| *r10 = 4.930 | | d10 = 3.02 | n5 = 1.58313 | ν5 = 59.4 |
| r11 = 176.932 | | d11 = 0.08 | | |
| r12 = 6.674 | | d12 = 0.55 | n6 = 1.84666 | ν6 = 23.8 |
| r13 = 4.350 | | d13 = variable | | |
| *r14 = 9.369 | | d14 = 2.60 | n7 = 1.58313 | ν7 = 59.4 |
| r15 = −5.726 | | d15 = 0.50 | n8 = 1.80518 | ν8 = 25.4 |
| r16 = −11.150 | | d16 = 1.50 | | |
| r17 = 0.000 | | d17 = 3.27 | n9 = 1.51633 | ν9 = 64.2 |
| r18 = 0.000 | | | | |

| f | 4.19 | 22.12 | 41.91 |
|---|---|---|---|
| d4 | 11.95 | 9.70 | 12.15 |
| d8 | 11.95 | 3.25 | 0.80 |
| d13 | 5.98 | 2.49 | 6.13 |

Aspherical Surface Coefficients

| 10th surface | $\kappa = -1.55272 \times 10^0$ | $A2 = 7.38545 \times 10^{-4}$ | $A3 = -9.57222 \times 10^{-7}$ |
| | $A4 = -4.39693 \times 10^{-9}$ | $A5 = 5.99116 \times 10^{-10}$ | |
| 14th surface | $\kappa = -1.81706 \times 10^0$ | $A2 = -1.36047 \times 10^{-4}$ | $A3 = 7.60311 \times 10^{-3}$ |
| | $A4 = 7.13090 \times 10^{-7}$ | $A5 = -6.08475 \times 10^{-9}$ | |

Phase Coefficients

| | Phase Coefficients | |
|---|---|---|
| 4th surface | $C1=-1.27721 \cdot 10^{-3}$ | $C2= 1.64604 \cdot 10^{-5}$ |
| | $C3=-7.08588 \cdot 10^{-8}$ | $C4=-5.54317 \cdot 10^{-10}$ |
| 7th surface | $C3=-8.60805 \cdot 10^{-3}$ | $C2=-3.89554 \cdot 10^{-4}$ |
| | $C3= 4.77344 \cdot 10^{-5}$ | $C4=-5.12753 \cdot 10^{-6}$ |

The following table gives the parameters of each of the Conditions of Numerical Examples 17 and 18.

NUMERICAL EXAMPLE 17

NUMERICAL EXAMPLE 18

In first lens unit 1

| | | |
|---|---|---|
| \|C2/C1\| | $2.36 \times 10^{-3}$ | $1.29 \times 10^{-2}$ |
| \|C3/C1\| | $1.31 \times 10^{-6}$ | $5.55 \times 10^{-5}$ |
| In second lens unit 2 | | |
| \|C2/C1\| | $4.82 \times 10^{-2}$ | $4.53 \times 10^{-2}$ |
| \|C3/C1\| | $5.23 \times 10^{-3}$ | $5.54 \times 10^{-3}$ |
| F1 | 20.53 | 20.84 |
| F2 | −3.914 | −3.936 |
| Fw | 4.19 | 4.19 |
| Ft | 41.886 | 41.91 |
| (Fw × Ft)½ | 13.248 | 13.251 |
| Fbo1 | 116.94 | 147.55 |
| Fbo2 | −8.723 | −9.981 |
| Rbo1 | −94.96 | −164.99 |
| Rbo2 | −5.516 | −6.408 |
| F1/Fbo1 | 0.176 | 0.141 |
| F2/Fbo2 | 0.449 | 0.394 |
| F1/(Fw × Ft)½ | 1.549 | 1.573 |
| F1/Rbo1 | 0.214 | 0.126 |
| F2/Rbo2 | 0.710 | 0.614 |
| t1/F1 | 0.271 | 0.293 |
| t2/F2 | 0.154 | 0.143 |

Figure 17:
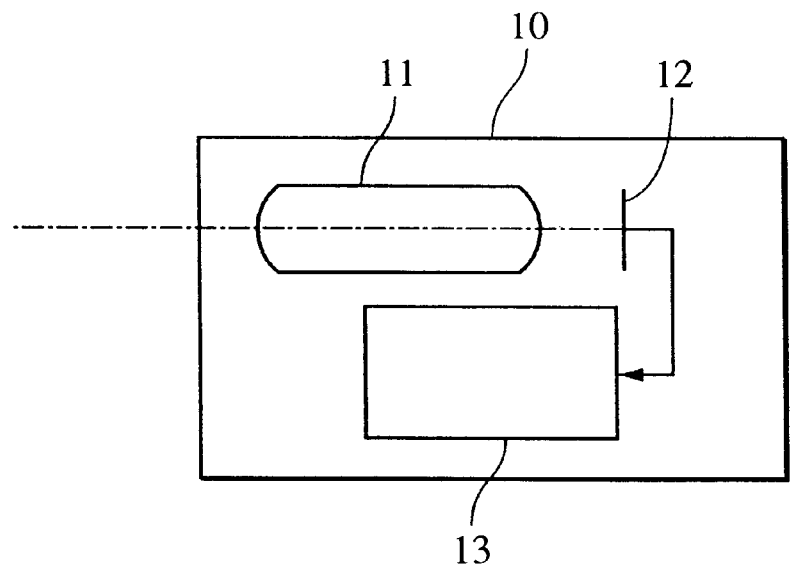
FIG. 17 is a schematic view of the main portion of a video camera including the zoom lens device of the present invention.
Figure 18:
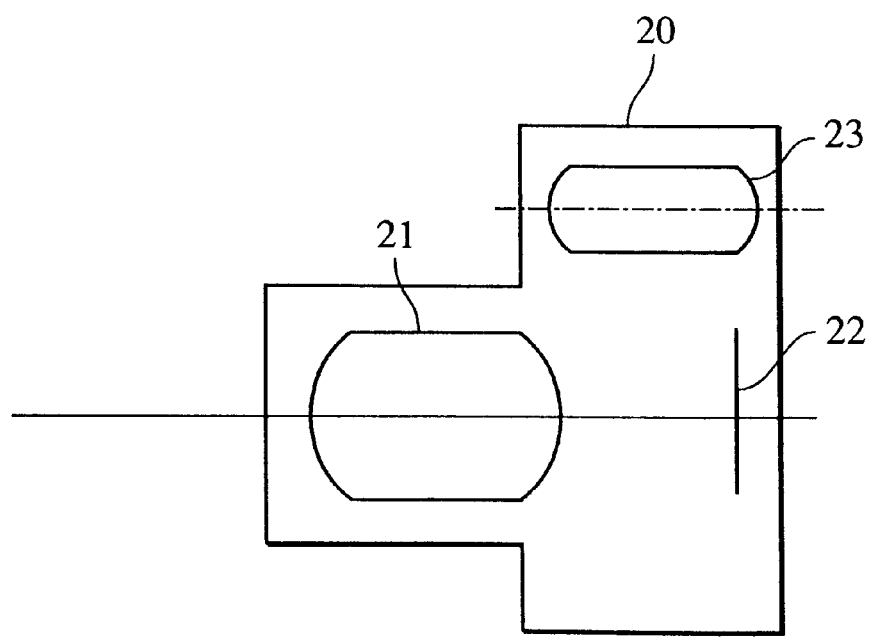
FIG. 18 is a schematic view of the main portion of a compact camera including the zoom lens device of the present invention.

FIGS. 17 and 18 are views each showing an example of the application of the zoom lens device of the present invention to an optical apparatus.

FIG. 17 illustrates the case where the zoom lens device of the present invention is applied to a video camera. In the figure, reference numeral 10 denotes the body of the video camera, reference numeral 11 denotes an imaging optical system formed by the zoom lens device of the present invention, reference numeral 12 denotes an imaging element such as a CCD, and reference numeral 13 denotes a recording section. The imaging optical system 11 is incorporated in the video camera body 10. The image captured by the imaging optical system 11 is formed on the imaging element 12 and recorded on the recording section 13. Using a finder system (not shown), the observer can observe the object image formed on the imaging element during photography. Using the same system as that shown in FIG. 17, it is also possible to realize a digital still camera.

FIG. 18 illustrates the case where the zoom lens device of the present invention is applied to a silver salt compact camera. In the figure, reference numeral 20 denotes the body of the camera, reference numeral 21 denotes a photographic optical system formed by the zoom lens device of the present invention, reference numeral 22 denotes a film surface, and reference numeral 23 denotes a finder optical system. The photographic optical system 21 is incorporated in the camera body 20.

Using the zoom lens device of the present invention in an optical apparatus, as shown in FIGS. 17 and 18, makes it possible to provide an optical apparatus reduced in size, which permits a high magnification change to be achieved and permits proper correction of chromatic aberration.

Figure 19:
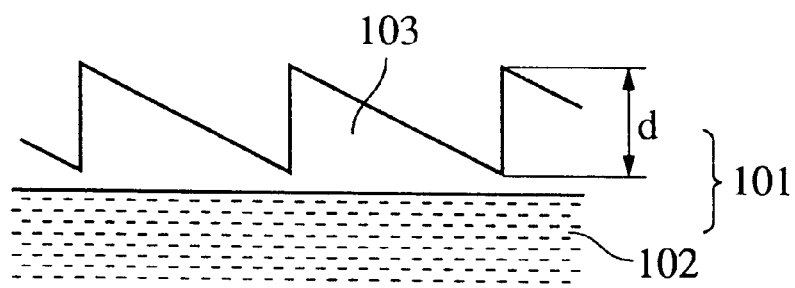
FIG. 19 shows an example of a sectional shape of a grating of a diffraction optical element.

In FIG. 19, it is assumed that the gratings of the diffraction optical elements in each of the numerical examples are formed sectionally into the shape of saw teeth. In the figure, reference numeral 101 denotes a diffraction optical element, reference numeral 102 denotes a base, and reference numeral 103 denotes an annular diffraction grating composed of an ultraviolet curing resin formed on the surface of the base 102. In each of the numerical examples, the base 102 corresponds to the lens surface formed into the diffraction optical surface. In the diffraction optical element of FIG. 19, the grating thickness d of the annular diffraction grating 103 is set such that the first order diffraction efficiency is 100% at a wavelength of 530 nm.

Figure 20:
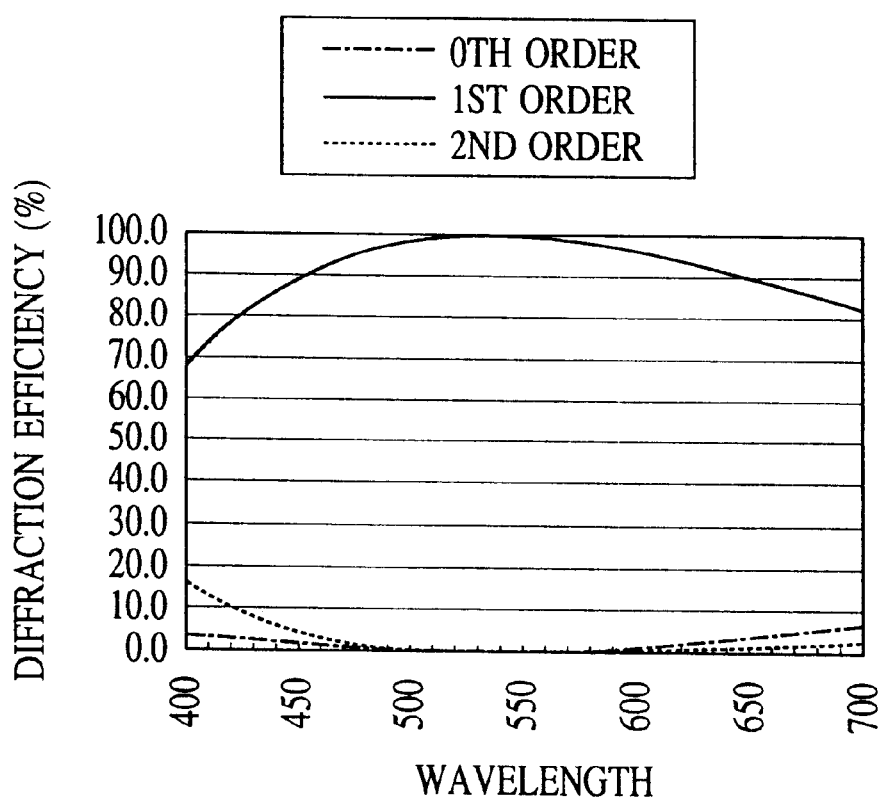
FIG. 20 is a graph showing the dependence of the first order diffraction efficiency of the diffraction optical element of FIG. 19 on the wavelength.

FIG. 20 is a graph showing the dependence of the first order diffraction efficiency of the diffraction optical element of FIG. 19 on the wavelength. As is clear from FIG. 20, the diffraction efficiency at the 1st order or design order is smaller the further away the wavelength is from the optimum wavelength of 530 nm, whereas the diffraction efficiency at the zeroth and second orders of diffraction is larger the further away the wavelength is from the optimum wavelength of 530 nm. The use of diffraction light at an order other than the design order results in reduced resolution of the optical system caused by flare.

Figure 21:
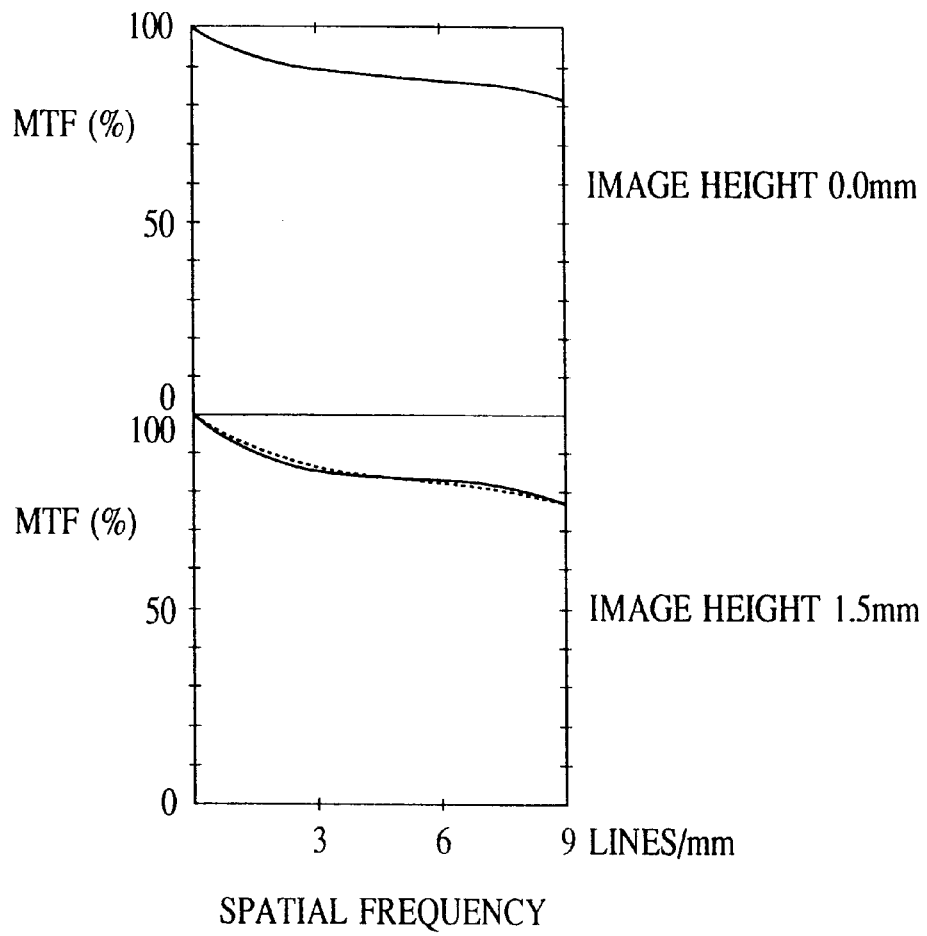
FIG. 21 is a view illustrating the MTF characteristic with respect to the gap frequency of the zoom lens device of Numerical Example 8 including the diffraction optical element of FIG. 19.
Figure 46:
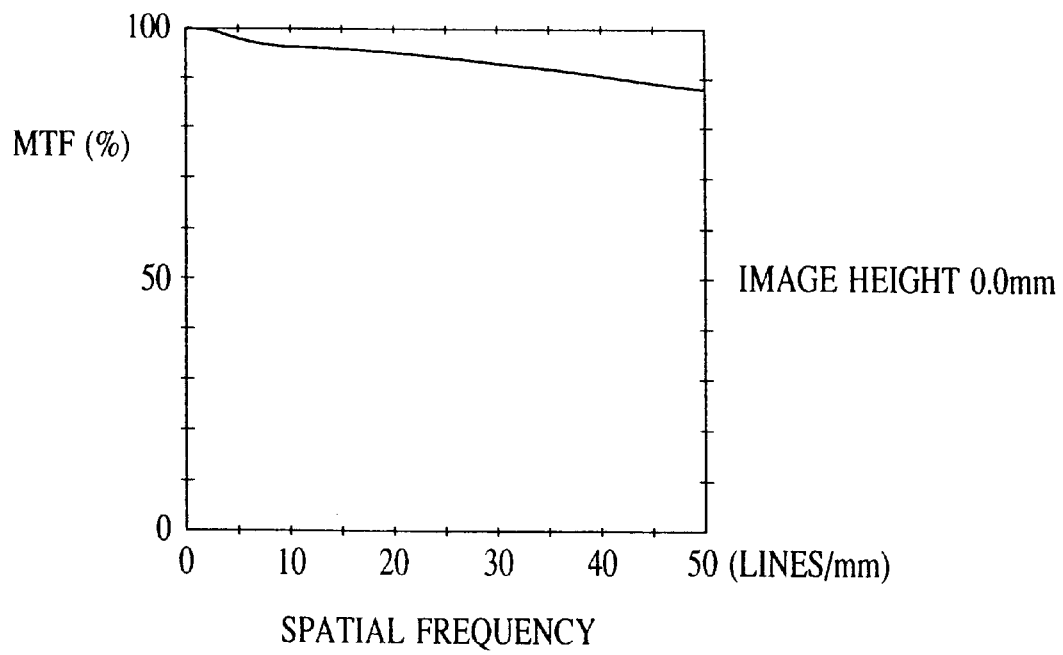
FIG. 46 is a graph showing the MTF characteristics as a function of the gap frequency of the zoom lens device of Numerical Example 9 including the diffraction optical element of FIG. 19.
Figure 47:
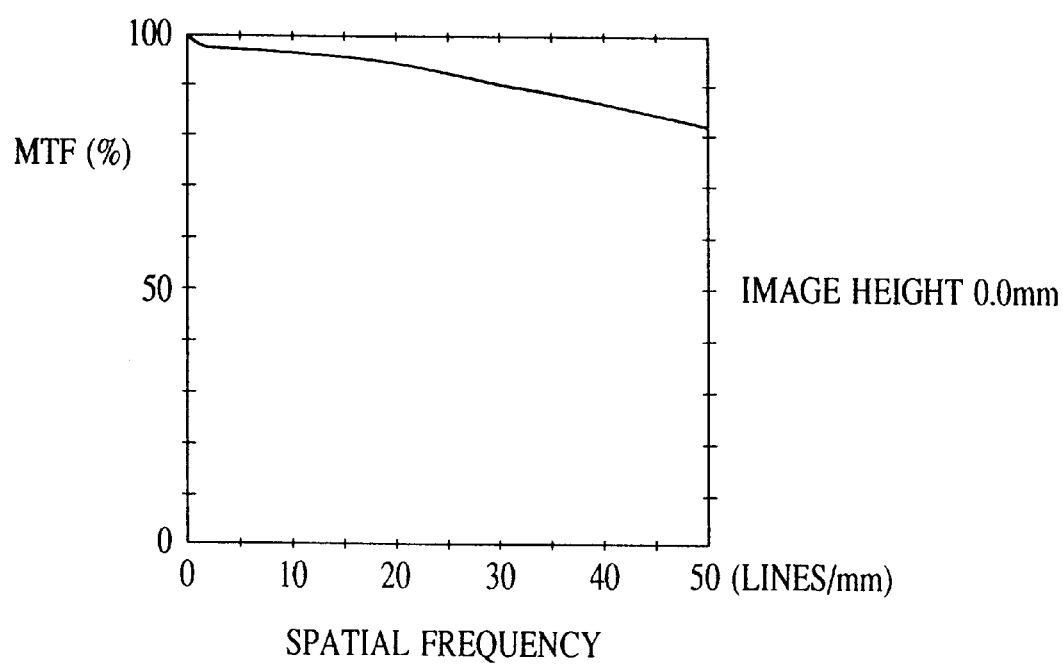
FIG. 47 is a graph showing the MTF characteristics as a function of the gap frequency of the zoom lens device of Numerical Example 11 including the diffraction optical element of FIG. 19.
Figure 48:
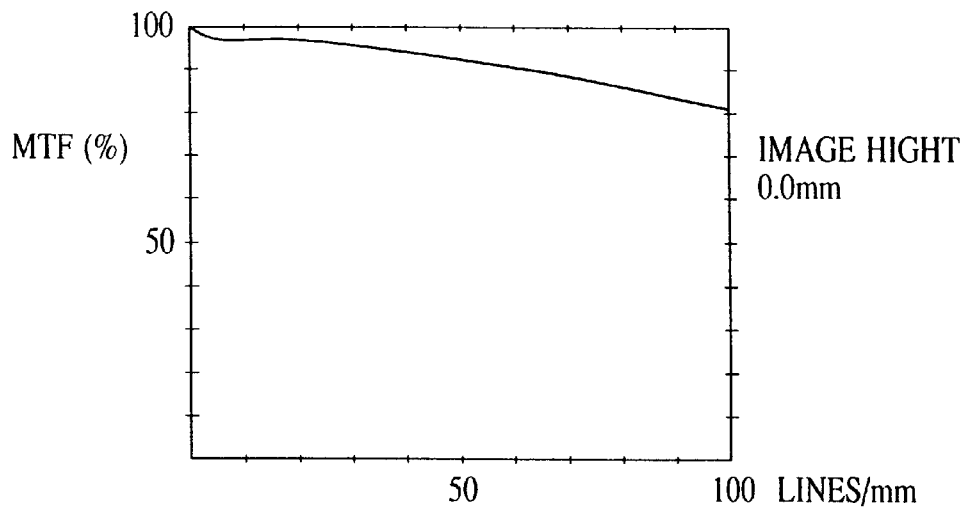
FIG. 48 is a graph showing the MTF characteristics as a function of the gap frequency of the zoom lens device of Numerical Example 14 including the diffraction optical element of FIG. 19.
Figure 49:
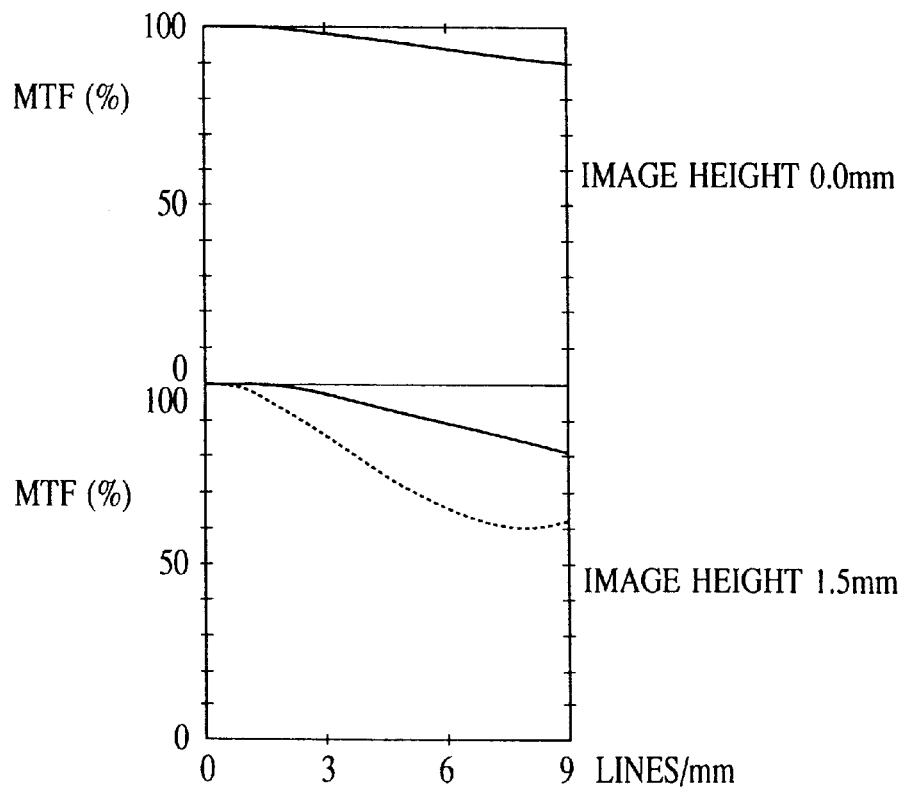
FIG. 49 is a graph showing the MTF characteristics as a function of the gap frequency of the zoom lens device of Numerical Example 17 including the diffraction optical element of FIG. 19.

FIG. 21 is a graph showing the MTF characteristic as a function of the gap frequency at the wide angle end, when in the zoom lens device of Numerical Example 8 the grating of the diffraction optical element has the same sectional shape as that shown in FIG. 19. FIG. 46 is a graph showing the MTF characteristics as a function of the gap frequency at the wide angle end in the zoom lens device of Numerical Example 9. FIG. 47 is a graph showing the MTF characteristics as a function of the gap frequency at the telephoto end in the zoom lens device of Numerical Example 11. FIG. 48 is a graph showing the MTF characteristics as a function of the gap frequency at the telephoto end in the zoom lens device of Numerical Example 14. FIG. 49 is a graph showing the MTF characteristics as a function of the gap frequency at the wide angle end in the zoom lens device of Numerical Example 17. It can be seen from these figures that the MTF characteristic in the low frequency region is lower than a desired value.

Figure 22:
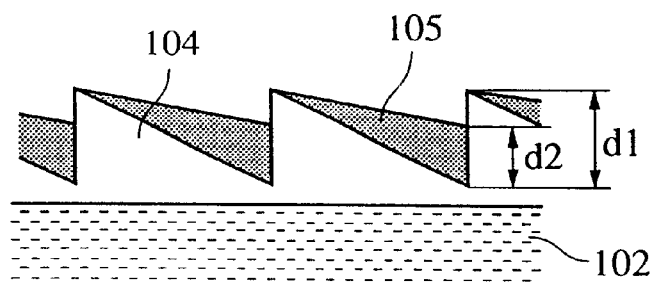
FIG. 22 shows an example of a sectional shape of a grating of a diffraction optical element with a layered structure.

FIG. 22 is a sectional view of the shape of a layered grating of the diffraction optical element. More specifically, in the layered structure, a first diffraction grating 104 composed of ultraviolet curing resin (nd=1.499, vd=54) is formed on a base 102. Then, a second diffraction grating 105 composed of ultraviolet curing resin (nd=1.598, vd=28) is formed on the first diffraction grating 104. When the curing resin of the first diffraction grating 104 and that of the second diffraction grating 104 are combined, the thickness d1 of the first diffraction grating section becomes 13.8 μm, whereas the thickness d2 of the second diffraction grating section becomes 10.5 μm.

Figure 23:
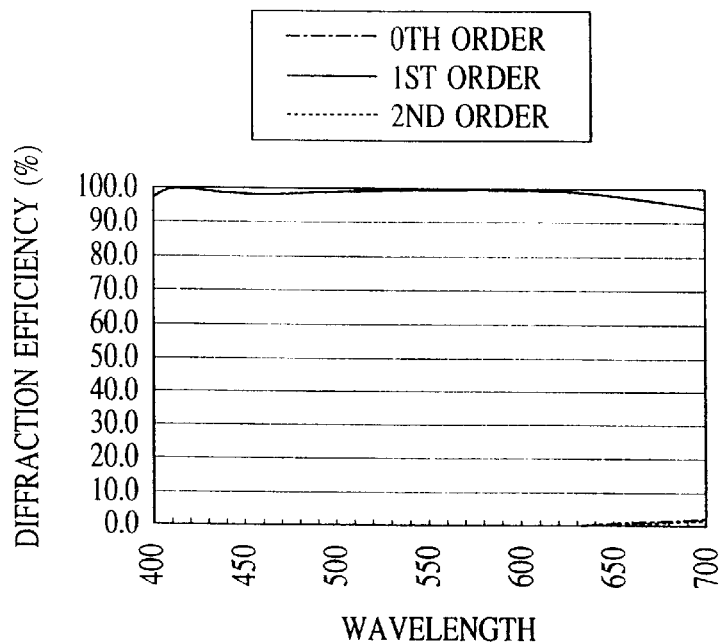
FIG. 23 is a graph showing the dependence of the first order diffraction efficiency of the diffraction optical element of FIG. 22 on the wavelength.

FIG. 23 is a graph showing the dependence of the first order diffraction efficiency of the diffraction optical element of FIG. 22 on the wavelength. As can be seen from FIG. 23, making the diffraction grating into a layered structure results in a high diffraction efficiency of more than 95% at the design order within the entire range of wavelength used.

Figure 24:
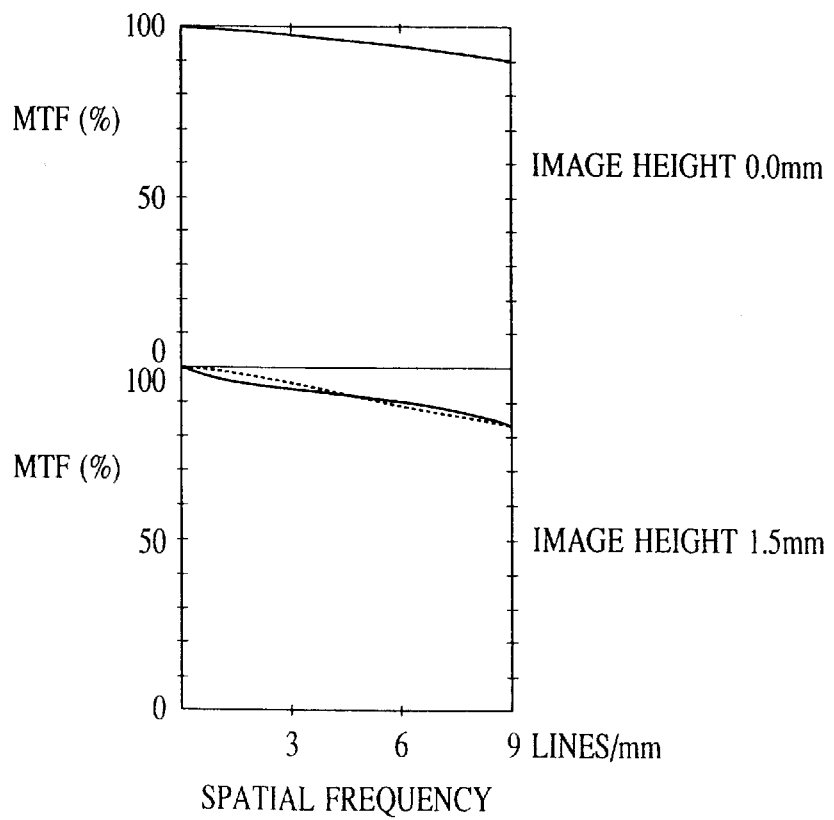
FIG. 24 is a view illustrating the MTF characteristic with respect to the gap frequency of the zoom lens device of Numerical Example 8 including the diffraction optical element of FIG. 22.
Figure 50:
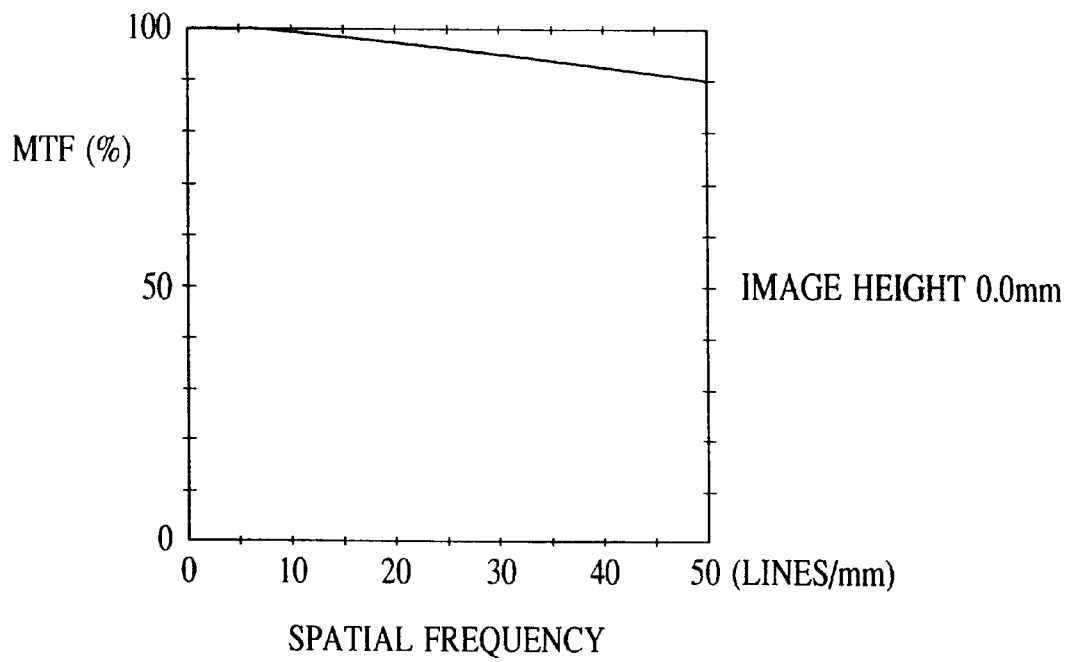
FIG. 50 is a graph showing the MTF characteristics as a function of the gap frequency of the zoom lens device of Numerical Example 9 including the diffraction optical element of FIG. 22.
Figure 51:
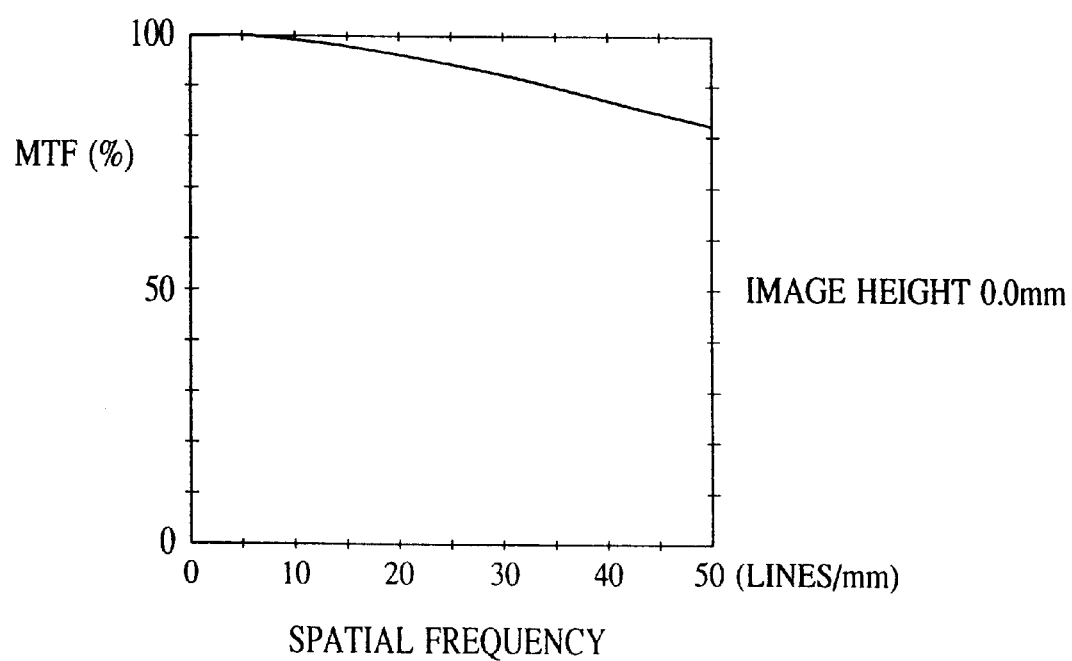
FIG. 51 is a graph showing the MTF characteristics as a function of the gap frequency of the zoom lens device of Numerical Example 11 using the diffraction optical element of FIG. 22.
Figure 52:
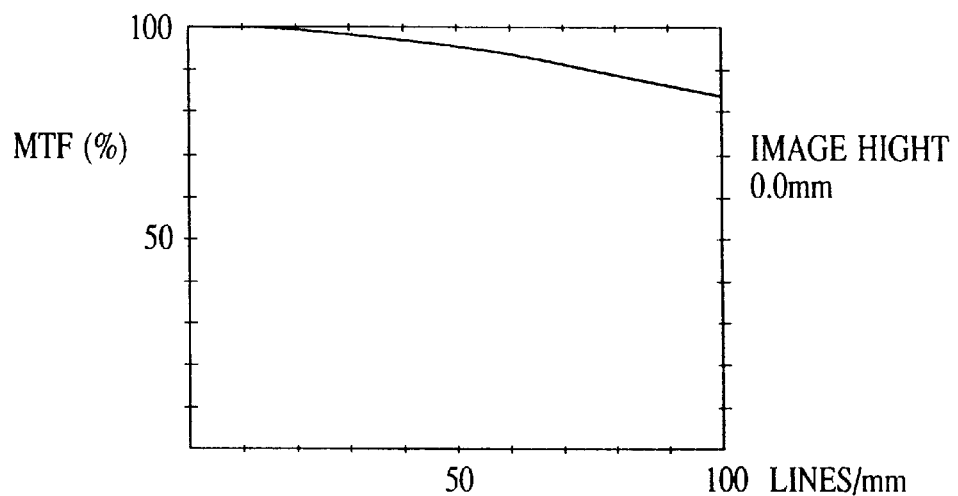
FIG. 52 is a graph showing the MTF characteristics as a function of the gap frequency of the zoom lens device of Numerical Example 14 including the diffraction optical element of FIG. 23.
Figure 53:
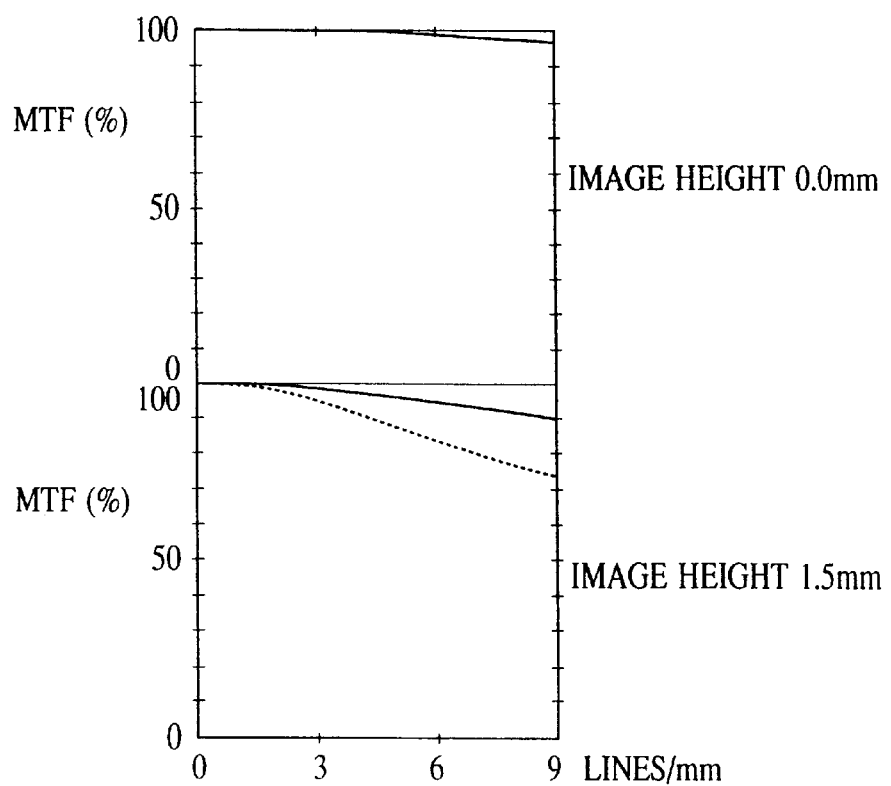
FIG. 53 is a graph showing the MTF characteristics as a function of the gap frequency of the zoom lens device of Numerical Example 17 including the diffraction optical element of FIG. 24.
Figures 55A, 55B, 55C, 55D:
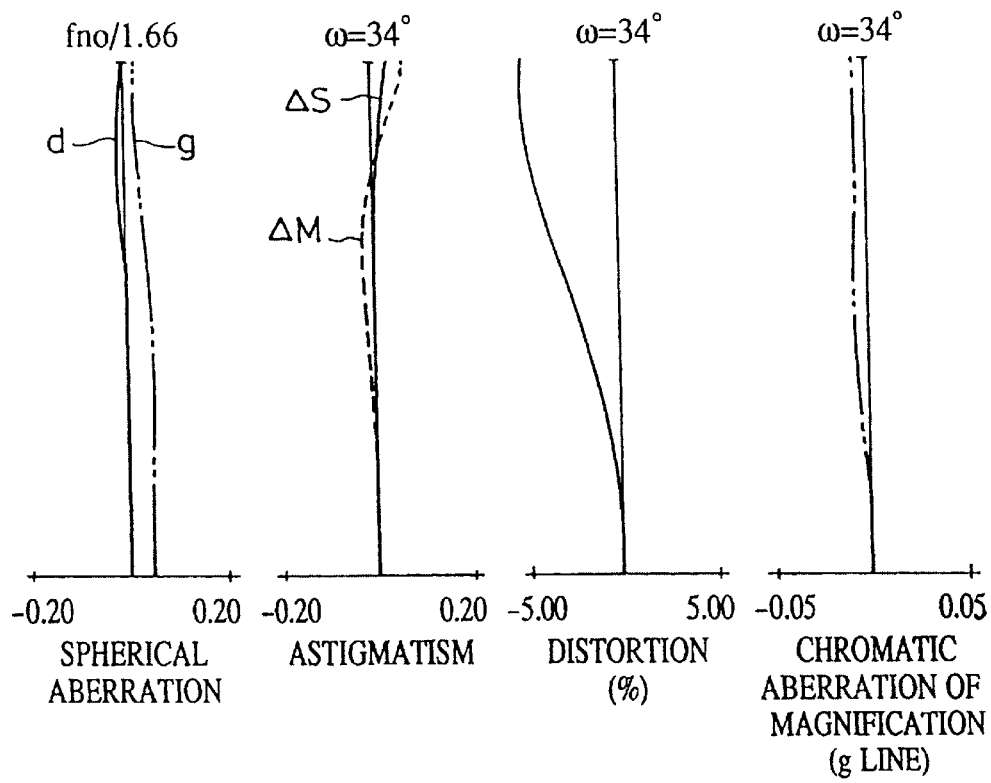
FIGS. 55A through 55D are a diagram showing aberrations of Numerical Example 19 at wide angle end.
Figures 56A, 56B, 56C, 56D:
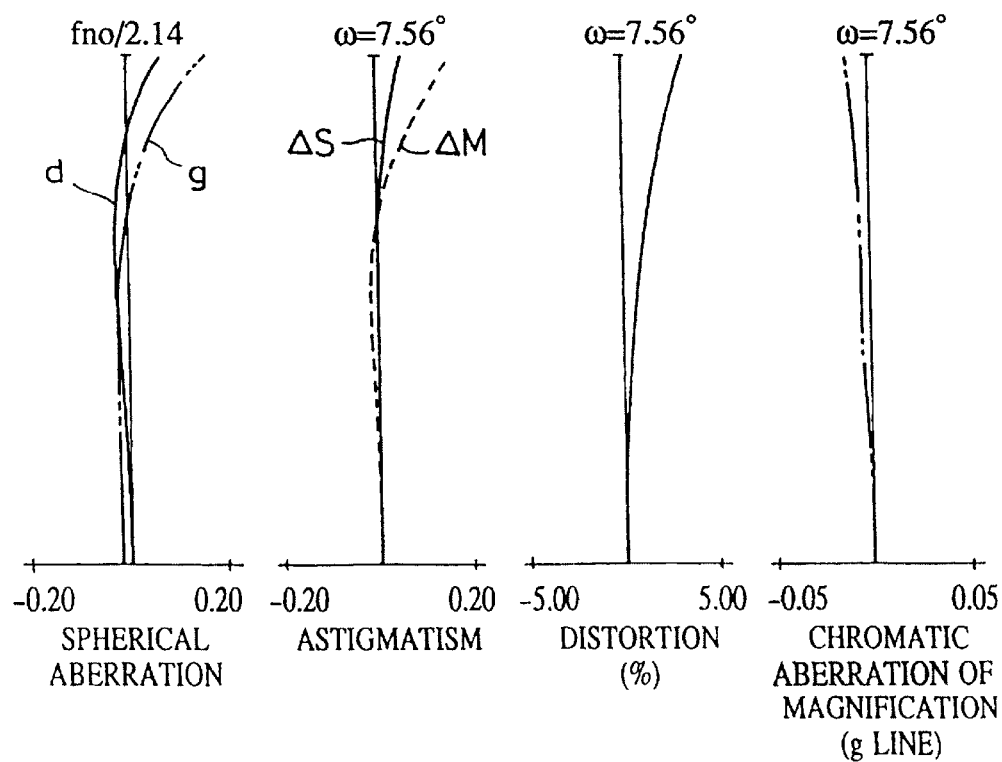
FIGS. 56A through 56D are a diagram showing aberrations of Numerical Example 19 at an intermediate position.
Figures 57A, 57B, 57C, 57D:
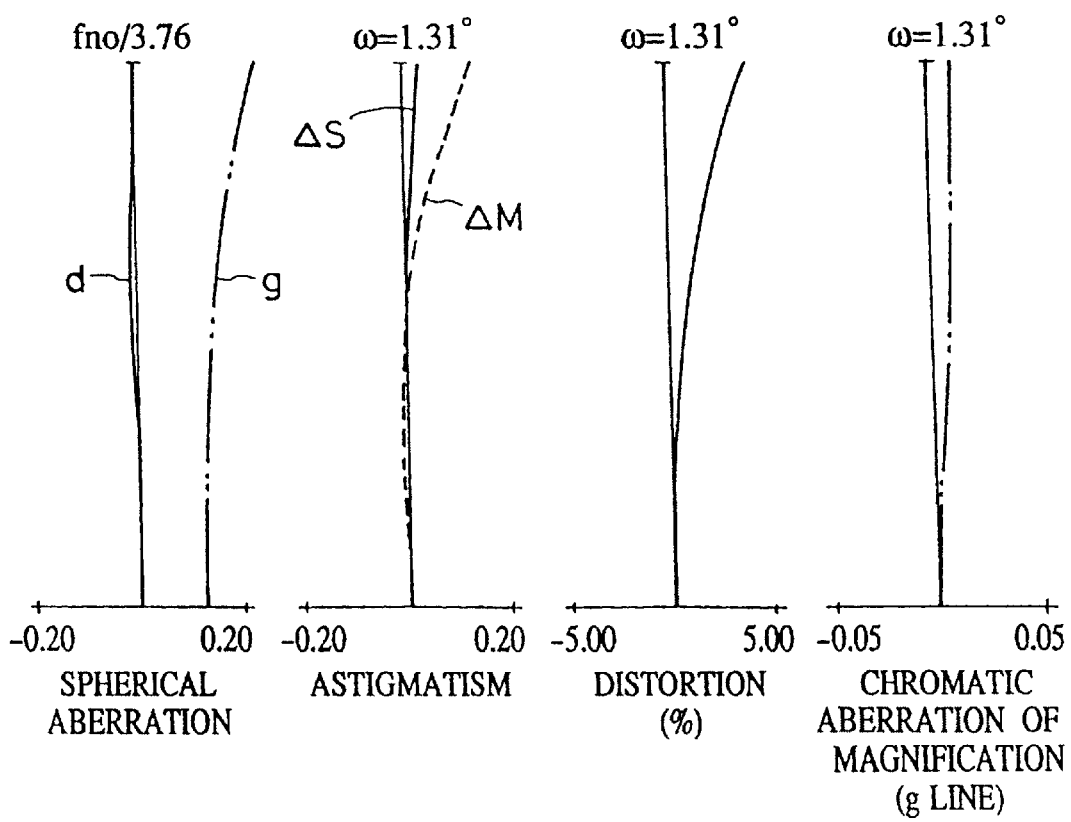
FIGS. 57A through 57D are a diagram showing aberrations of Numerical Example 19 at telephoto end.

FIG. 24 illustrates the MTF characteristic in terms of the gap frequency at the wide angle end, when in the zoom lens device of Numerical Example 8 the grating of the diffraction optical element has the sectional shape shown in FIG. 22. FIG. 50 is a graph showing the MTF characteristics as a function of the gap frequency at the wide angle end in the zoom lens device of Numerical Example 9. FIG. 51 is a graph showing the MTF characteristics as a function of the gap frequency at the telephoto end in the zoom lens device of Numerical Example 11. FIG. 52 is a graph showing the MTF characteristics as a function of the gap frequency at the telephoto end in the zoom lens device of Numerical Example 14. FIG. 53 is a graph showing the MTF characteristics as a function of the gap frequency at the wide angle end in the zoom lens device of Numerical Example 17. Making the diffraction grating into a layered structure results in improved MFT characteristics in the low frequency region, so that the desired MTF characteristic can be obtained. In addition, a layered structure makes it possible to further improve optical performance.

Figure 5:
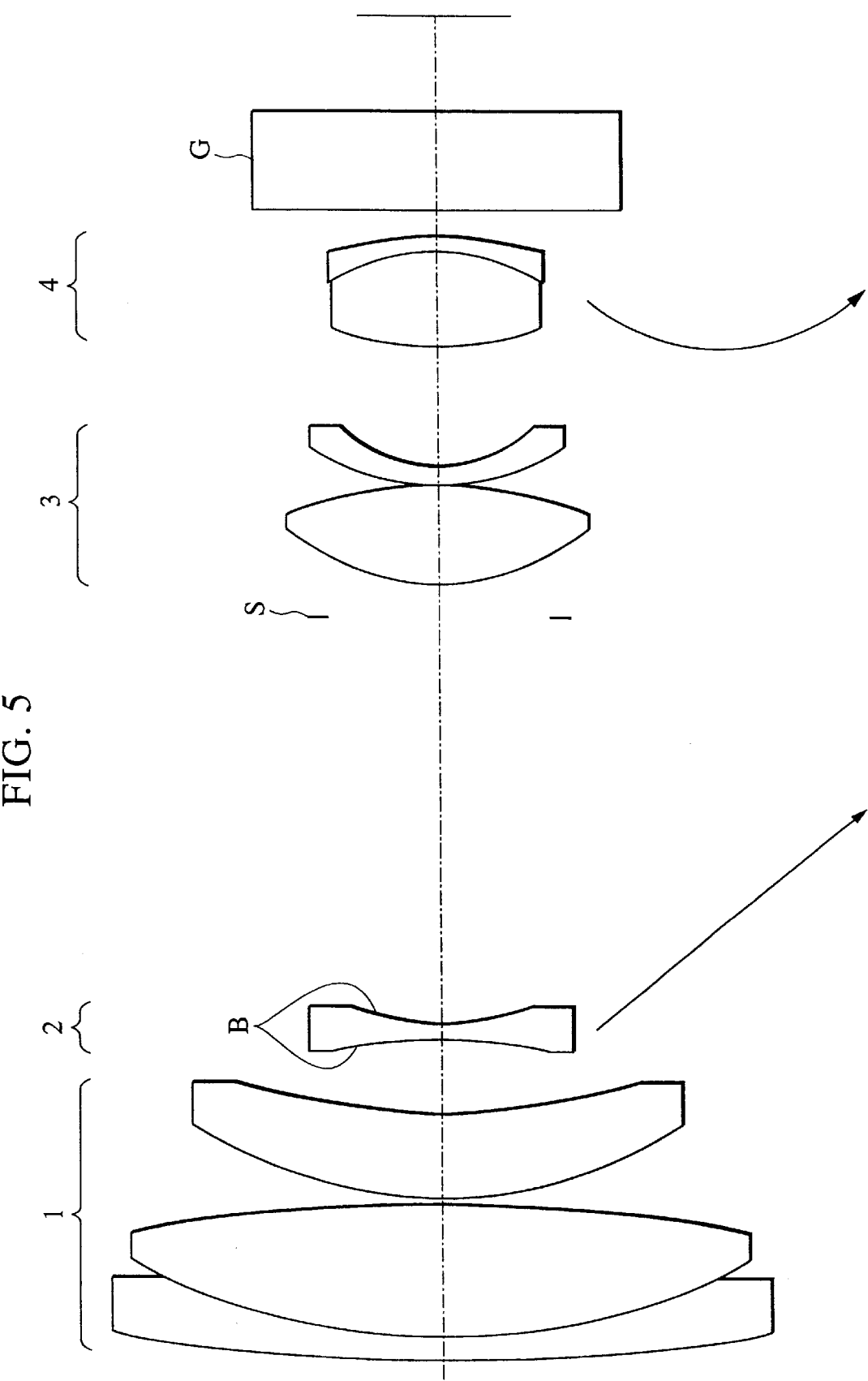
FIG. 5 is a section of a zoom lens device of Numerical Example 5 in accordance with the present invention.
Figure 6:
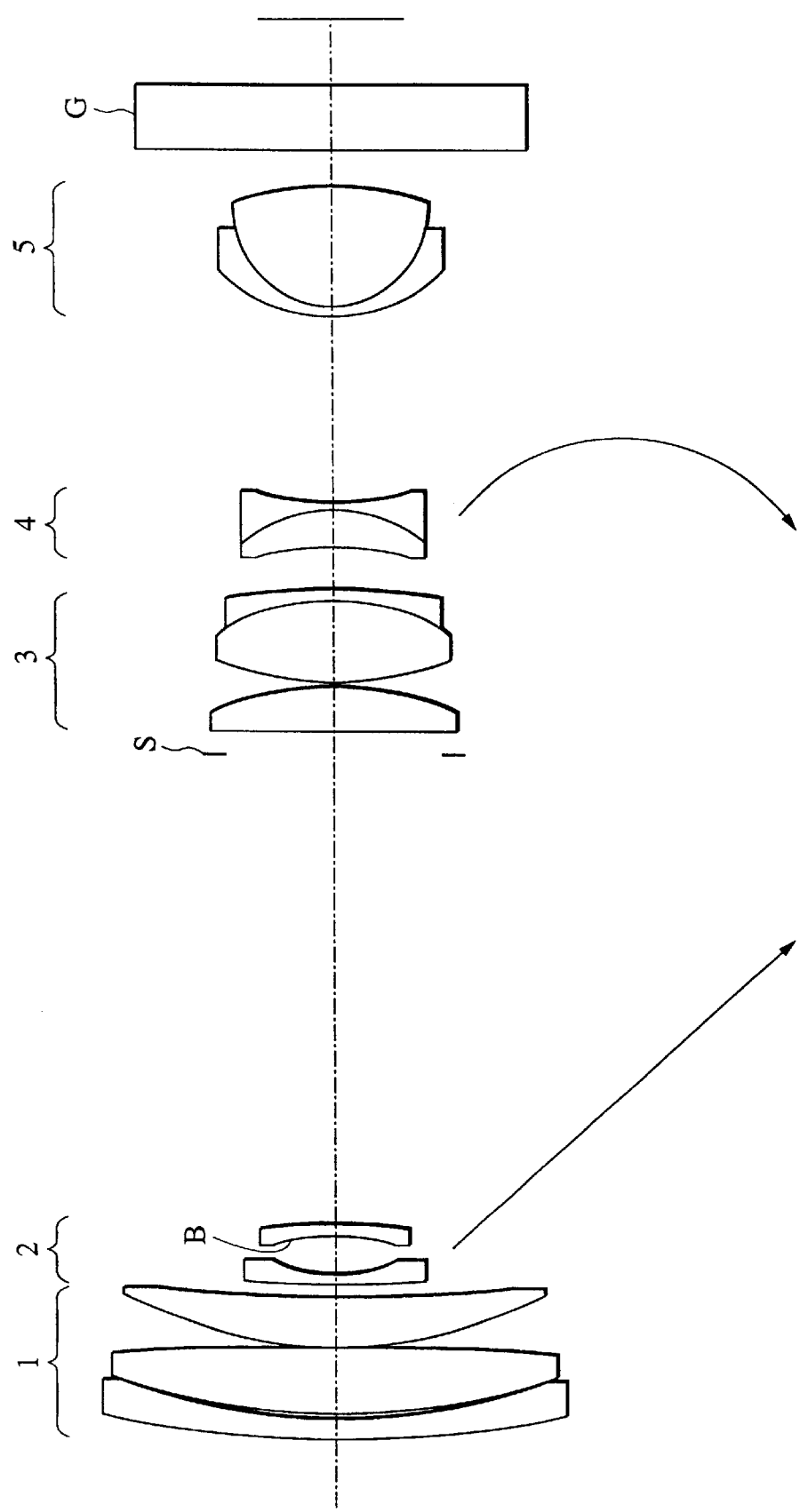
FIG. 6 is a section of a zoom lens device of Numerical Example 6 in accordance with the present invention.
Figure 7:
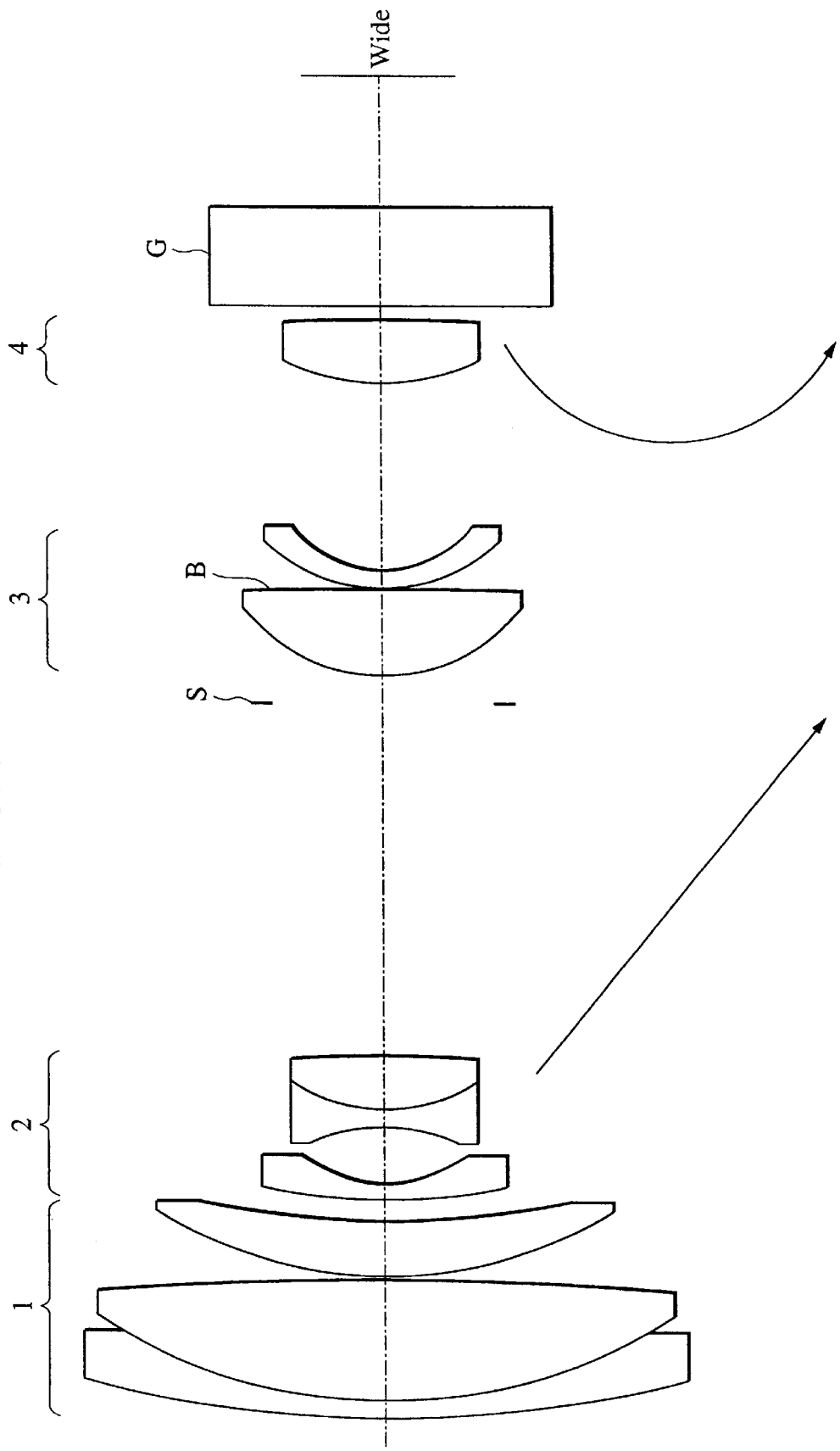
FIG. 7 is a section of a zoom lens device of Numerical Example 7 in accordance with the present invention.
Figure 8:
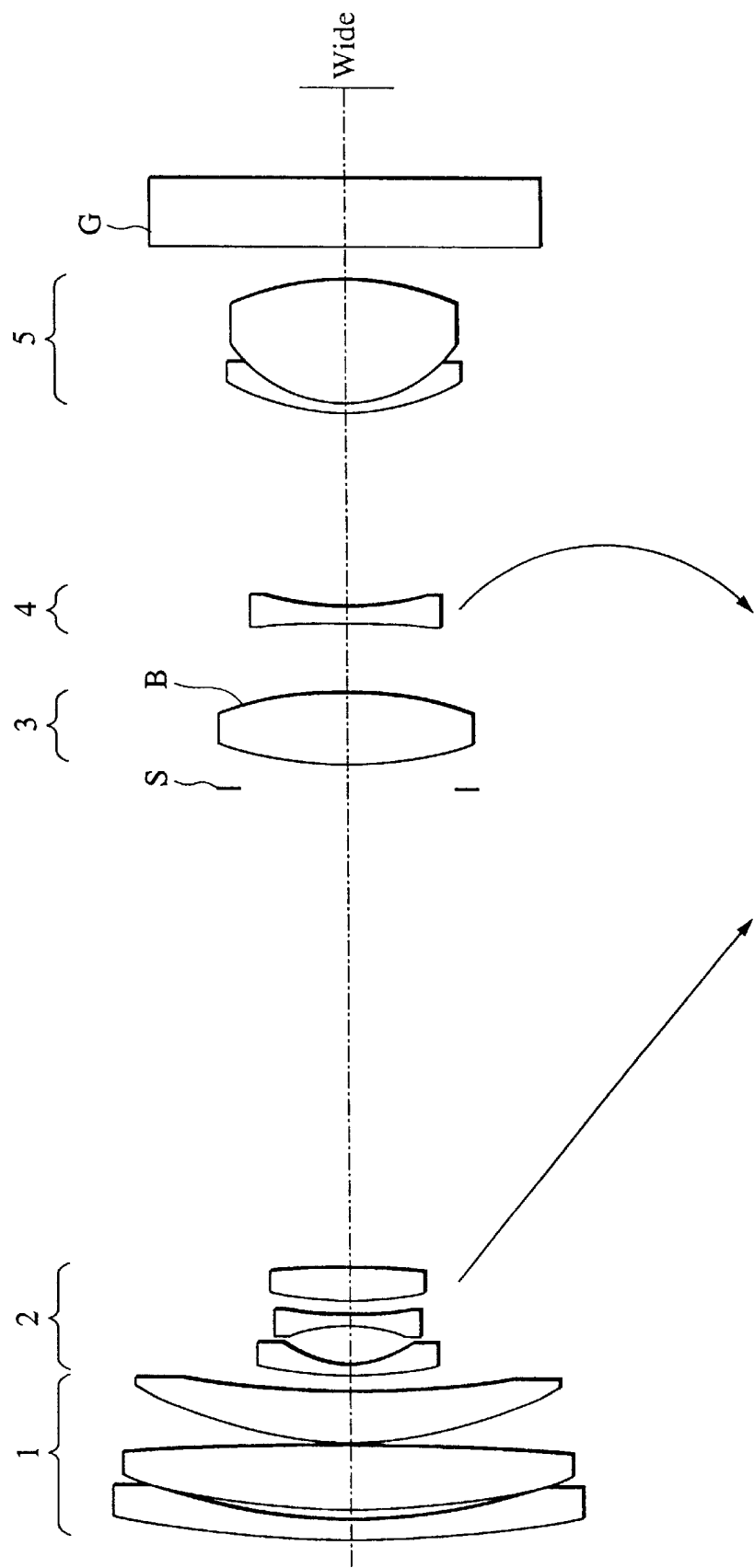
FIG. 8 is a section of a zoom lens device of Numerical Example 8 in accordance with the present invention.
Figures 9A, 9B, 9C:
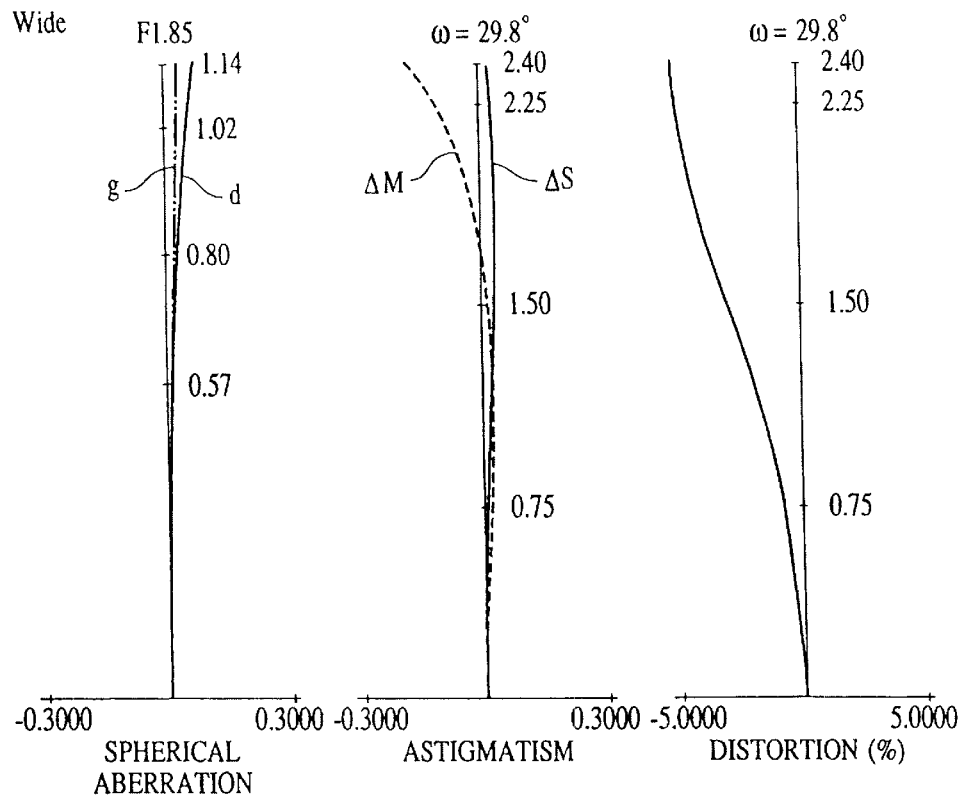
FIGS. 9A–9F illustrate diagrams showing aberrations at a wide angle end and at a telephoto end of the zoom lens device of Numerical Example 1 in accordance with the present invention.
Figures 9D, 9E, 9F:
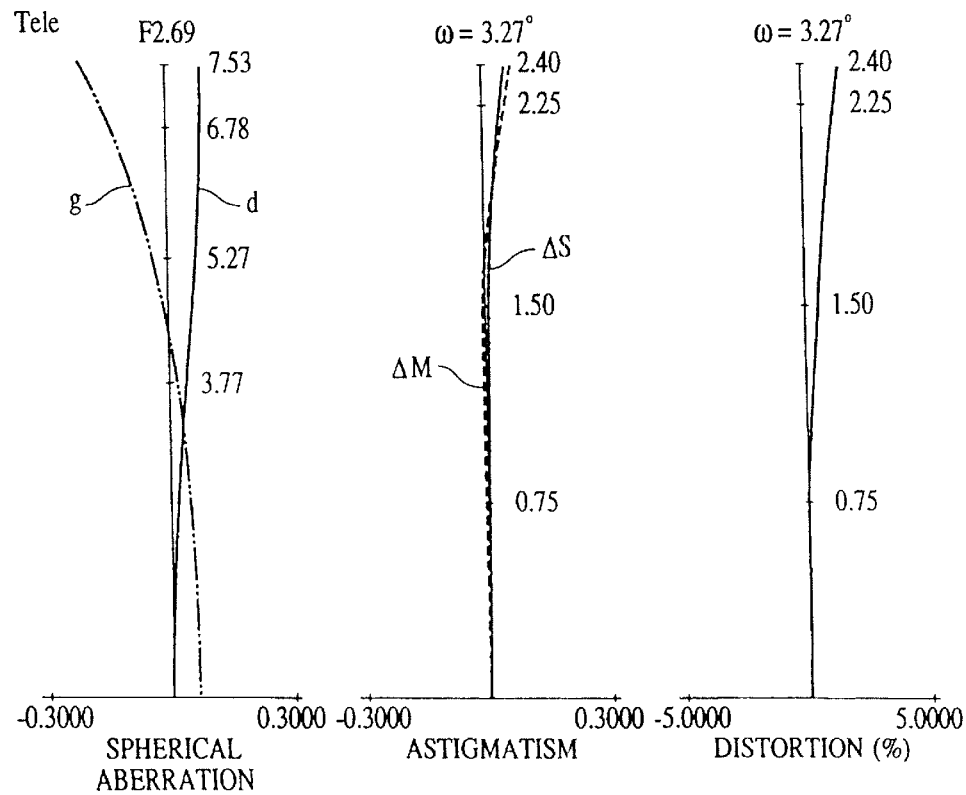
Figure 10A:
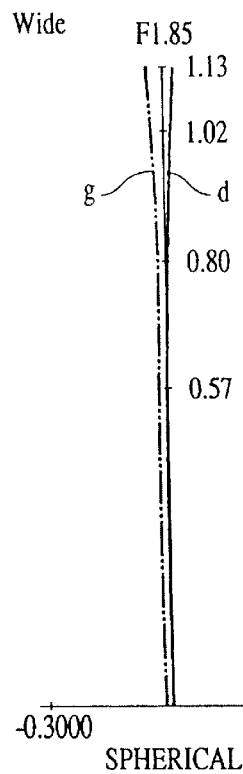
FIGS. 10A–10F illustrate diagrams showing aberrations at a wide angle end and at a telephoto end of the zoom lens device of Numerical Example 2 in accordance with the present invention.
Figure 10B:
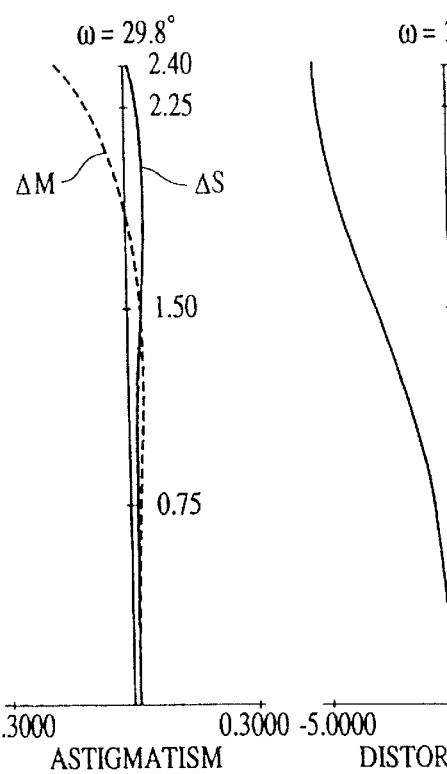
Figure 10C:
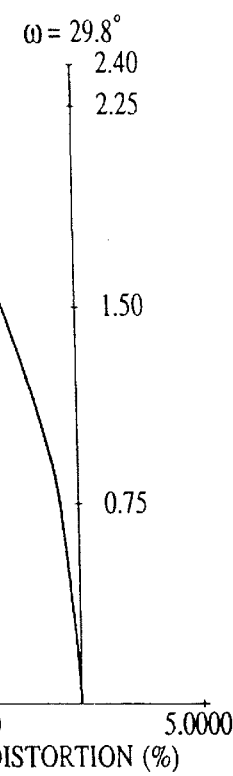
Figure 10D:
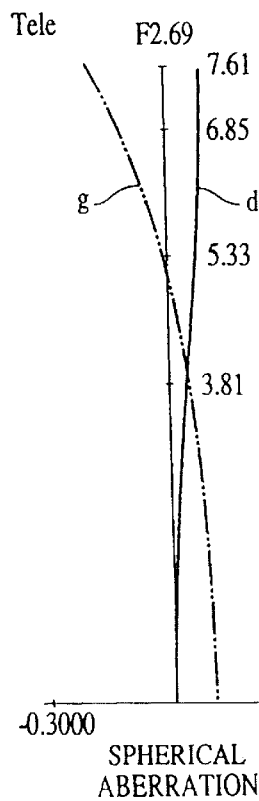
Figure 10E:
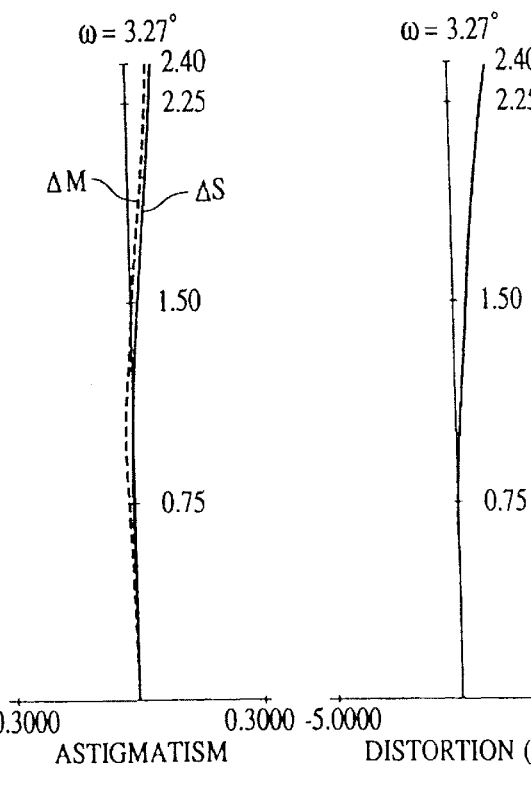
Figure 10F:
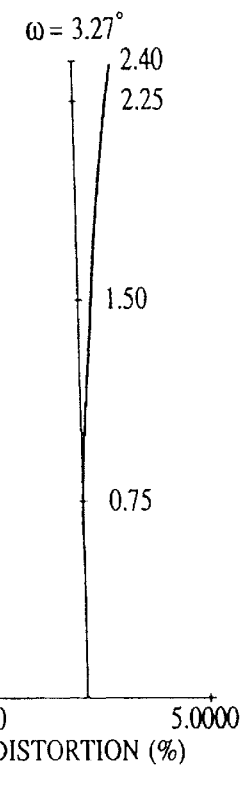
Figures 12A, 12B, 12C:
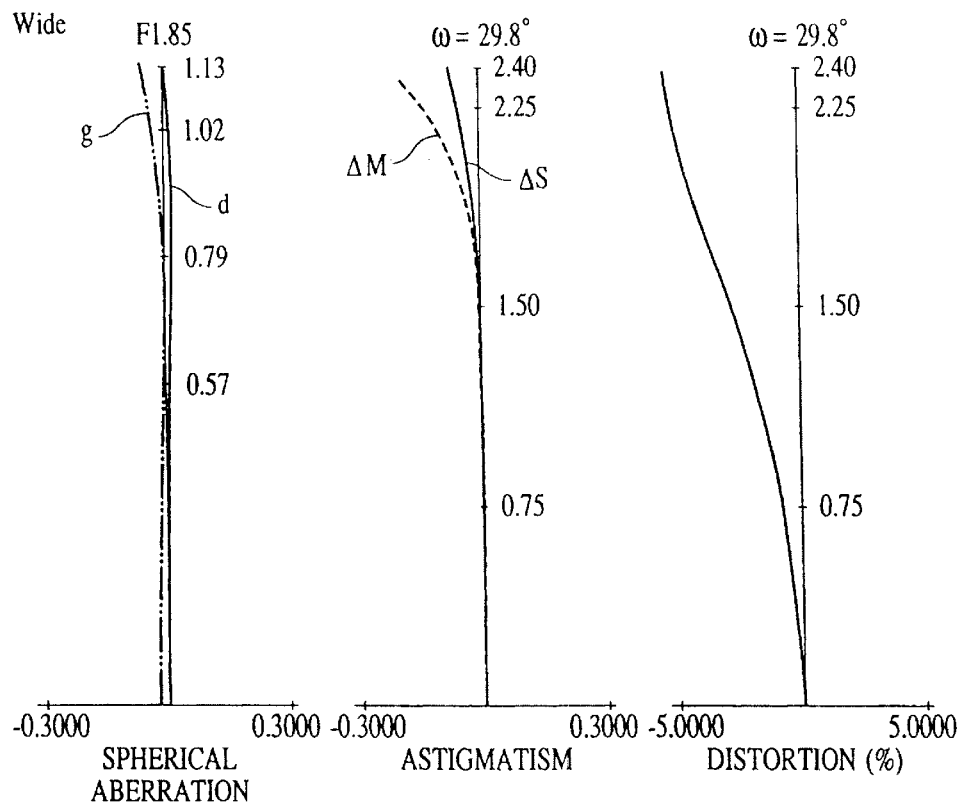
FIGS. 12A–12F illustrate diagrams showing aberrations at a wide angle end and at a telephoto end of the zoom lens device of Numerical Example 4 in accordance with the present invention.
Figures 12D, 12E, 12F:
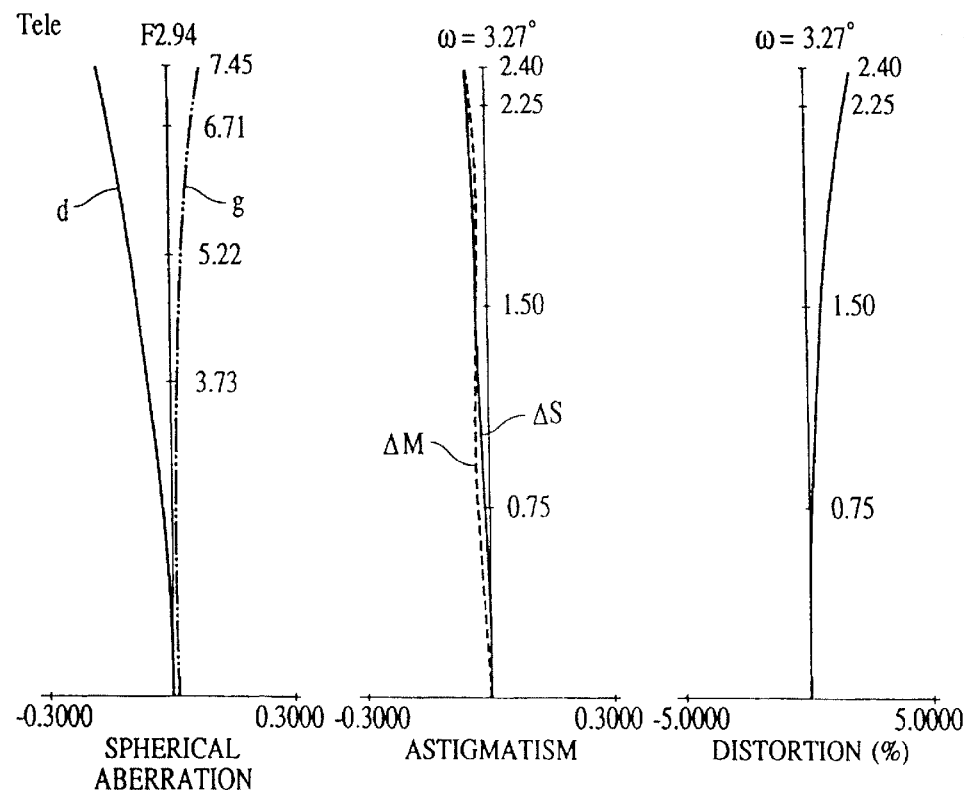

Although ultraviolet curing resin was used as the material for the layered diffraction optical element, plastic or the like may also be used. Depending on the base used, the first diffraction grating 104 may be formed directly into the base. Each of the grating sections do not necessarily have to have different thicknesses, so that as shown in FIG. 5, the two grating sections can be made into the same thickness, depending on how the materials are combined. In this case, the surface of the diffraction optical element does not have the shape of a grating, thus making it possible to provide a cheap optical system with excellent dustproof properties and which allows the assembly of the diffraction optical element to be simplified.

Figure 58:
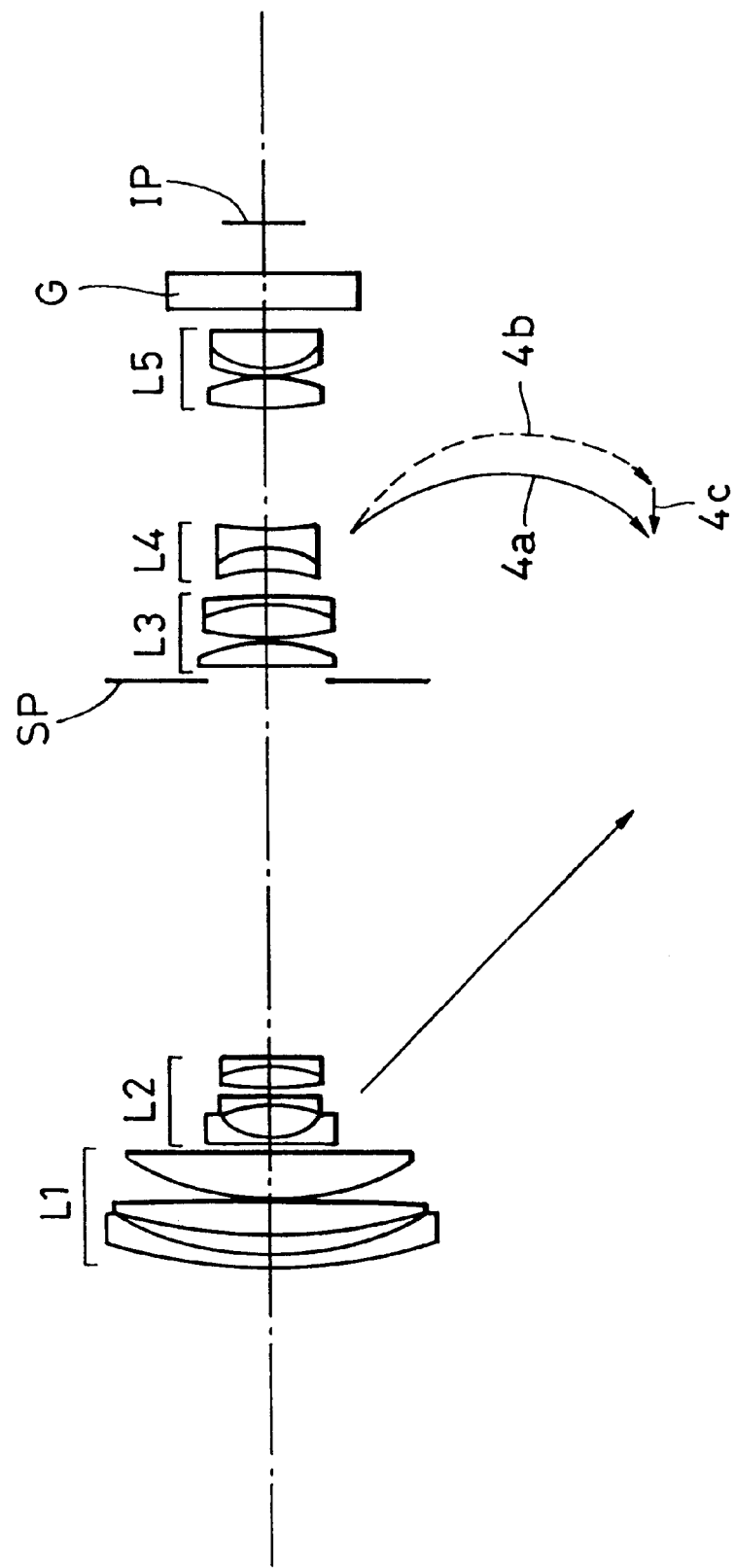
FIG. 58 is a sectional view of the lens device of Numerical Example 2.
Figures 59A, 59B, 59C, 59D:
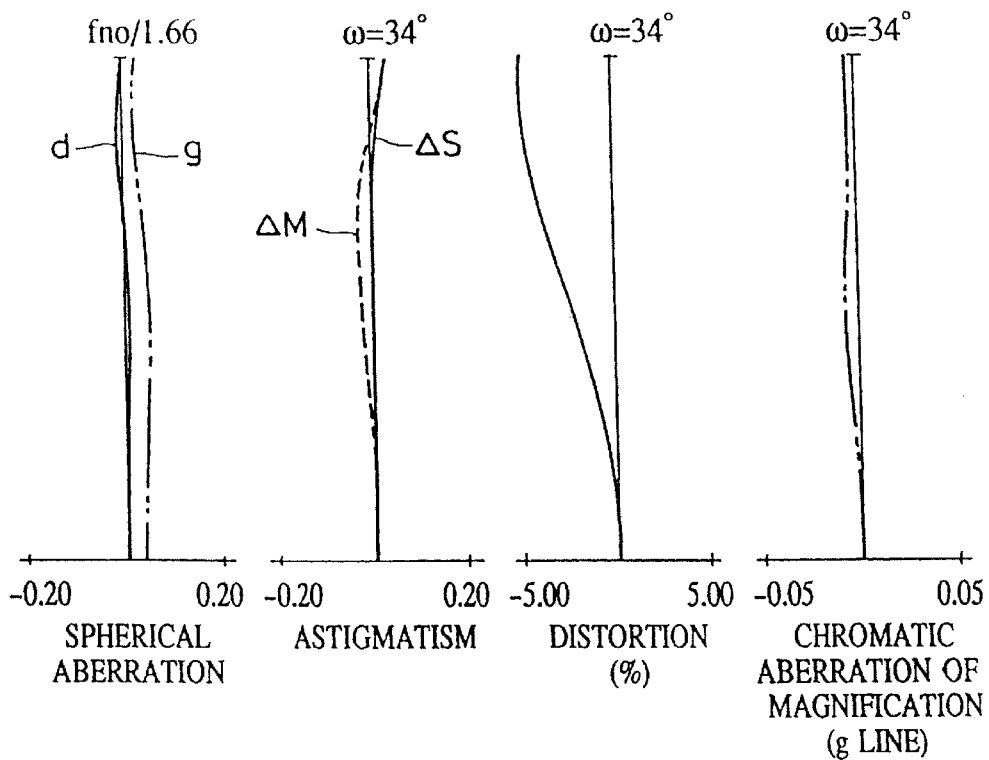
FIGS. 59A through 59D are a diagram showing aberrations of Numerical Example 20 at wide angle end.
Figures 60A, 60B, 60C, 60D:
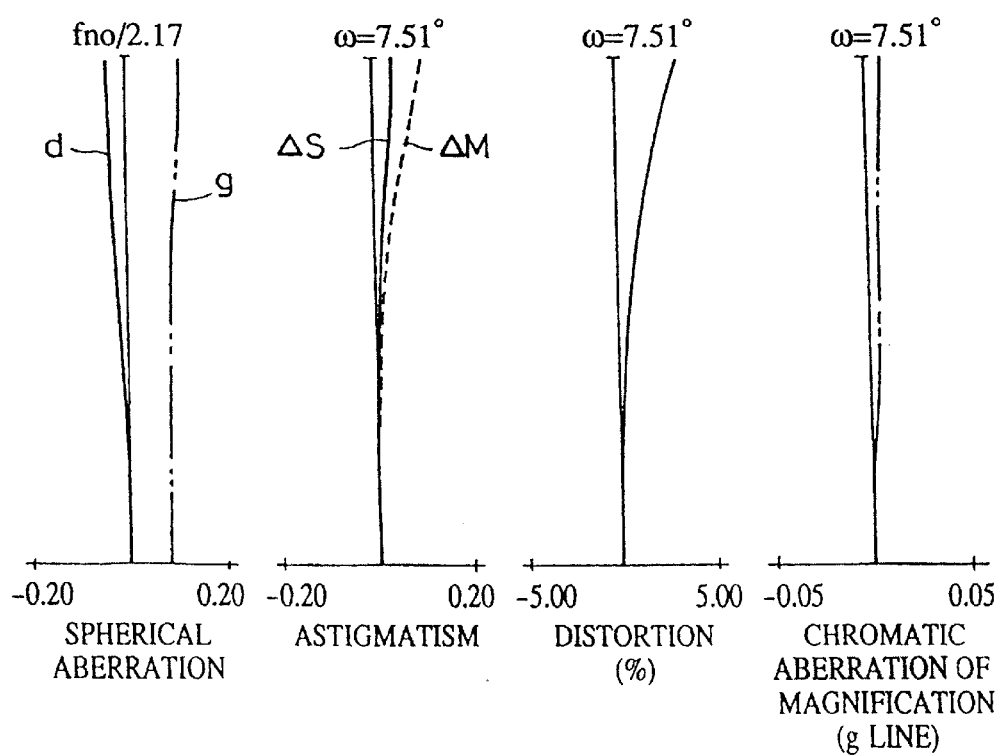
FIGS. 60A through 60D are a diagram showing aberrations of Numerical Example 20 at an intermediate position.

A rear focus type zoom lens device which will now be described incorporates a diffraction optical element of the present invention. The zoom lens device has five lens units including, starting from the end adjacent to an object, a first lens unit having positive refractive power, a second lens unit having negative refractive power, third lens unit having positive refractive power, fourth lens unit having negative refractive power, and a fifth lens unit having positive refractive power. Change of magnification is effected by moving the second and fourth lens units. The first lens unit includes, starting from the end adjacent to the object, a meniscus negative first lens having convex surface facing the object, a positive second lens, and a positive third lens, and a diffraction optical element of which shape is rotationally symmetrical with respect to the optical axis. This diffractive optical element is formed on the refractive surface of one of the first to third lenses or formed as an independent element. FIGS. 54 and 58 are sectional views of rear-focus lens devices incorporating diffractive optical elements of the present invention, constructed in accordance with Numerical Examples 19 and 20 which will be described later. FIGS. 55A to 57D are diagrams showing aberrations of Numerical Example 19, while FIGS. 59A to 60D are diagrams showing aberrations of Numerical Example 20. More specifically, FIGS. 55A–D and 59A–D show aberrations at wide angle ends of the respective Numerical Examples, FIGS. 56A–D and 60A–D show aberrations at intermediate positions. FIGS. 59A–D and 61A–D show aberrations at telephoto ends.

The characteristic features of the lens arrangements of Numerical examples 19 and 20 shown in FIGS. 54 and 58 will now be described. Referring to FIGS. 54 and 58, L1 indicates the first lens unit having positive refractive power, L2 indicates the second lens unit having negative refractive power, L3 indicates the third lens unit having positive refractive power, L4 indicates the fourth lens unit having negative refractive power, and L5 indicates the fifth lens unit having positive refractive power. Symbol SP represents the aperture stop which is located behind the second lens unit L2 and in front of the third lens unit L3. Symbol G represents a glass block including color separation optical system, phase plate, filter, and so on. A symbol IP represents an image plane.

In this embodiment, changing of magnification from the wide angle end towards the telephoto end is effected by moving the second lens unit L2 towards the image plane, while moving the fourth lens unit L4 along a locus which is convex towards the image plate so as to effect compensation for the movement of the image plane caused by the change of magnification.

The illustrated zoom lens device is of rear-focus type in which the fourth lens unit L4 is moved along the optical axis. In the Figures, a solid-line curve 4a and the broken-line curve 4b represent the loci of the fourth lens unit L4 in the course of changing magnification from the wide angle end to the telephoto end when the zoom lens device is focused on an object at infinity and when the zoom lens device is focused on an object at the nearby object. The first, third and fifth lens units L1, L3 and L5 are kept fixed during the magnification changing operation and during focusing operation. The arrangement, however, may be such that the first lens unit L1 is moved during changing the magnification in order to reduce the burden on the second lens unit L2.

In the illustrated embodiment, the movement of the fourth lens unit L4 causes not only the compensation for movement of the image plane due to change of magnification but also focusing of the fourth lens unit L4. In particular, as shown by the curves 4a and 4b, the fourth lens unit L4 is moved along a locus which is convex towards the image plane, during changing of magnification from the wide angle end to the telephoto end.

In the illustrated embodiment, the fourth lens unit L4 is moved forward as indicated by a straight line 4c, when the zoom lens device which has been focused on an object at infinity is focused on a nearby object, at the telephoto end.

In the illustrated embodiment, the first lens unit L1 includes the following elements starting from the end adjacent to the object: the meniscus negative first lens 11 having convex surface directed towards the object, the positive second lens, a positive third lens, and the diffractive optical element of which shape is rotationally symmetrical with respect to the optical axis and which is formed on the refractive surface of the second or third lens. The phase of the diffractive optical element is suitably set so as to satisfactorily correct the chromatic aberration produced by the first lens unit L1 while shortening the overall length of the zoom lens device.

Reduction of chromatic aberration by the refractive surfaces alone in the first lens unit L1, without using the diffractive optical element, requires an increase in the number of the lenses or the use of an abnormal dispersion glass. Abnormal dispersion glasses are generally difficult to work, as is the case of FK01. In addition, the lenses constituting the first lens unit L1 tend to be greater in diameter than those in other lens units. Increase in the number of lenses of the first lens unit L1, therefore, leads to a significant increase in the weight of the zoom lens device, which makes it difficult to handle the zoom lens device.

The illustrated embodiment, however, is free from this problem by virtue of the use of the diffractive optical element in the first lens unit L1, together with the meniscus negative first lens, positive second lens and the positive third lens, so as to eliminate the necessity for the use of an abnormal dispersion glass as the lens material.

Using a positive lens as the first lens of the first lens unit L1 undesirably reduces the view angle at the wide angle end, with the result that the use of the zoom lens device is restricted. Using a negative lens which is concave at both surfaces is also not preferred because this type of lens tends to cause a curvature of image, i.e., field curvature, at the wide angle end. In view of this problem, in the illustrated embodiment, refractive power is shared both by the second and third lenses which have positive refractive power. This effectively prevents undesirable increase in the weight of the whole zoom lens device which otherwise may occur due to increase in the overall length of the zoom lens device because of increase in the thickness of the second lens due to increase in the amount of protrusion of the object-side lens of the second lens.

In the illustrated embodiment, the diffractive optical surface of the first lens unit L1 is designed to have positive refractive power, so that the chromatic aberration which is caused by the positive refractive power of the first lens unit L1 is canceled by the opposite chromatic aberration produced by the diffractive optical surface. If the diffractive optical surface is designed to have negative refractive power, the diffractive optical surface produces chromatic aberration which is added to the chromatic aberration produced by the positive refractive surface, so that the achromatism effect of the diffractive optical surface cannot be enjoyed, failing to provide sufficient achromatism effect over the entire optical system.

In the illustrated embodiment, the diffractive optical element is fabricated in a binary manner by a lithographic technique which is one of the techniques for producing holographic optical element (HOE). The diffractive optical element, however, may be produced by a binary optics technique. In order to further enhance the diffraction efficiency, the diffractive surface may be mechanically shaped into a saw-teeth form. The diffractive optical element also may be produced by molding, by means of a mold which is prepared by using one of the above-described techniques.

The configuration of the diffractive optical element used in this embodiment is given by the following expressions, where $\lambda$ represents the reference wavelength (d line), h represents the distance from the optical axis, and $\phi(h)$ represents the phase.

$$\phi(h)=2\pi/\lambda(C2 \cdot h^2 + C4 \cdot h^4 + \ldots C(2i) \cdot h^{2i})$$

The rear-focus zoom lens device of the illustrated embodiment having five lens units well compensates for variation in the aberrations due to changing of magnification, in particular variation in the chromatic aberration, whereby superior optical performance is ensured over the entire range of magnification.

For the purpose of enhancing the aberration correction effect, the illustrated embodiment preferably satisfies one of the conditions expressed by the following expressions (25) to (3).

$$5.1 < |f1/f2| < 9.3 \tag{25}$$

where, f1 and f2 respectively represent the focal lengths of the first and second lens units L1 and L2.

When the refractive power of the second lens unit is increased so that the upper limit of the range specified by the expression (25) is exceeded, Petzval's sum is generated to significantly act in the negative direction, allowing generation of field curvature and astigmatism, thereby deteriorating the optical performance.

Conversely, when the refractive power of the first lens unit is increased so that the absolute value of the ratio f1/f2 is reduced below the lower limit of the range specified by the expression (25), the chromatic aberration generated by the refractive optical system cannot satisfactorily be canceled by the diffractive optical element, making it impossible to effect satisfactory compensation for the chromatic aberration over the entire part of the optical system.

$$1.8 < f1/\sqrt{Fw \cdot Ft} < 3.2 \tag{26}$$

where, f1 represents the focal length of the first lens unit L1, while Fw and Ft respectively represent focal lengths at the wide angle end and the telephoto end.

When the refractive power of the first lens unit L1 is increased so that the value falls below the lower limit of the range specified by the expression (26), the chromatic aberrations generated by the refractive optical system cannot sufficiently be canceled by the diffractive optical element, with the result that compensation for the chromatic aberrations over the entire region of the optical system cannot be performed satisfactorily.

Conversely, when the refractive power of the first lens unit L1 is reduced so that the upper limit of the range specified by the expression (26) is exceeded, the back focus at the wide angle end is reduced to make it difficult to insert a low-pass filter or a color filter.

$$\left. \begin{array}{l} v12 < 65 \\ v13 < 65 \end{array} \right\} \tag{27}$$

where, v12, and v13 respectively represent Abbe numbers of the second and third lenses.

Glass materials having Abbe numbers exceeding the limits specified by the expression (27), typically FK01, are not preferred because they are generally difficult to work.

In order that satisfactory compensation for chromatic aberrations is effected in the present invention, it is preferred that the condition given by the following expression (28) is met, wherein f1i and v1i (i=1, 2 . . .) respectively represent the focal length and the Abbe number of the i-th lens (i=1, 2 . . .) of the first lens unit L1 and $C_2$ represents the coefficient of the second term of the equation defining the shape of the diffractive optical element used in the first lens unit L1

$$|0.5797 \cdot C2 + \Sigma(1/(f1i \cdot v1i)| \cdot f1 < 9.8 \cdot 10^{-3}) \tag{28}$$

The expression shows the condition that is necessary for achieving satisfactory compensation for the chromatic aberrations through synthesis of the achromatism effects of the refractive optical system and the diffractive optical element.

In general, the Abbe number (dispersion value) of a refractive optical system is determined by the following expression, where Nd, Nc and NF respectively represent the values of the refractive power at the wavelengths of d, C and F lines.

$$vd(Nd-1)/(NF-NC)$$

In the meantime, the dispersion value vd of the diffractive optical element is given by the following expression, where $\lambda d$, $\lambda C$ and $\lambda F$ respectively represent the wavelengths of the d line, C line and F line.

$$vd = \lambda d/(\lambda F - \lambda C)$$

Thus, the dispersion value vd is given as vd=−3.45.

The refractive power of the primary diffracted light at the dominant wavelength of the diffractive optical element is approximately determined as follows, where C2 represents the coefficient of the second term of the foregoing expression expressing the phase of the diffractive optical element.

$$\psi = -2 \cdot C2$$

The chromatic aberration generated in a lens unit is proportional to $\psi/\nu$. Therefore, the amount of chromatic aberration of the diffractive optical element corresponding to the amount of chromatic aberration produced in the lens unit is given as follows.

$$-2 \cdot C2/(-3.45) = 0.5797 \cdot C2$$

This amount is expressed as follows, in case of a refractive optical system.

$$\Sigma/(f \cdot \nu)$$

It will be seen that the chromatic aberration compensation effect for a lens unit becomes greater as the sum of these amounts approaches zero.

Exceeding the upper limit posed by the expression (4) is not preferred because the chromatic aberration generated in the first group L1 cannot be performed satisfactorily.

Figure 25:
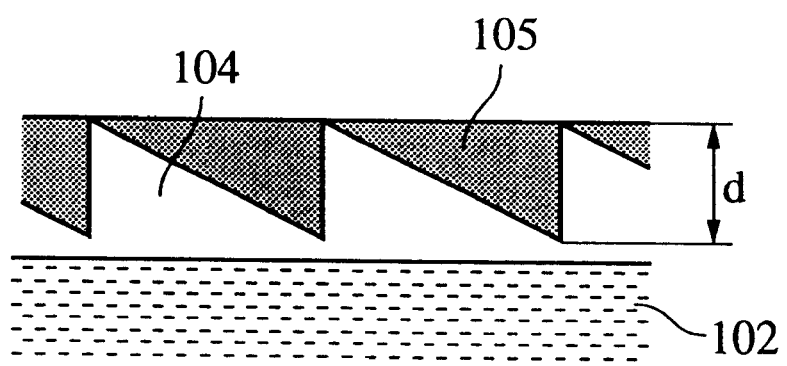
FIG. 25 shows another example of a sectional shape of a grating of a diffraction optical element with a layered structure.

The diffractive optical element used in the illustrated embodiment may have a saw-teeth single-layered structure such as that shown in FIG. 19 mentioned before, or a two-layered structure having two layers laminated one on the other and having an equal or different grating thickness and having different values of refractive index and Abbe number, as shown in FIGS. 22 and 25.

Figure 62:
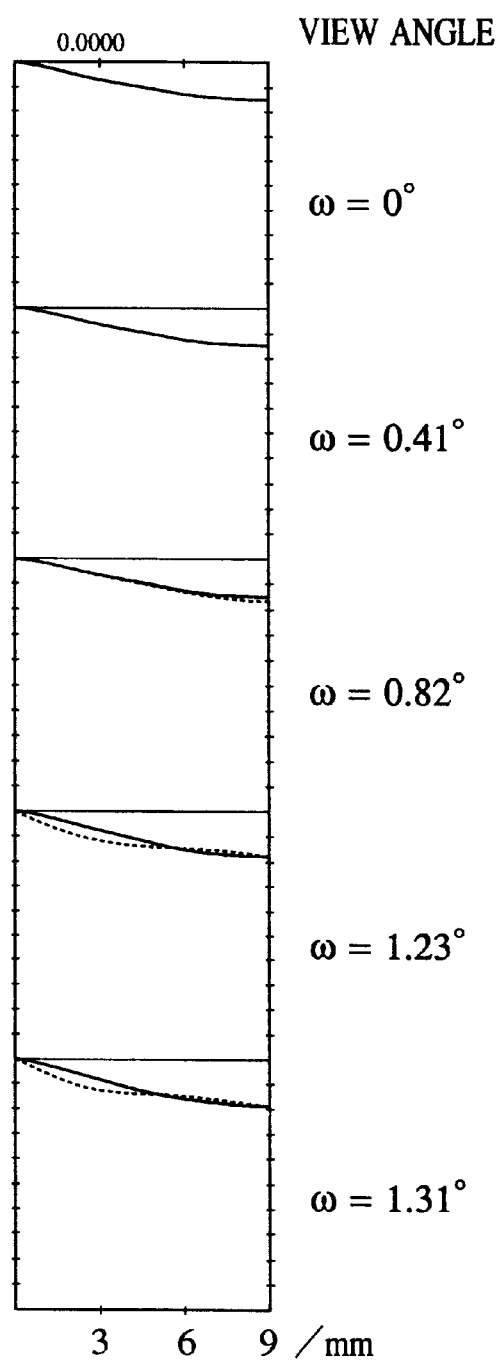
FIG. 62 is an MTF characteristic diagram of Numerical Example 20.

FIG. 62 shows the MTF characteristic at the spatial frequency at telephoto end of Numerical Example 20, formed by using the grating shape as shown in FIG. 9.

Figures 13A, 13B, 13C:
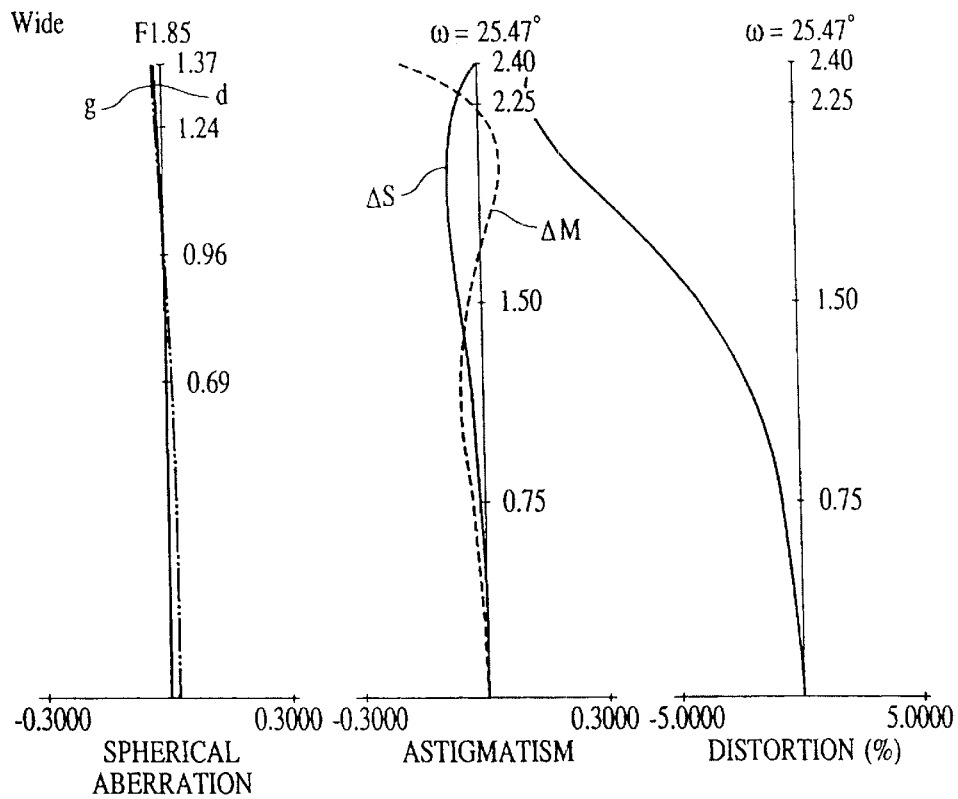
FIGS. 13A–13F illustrate diagrams showing aberrations at a wide angle end and at a telephoto end of the zoom lens device of Numerical Example 5 in accordance with the present invention.
Figures 13D, 13E, 13F:
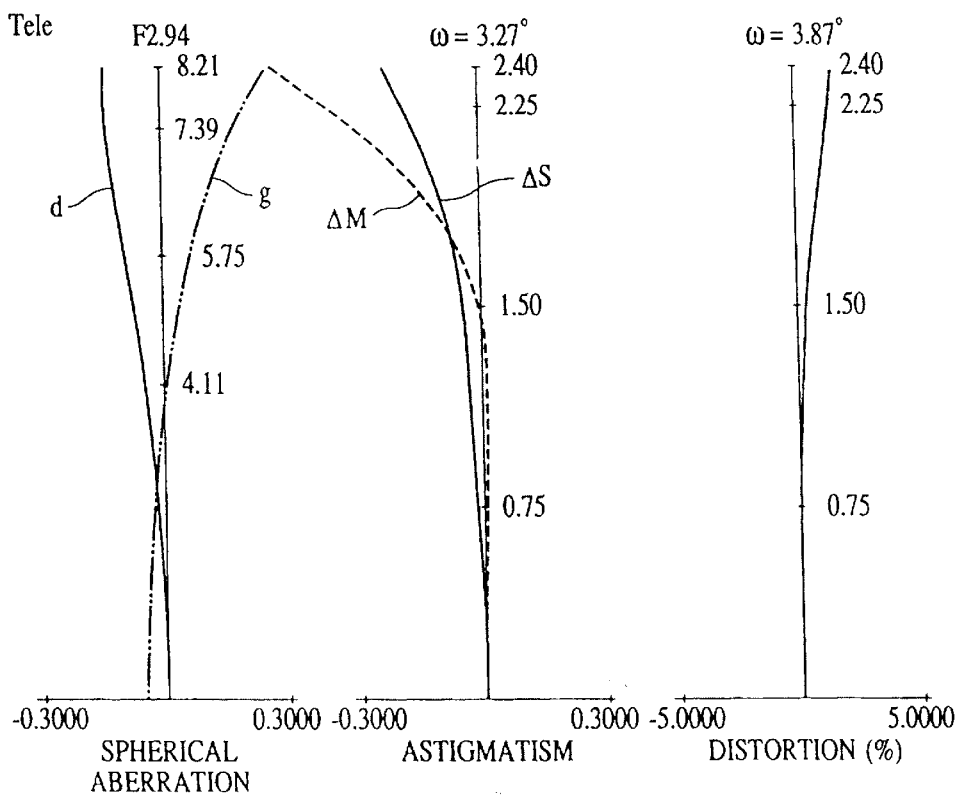
Figures 14A, 14B, 14C:
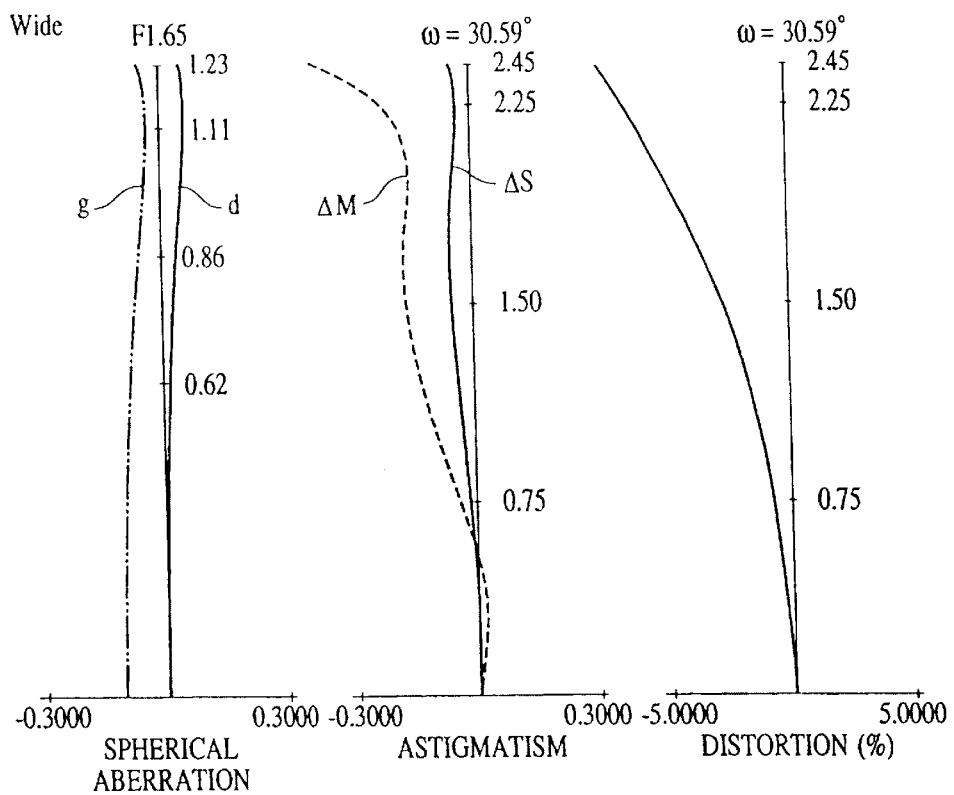
FIGS. 14A–14F illustrate diagrams showing aberrations at a wide angle end and at a telephoto end of the zoom lens device of Numerical Example 6 in accordance with the present invention.
Figures 14D, 14E, 14F:
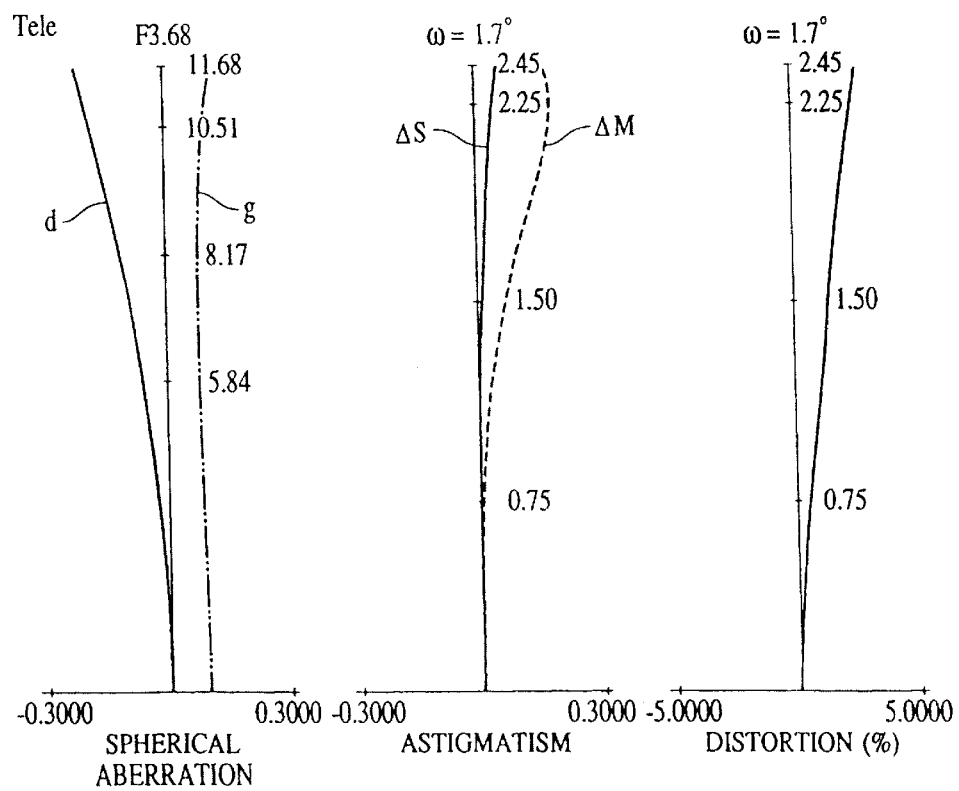
Figure 16A:
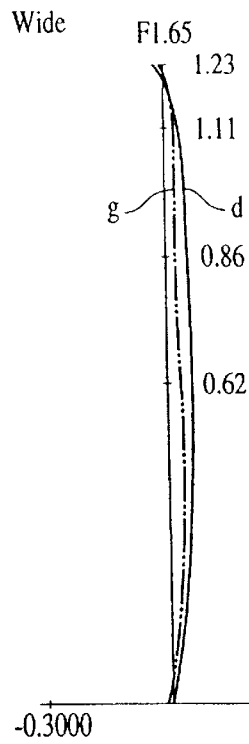
FIGS. 16A–16F illustrate diagrams showing aberrations at a wide angle end and at a telephoto end of the zoom lens device of Numerical Example 8 in accordance with the present invention.
Figure 16B:
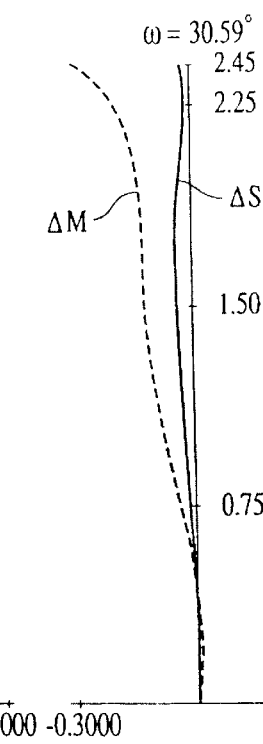
Figure 16C:
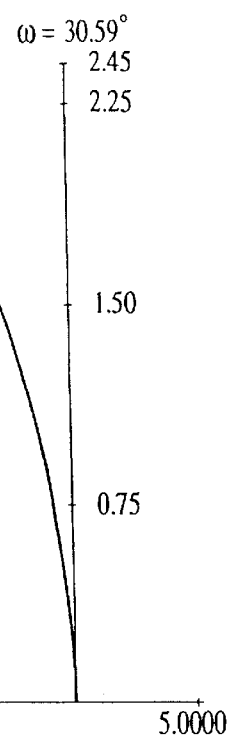
Figure 16D:
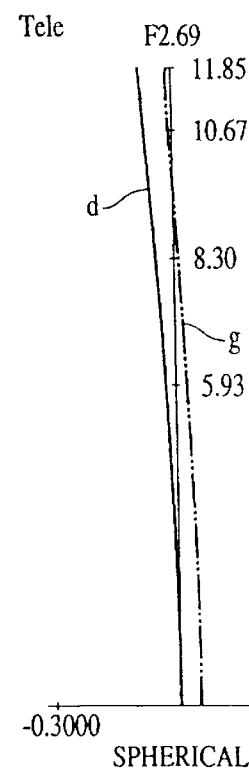
Figure 16E:
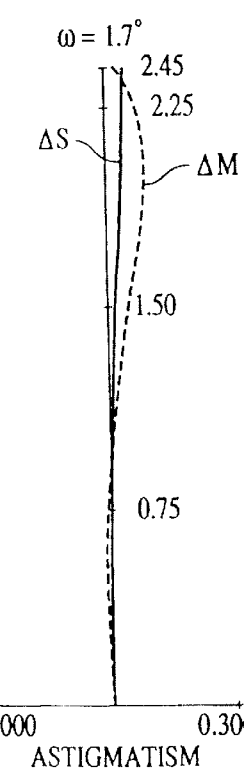
Figure 16F:
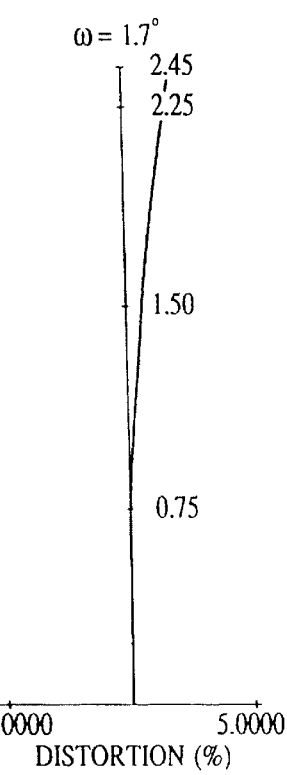

As will be seen from FIG. 13, the laminate-type structure of the diffractive optical element provides diffraction efficiency which is as high as 95% or higher over the entire range of used frequency.

Figure 63:
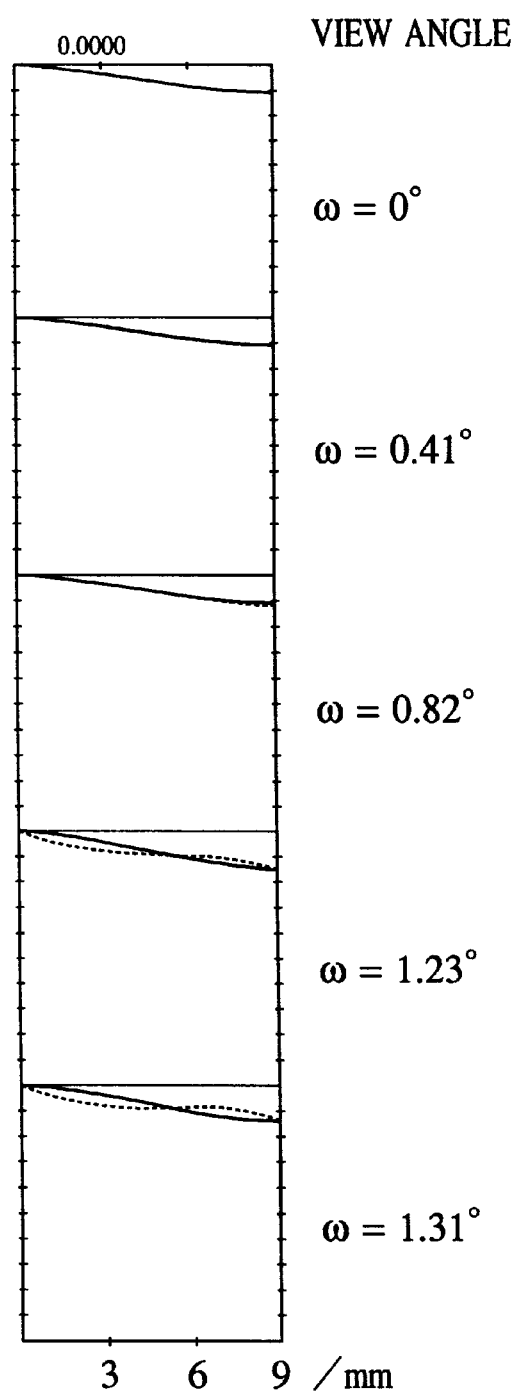
FIG. 63 is an MTF characteristic diagram of Numerical Example 20.

FIG. 63 shows the MTF characteristic at the spatial frequency at telephoto end of Numerical Example 20, formed by using a diffractive optical element having the grating shape as shown in FIGS. 22 and 25. The use of the laminate-type diffraction optical element, improves the MTF characteristic at low frequencies, making it possible to achieve a desired MTF characteristic. In accordance with the invention, it is thus possible to further improve the optical performance.

Numerical Examples 19 and 20 are shown below. In these Examples, ri indicates the radius of curvature of the i-th lens surface as counted starting from the end adjacent to an object, di indicates the lens thickness and air gap size of the i-th lens as counted from the end adjacent to the object, and mi and i respectively represent the refractive index and the Abbe number of the glass constituting the i-th lens. Table 1 shows the relationships between the foregoing condition expressions and Numerical Examples.

The shape of the aspherical surface is expressed as follows, where the direction of running of the light rays is the positive direction along the X axis which coincides with the optical axis, Y axis is an axis perpendicular to the optical axis, R indicates a paraxial radius of curvature, and K, B, C, D, E and F respectively represent aspherical surface coefficients.

$$X = \frac{(1/R)H^2}{1 + \sqrt{1 - (1+K)(Y/R)^2}} + BH^4 + CH^6 + DH^8$$

In the expression shown above, (D–0X) means $10^{-x}$.

NUMERICAL EXAMPLE 19

| f = 3.56–104.66 | fno = 1:1.66–3.76 | 2ω = 68.0°–2.62° | |
|---|---|---|---|
| r 1 = 58.198 | d 1 = 1.50 | n 1 = 1.84666 | v 1 = 23.8 |
| r 2 = 36.101 | d 2 = 1.64 | | |
| r 3 = 62.354 | d 3 = 3.20 | n 2 = 1.51633 | v 2 = 64.2 |
| r 4 = −485.113 | d 4 = 0.20 | | |
| r 5 = 30.020 | d 5 = 4.20 | n 3 = 1.60311 | v 3 = 60.6 |
| r 6 = 382.253 | d 6 = variable | | |
| r 7 = 60.737 | d 7 = 0.70 | n 4 = 1.88300 | v 4 = 40.8 |
| r 8 = 6.988 | d 8 = 3.35 | | |
| r 9 = −14.776 | d 9 = 0.60 | n 5 = 1.83400 | v 5 = 37.2 |
| r10 = 89.239 | d10 = 0.79 | | |
| r11 = 20.537 | d11 = 2.50 | n 6 = 1.84666 | v 6 = 23.8 |
| r12 = −14.538 | d12 = 0.60 | n 7 = 1.83400 | v 7 = 37.2 |
| r13 = 642.246 | d13 = variable | | |
| r14 = (stop) | d14 = 1.40 | | |
| r15 = 194.150 | d15 = 2.40 | n 8 = 1.69680 | v 8 = 55.5 |
| r16 = −19.020 | d16 = 0.15 | | |
| r17 = 20.089 | d17 = 3.90 | n 9 = 1.60311 | v 9 = 60.6 |
| r18 = −13.961 | d18 = 0.65 | n10 = 1.84666 | v10 = 23.8 |
| r19 = −43.614 | d19 = variable | | |
| r20 = −13.173 | d20 = 2.00 | n11 = 1.69895 | v11 = 30.1 |
| r21 = −8.146 | d21 = 1.60 | n12 = 1.58313 | v12 = 59.4 |
| r22 = 19.181 (aspherical surface) | d22 = variable | | |
| r23 = 51.649 | d23 = 2.80 | n13 = 1.58144 | v13 = 40.8 |
| r24 = −17.686 | d24 = 0.15 | | |
| r25 = 14.492 | d25 = 0.60 | n14 = 1.84666 | v14 = 23.8 |
| r26 = 7.041 | d26 = 0.00 | n15 = 1.58313 | v15 = 59.4 |
| r27 = 7.041 | d27 = 4.10 | n16 = 1.58313 | v16 = 59.4 |
| r28 = −85.000 (aspherical surface) | d28 = 2.00 | | |
| r29 = ∞ | d29 = 3.70 | n17 = 1.51633 | v17 = 64.2 |
| r30 = ∞ | | | |

Phase Coefficients of Diffractive Optical Surface

| Phase Coefficients of Diffractive Optical Surface | | |
|---|---|---|
| | C2 | C4 |
| 5th surface | −7.29587D−05 | −1.74544D−08 |

Aspherical Surface Coefficients

| Aspherical Surface Coefficients | | | |
|---|---|---|---|
| K | B | C | D |
| 22nd surface | 7.87968D−01 | −8.53655D−05 | −2.43629D−06 | 5.35972D−08 |
| 28th surface | −1.42473D+02 | 2.02644D−05 | 2.25666D−06 | −1.28897D−08 |

Focal length

-continued

Aspherical Surface Coefficients

| | K | B | C | D |
|---|---|---|---|---|
| variable range | | 3.56 | 18.07 | 104.66 |
| d 6 | | 0.97 | 25.06 | 39.20 |
| d 13 | | 39.16 | 15.07 | 0.92 |
| d 19 | | 2.70 | 7.72 | 2.70 |
| d 22 | | 12.02 | 7.01 | 12.02 |

NUMERICAL EXAMPLE 20 f = 3.56–104.66    fno = 1:1.66–3.88    2ω = 68.0°–2.62°

| | | | |
|---|---|---|---|
| r 1 = 56.068 | d 1 = 1.50 | n 1 = 1.84666 | v 1 = 23.8 |
| r 2 = 34.779 | d 2 = 1.74 | | |
| r 3 = 60.820 | d 3 = 3.20 | n 2 = 1.51633 | v 2 = 64.2 |
| r 4 = −439.925 | d 4 = 0.20 | | |
| r 5 = 28.943 | d 5 = 4.20 | n 3 = 1.60311 | v 3 = 60.6 |
| r 6 = 376.672 | d 6 = variable | | |
| r 7 = 56.894 | d 7 = 0.70 | n 4 = 1.88300 | v 4 = 40.8 |
| r 8 = 6.754 | d 8 = 3.33 | | |
| r 9 = −14.112 | d 9 = 0.60 | n 5 = 1.83400 | v 5 = 37.2 |
| r10 = 132.515 | d10 = 0.79 | | |
| r11 = 20.030 | d11 = 2.50 | n 6 = 1.84666 | v 6 = 23.8 |
| r12 = −14.101 | d12 = 0.60 | n 7 = 1.83400 | v 7 = 37.2 |
| r13 = 207.980 | d13 = variable | | |
| r14 = (stop) | d14 = 1.40 | | |
| r15 = 213.965 | d15 = 2.40 | n 8 = 1.69680 | v 8 = 55.5 |
| r16 = −18.908 | d16 = 0.15 | | |
| r17 = 20.264 | d17 = 3.90 | n 9 = 1.60311 | v 9 = 60.6 |
| r18 = −13.923 | d18 = 0.65 | n10 = 1.84666 | v10 = 23.8 |
| r19 = −42.612 | d19 = variable | | |
| r20 = −13.505 | d20 = 2.00 | n11 = 1.69895 | v11 = 30.5 |
| r21 = −8.225 | d21 = 1.60 | n12 = 1.58913 | v12 = 61.2 |
| r22 = 19.466 (aspherical surface) | d22 = variable | | |
| r23 = 56.781 | d23 = 2.80 | n13 = 1.58144 | v13 = 40.8 |
| r24 = −17.408 | d24 = 0.15 | | |
| r25 = 15.052 | d25 = 0.60 | n14 = 1.84666 | v14 = 23.8 |
| r26 = 7.237 | d26 = 0.00 | n15 = 1.58913 | v15 = 61.2 |
| r27 = 7.237 | d27 = 4.10 | n16 = 1.58913 | v16 = 61.2 |
| r28 = −85.000 (aspherical surface) | d28 = 2.00 | | |
| r29 = ∞ | d29 = 3.70 | n17 = 1.51633 | v17 = 64.2 |
| r30 = ∞ | | | |

Phase Coefficients of Diffractive Optical Surface

| | C2 | C4 |
|---|---|---|
| 3rd surface | −7.61350D−05 | −2.32043D−08 |

Aspherical Surface Coefficients

| | K | B | C | D |
|---|---|---|---|---|
| 22nd | 2.02773D+00 | −8.66612D−05 | −2.79060D−06 | 5.86076D−08 |

-continued

Aspherical Surface Coefficients

| | K | B | C | D |
|---|---|---|---|---|
| surface 28th surface | −2.73171D+02 | −8.56556D−06 | 2.21959D−06 | −9.42222D−09 |

| Focal length variable range | 3.56 | 18.21 | 104.66 |
|---|---|---|---|
| d 6 | 0.95 | 24.05 | 37.62 |
| d 13 | 37.66 | 14.57 | 1.00 |
| d 19 | 2.70 | 8.00 | 2.70 |
| d 22 | 12.18 | 6.88 | 12.18 |

TABLE 1

| | Numerical Examples | |
|---|---|---|
| Conditions | 19 | 20 |
| (1) $|f1/f2|$ | 7.01 | 7.04 |
| (2) $f1/\sqrt{fW \cdot fT}$ | 2.65 | 2.25 |
| (3) v12 | 64.2 | 64.2 |
| v13 | 60.6 | 60.6 |
| (4) $|0.5797C_{21}+\Sigma(1/(f1iv1i)| \cdot f1$ | $2.55 \times 10^{-3}$ | $2.54 \times 10^{-3}$ |

Each of Numerical Examples 19 and 20 provides a rear-focus type zoom lens device constituted by five lens units with positive, negative, positive, negative and positive refractive power and incorporating a diffractive optical element. By suitably setting the structures and arrangements of the respective lens units, it is possible to obtain a rear-focus type zoom lens device incorporating a diffractive optical element, which exhibits superior optical performance over the entire range of magnification from wide angle end to telephoto end and over entire range of object distance from infinite to nearby object, and which features a large aperture ratio, as well as large ratio of change of magnification.

Further, the rear-focus type zoom lens device has five lens units with positive, negative, positive, negative and positive refractive power, and a diffractive optical element is incorporated in one of the lens units, so that chromatic aberration generated in the first lens unit is reduced by virtue of the synthesis of the diffractive optical effect and the refractive effect of the refractive optical system. It is therefore possible to reduce the number of the lenses and, hence, the overall length of the zoom lens device, thus providing a rear-focus type zoom lens device which exhibits superior optical performance over the entire range of magnification change from wide angle end to the telephoto end.

What is claimed is:

1. A zoom lens device comprising in order of lens units from a long conjugate side, at least:
   a first lens unit having a positive refractive power and including a diffraction optical element;
   a second lens unit having a negative refractive power, said second lens unit being moved during zooming in order to change the size of an image;
   a stationary third lens unit having a positive refractive power; and
   a fourth lens unit, wherein during zooming said fourth lens unit is moved to correct changes in an image plane occurring as the magnification changes, wherein the condition:

$$\Psi 1 \cdot C1 < 0$$

is satisfied, when $\Psi 1$ is the refractive power due to the curvature of a surface corresponding to a diffraction optical surface of said diffraction optical element, and when the phase at said diffraction optical element is:

$$\phi(h) = \frac{2\pi}{\lambda}(C1 \cdot h^2 + C2 \cdot h^4 + C3 \cdot h^6 + \cdots + Ci \cdot h^{2i})$$

where $\lambda$ is the wavelength of an incident light beam, Ci is a coefficient representing the phase, and h is the height measured from an optical axis.

2. A zoom lens device according to claim 1, wherein said diffraction optical element has a diffraction optical surface at an image plane side.

3. A zoom lens device according to claim 1, wherein the condition:

$$\Psi 1 \cdot C1 < 0$$

is satisfied, when $\Psi 1$ is the refractive power of said first lens unit.

4. A zoom lens device according to claim 1, wherein the conditions:

$$1 \times 10^{-4} < |C2/C1| < 1 \times 10^{-1}$$

and $$1 \times 10^{-7} < |C3/C1| < 1 \times 10^{-4}$$

are satisfied.

5. A zoom lens device according to claim 1, wherein the condition:

$$0.05 < F1/Fbo < 0.7$$

is satisfied, where F1 is the focal length of said first lens unit and Fbo is the focal length of only a diffraction optical surface of said diffraction optical element.

6. A zoom lens device according to claim 1, wherein the condition:

$$1.0 < \frac{F1}{\sqrt{Fw \cdot Ft}} < 2.5$$

is satisfied, where F1 is the focal length of said first lens unit and Fw and Ft are the focal lengths of the entire lens system at a wide angle end and at a telephoto end, respectively.

7. A zoom lens device according to claim 1, wherein the condition:

$$|F1/Rbo| < 1.8$$

is satisfied, when there is only one diffraction optical surface in said first lens unit, and when F1 is the focal length of said first lens unit and Rbo is the curvature of a surface corresponding to said diffraction optical surface.

8. A zoom lens device according to claim 1, wherein the condition:

$$0.1 < t1/F1 < 0.27$$

is satisfied, where t1 is the axial thickness of said first lens unit and F1 is the focal length of said first lens unit.

9. A zoom lens device according to claim 1, further comprising a stationary fifth lens unit having a positive refractive power, wherein said first lens unit, said second lens unit, said third lens unit, said fourth lens unit, and said fifth lens unit are arranged in that order from the long conjugate side, and wherein said fourth lens unit has a negative refractive power.

10. A zoom lens device according to claim 1, further comprising a fifth lens unit having a negative refractive power, wherein said first lens unit, said second lens unit, said third lens unit, said fourth lens unit, and said fifth lens unit are arranged in that order from the long conjugate side, and wherein said fourth lens unit has a positive refractive power.

11. A zoom lens device according to claim 1, wherein a most object side surface of said first lens unit is aspherical.

12. A zoom lens device according to claim 1, wherein said second lens unit has at least one diffraction optical surface.

13. A zoom lens device according to claim 12, wherein said second lens unit has an aspherical surface.

14. A zoom lens device according to claim 1, wherein a most image side surface of said first lens unit is a diffraction optical surface.

15. A zoom lens device according to claim 1, wherein said first lens unit is stationary during zooming, and wherein said fourth lens unit moves during focusing.

16. A zoom lens device comprising in order of lens units from a long conjugate side, at least:

a first lens unit having a positive refractive power and including a diffraction optical element;

a second lens unit having a negative refractive power, said second lens unit being moved during zooming in order to change the size of an image; and a third lens unit having a positive refractive power, wherein during zooming (i) said third lens unit or (ii) in the case where there is one or more lens unit on the short conjugate side of said third lens unit, at least one lens unit of said third lens unit and said one or more lens unit, is moved to correct changes in an image plane occurring as the magnification changes, and wherein said diffraction element comprises a first annular diffraction grating, and a second annular diffraction grating formed on said first annular diffraction grating, with said first annular diffraction grating and said second annular diffraction grating being made of different materials.

17. A zoom lens device comprising in order of lens units from a long conjugate side, at least:

a first lens unit;

a second lens unit which is moved during zooming in order to change the size of an image, said second lens unit including a diffraction optical element;

a third lens unit which is stationary during zooming; and a fourth lens unit, wherein during zooming (i) said fourth lens unit or (ii) in the case where there is one or more lens unit on the short conjugate side of said fourth lens unit, at least one lens unit of said fourth lens unit and said one or more lens unit, is moved in order to correct a change in an image plane which occurs as the magnification changes, and wherein the condition:

$$\Psi 2 \cdot C1 < 0$$

is satisfied, when $\Psi 2$ is the refractive power due to the curvature of a surface corresponding to a diffraction optical surface of said diffraction optical element, and when the phase at said diffraction optical element is:

$$\phi(h) = \frac{2\pi}{\lambda}(C1 \cdot h^2 + C2 \cdot h^4 + C3 \cdot h^6 + \cdots + Ci \cdot h^{2i})$$

where $\lambda$ is the wavelength of an incident light beam, Ci is a coefficient representing the phase, and h is the height measured from an optical axis.

18. A zoom lens device according to claim 17, wherein the condition:

$$\Psi 2 \cdot C1 < 0$$

is satisfied, when $\Psi 2$ is the refractive power of said second lens unit.

19. A zoom lens device according to claim 17, wherein the conditions:

$$1 \times 10^{-4} < |C2/C1| < 1 \times 10^{+1}$$

and $$1 \times 10^{-5} < |C3/C1| < 1 \times 10^{-3}$$

are satisfied.

20. A zoom lens device according to claim 17, wherein the condition:

$$0.1 < |F2/Fbo| < 0.7$$

is satisfied, where F2 is the focal length of said second lens unit and Fbo is the focal length of only a diffraction optical surface of said diffraction optical element.

21. A zoom lens device according to claim 17, wherein the condition:

$$0.25 < |F2/\sqrt{Fw \cdot Ft}| < 0.45$$

is satisfied, where F2 is the focal length of said second lens unit, and Fw and Ft are the focal lengths of the entire lens system at a wide angle end and at a telephoto end, respectively.

22. A zoom lens device according to claim 17, wherein the condition:

$$|F2/Rbo| < 1.8$$

is satisfied, when there is only one diffraction optical surface, F2 is the focal length of said second lens unit, and Rbo is the curvature of a surface corresponding to said diffraction optical surface.

23. A zoom lens device according to claim 17, wherein the condition:

$$0.05 < |t2/F2| < 0.4$$

is satisfied, where t2 is the axial thickness of said second lens unit, and F2 is the focal length of said second lens unit.

24. A zoom lens device according to claim 17, wherein said first lens unit has a positive refractive power, said second lens unit has a negative refractive power, said third lens unit has a positive refractive power, and said fourth lens unit has a positive refractive power.

25. A zoom lens device according to claim 17, wherein said diffraction optical element comprises a first annular diffraction grating and a second diffraction grating formed on said first annular diffraction grating, with said first annular diffraction grating and said second annular diffraction grating being made of different materials.

26. A zoom lens device according to claim 17, wherein said third lens unit has a positive refractive power, wherein said first lens unit and said third lens unit are stationary during zooming, and wherein said fourth lens unit moves during each of zooming and focusing.

27. A zoom lens device comprising in order of lens units from a long conjugate side, at least:

a first lens unit;

a second lens unit which is moved during zooming in order to change the size of an image;

a third lens unit which is stationary during zooming and which includes a diffraction optical element; and a fourth lens unit;

wherein during zooming (i) said fourth lens unit or (ii) in the case where there is one or more lens unit on the short conjugate side of said fourth lens unit, at least one lens unit of said fourth lens unit and said one or more lens unit, is moved to correct a change in an image plane which occurs as the magnification changes.

28. A zoom lens device according to claim 27, wherein said third lens unit has a positive refractive power, wherein said first lens unit and said third lens unit are stationary during zooming, and wherein said fourth lens unit moves during each of zooming and focusing.

29. A zoom lens device according to claim 27, wherein said first lens unit has a positive refractive power, said second lens unit has a negative refractive power, said third lens unit has a positive refractive power, and said fourth lens unit has a positive refractive power.

30. A zoom lens device according to claim 27, wherein the condition:

$$\Psi 3 \cdot C1 < 0$$

is satisfied, when $\Psi 3$ is the refractive power of said third lens unit, and when the phase at said diffraction optical element is:

$$\phi(h) = \frac{2\pi}{\lambda}(C1 \cdot h^2 + C2 \cdot h^4 + C3 \cdot h^6 + \cdots + Ci \cdot h^{2i})$$

where $\lambda$ is the wavelength of an incident light beam, Ci is a coefficient representing the phase, and h is the height measured from an optical axis.

31. A zoom lens device according to claim 27, wherein the condition:

$$\Psi 3 \cdot C1 < 0$$

is satisfied, when $\Psi 3$ is the refractive power due to the curvature of a surface corresponding to a diffraction optical surface of said diffraction optical element, and when the phase at said diffraction optical element is:

$$\phi(h) = \frac{2\pi}{\lambda}(C1 \cdot h^2 + C2 \cdot h^4 + C3 \cdot h^6 + \cdots + Ci \cdot h^{2i})$$

where $\lambda$ is the wavelength of an incident light beam, Ci is a coefficient representing the phase, and h is the height measured from an optical axis.

32. A zoom lens device according to claim 27, wherein the conditions:

$$1 \times 10^{-4} < |C2/C1| < 1 \times 10^{-1}$$

and $$1 \times 10^{-5} < |C3/C1| < 1 \times 10^{-2}$$

are satisfied, when the phase at said diffraction optical element is:

$$\phi(h) = \frac{2\pi}{\lambda}(C1 \cdot h^2 + C2 \cdot h^4 + C3 \cdot h^6 + \cdots + Ci \cdot h^{2i})$$

where $\lambda$ is the wavelength of an incident light beam, Ci is a coefficient representing the phase, and h is the height measured from an optical axis.

33. A zoom lens device according to claim 27, wherein the condition:

$$0.05 < F3/Fbo < 0.2$$

is satisfied, where F3 is the focal length of said third lens unit and Fbo is the focal length of only a diffraction optical surface of said diffraction optical element.

34. A zoom lens device according to claim 27, wherein the condition:

$$0.5 < F3/\sqrt{Fw \cdot Ft} < 1.0$$

is satisfied, where F3 is the focal length of said third lens unit, and Fw and Ft are the focal lengths of the entire lens system at a wide angle end and at a telephoto end, respectively.

35. A zoom lens device according to claim 27, wherein the condition:

$$|F3/Rbo| 0.7$$

is satisfied, when there is only one diffraction optical surface in said third lens unit, F3 is the focal length of said third lens unit, and Rbo is the curvature of a surface corresponding to said diffraction optical surface of said diffraction optical element.

36. A zoom lens device according to claim 27, wherein the condition:

$$0.1 < t3/F3 < 0.27$$

is satisfied, where t3 is the axial thickness of said third lens unit, and F3 is the focal length of said third lens unit.

37. A zoom lens device according to claim 27, wherein said first lens unit has a positive refractive power, said second lens unit has a negative refractive power, said third lens unit has a positive refractive power, and said fourth lens unit has a negative refractive power.

38. A zoom lens device according to claim 27, wherein said diffraction optical element comprises a first annular diffraction grating and a second annular diffraction grating formed on said first annular diffraction grating, with said first annular diffraction grating and said second annular diffraction grating being made of different materials.

39. A zoom lens device comprising in order of lens units from a long conjugate side, at least:

a first lens unit;

a second lens unit which is moved during zooming in order to change the size of an image;

a third lens unit which is stationary during zooming; and a fourth lens unit including a diffraction optical element;

wherein during zooming (i) said fourth lens unit or (ii) in the case where there is one or more lens unit on the short conjugate side of said fourth lens unit, at least one lens unit of said fourth lens unit and said one or more lens unit, is moved to correct changes in an image plane occurring as the magnification changes.

40. A zoom lens device according to claim 39, wherein said first lens unit has a positive refractive power, said second lens unit has a negative refractive power, said third lens unit has a positive refractive power, and said fourth lens unit has a positive refractive power.

41. A zoom lens device according to claim 39, wherein a most image side surface of said fourth lens unit is a diffraction optical surface.

42. A zoom lens device according to claim 39, wherein a most object side surface of said fourth lens unit is a diffraction optical surface.

43. A zoom lens device according to claim 39, wherein said third lens unit has a positive refractive power, wherein said first lens unit and said third lens unit are stationary during zooming, and wherein said fourth lens unit moves during each of zooming and focusing.

44. An optical apparatus, comprising:

a zoom lens device; and means for holding said zoom lens device, wherein said zoom lens device comprises in order of lens units from a long conjugate side, at least:

(a) a first lens unit having a positive refractive power and including a diffraction optical element;

(b) a second lens unit having a negative refractive power, said second lens unit being moved during zooming in order to change the size of an image;

(c) a stationary third lens unit having a positive refractive power; and (d) a fourth lens unit, wherein during zooming said fourth lens unit is moved to correct changes in an image plane occurring as the magnification changes, wherein the condition:

$$\Psi 1 \cdot C1 < 0$$

is satisfied, when $\Psi 1$ is the refractive power due to the curvature of a surface corresponding to a diffraction optical surface of said diffraction optical element, and when the phase at said diffraction optical element is:

$$\phi(h) = \frac{2\pi}{\lambda}(C1 \cdot h^2 + C2 \cdot h^4 + C3 \cdot h^6 + \cdots + Ci \cdot h^{2i})$$

where $\lambda$ is the wavelength of an incident light beam, Ci is a coefficient representing the phase, and h is the height measured from an optical axis.

45. An optical apparatus according to claim 44, wherein said diffraction optical element has a diffraction optical surface at an image plane side.

46. An optical apparatus according to claim 44, wherein the condition:

$$\Psi 1 \cdot C1 < 0$$

is satisfied, when $\Psi 1$ is the refractive power of said first lens unit.

47. An optical apparatus according to claim 44, wherein the conditions:

$$1 \times 10^{-4} < |C2/C1| < 1 \times 10^{-1}$$

and $$1 \times 10^{-7} < |C3/C1| < 1 \times 10^{-4}$$

are satisfied.

48. An optical apparatus according to claim 44, wherein the condition:

$$0.05 < F1/Fbo < 0.7$$

is satisfied, where F1 is the focal length of said first lens unit and Fbo is the focal length of only said diffraction optical surface of said diffraction optical element.

49. An optical apparatus according to claim 44, wherein the condition:

$$1.0 < \frac{F1}{\sqrt{Fw \cdot Ft}} < 2.5$$

is satisfied, where F1 is the focal length of said first lens unit and Fw and Ft are the focal lengths of the entire lens system at a wide angle end and at a telephoto end, respectively.

50. An optical apparatus according to claim 44, wherein the condition:

$$|F1/Rbo| < 1.8$$

is satisfied, when there is only one diffraction optical surface in said first lens unit, and when F1 is the focal length of said first lens unit and Rbo is the curvature of a surface corresponding to said diffraction optical surface.

51. An optical apparatus according to claim 44, wherein the condition:

$$0.1 < t1/F1 < 0.27$$

is satisfied, where t1 is the axial thickness of said first lens unit and F1 is the focal length of said first lens unit.

52. An optical apparatus comprising in order of lens units from a long conjugate side, at least:
  a first lens unit having a positive refractive power and including a diffraction optical element;
  a second lens unit having a negative refractive power, said second lens unit being moved during zooming in order to change the size of an image; and
  a third lens unit having a positive refractive power,
  wherein during zooming (i) said third lens unit or (ii) in the case where there is one or more lens unit on the short conjugate side of said third lens unit, at least one lens unit of said third lens unit and said one or more lens unit, is moved to correct changes in an image plane occurring as the magnification changes, and
  wherein said diffraction element comprises a first annular diffraction grating, and a second annular diffraction grating formed on said first annular diffraction grating, with said first annular diffraction grating and said second annular diffraction grating being made of different materials.

53. An optical apparatus, comprising:
  a zoom lens device; and
  means for holding said zoom lens device;
  wherein said zoom lens device comprises in order of lens units from a long conjugate side, at least:
    (a) a first lens unit;
    (b) a second lens unit which is moved during zooming in order to change the size of an image, said second lens unit including a diffraction optical element;
    (c) a third lens unit which is stationary during zooming; and
    (d) a fourth lens unit;
  wherein during zooming (i) said fourth lens unit or (ii) in the case where there is one or more lens unit on the short conjugate side of said fourth lens unit, at least one lens unit of said fourth lens unit and said one or more lens unit, is moved in order to correct a change in an image plane which occurs as the magnification changes, and
  wherein the condition $$\Psi 2 \cdot C1 < 0$$

is satisfied, when $\Psi 2$ is the refractive power due to the curvature of a surface corresponding to a diffraction optical surface of said diffraction optical element, and when the phase at said diffraction optical element is:

$$\phi(h) = \frac{2\pi}{\lambda}(C1 \cdot h^2 + C2 \cdot h^4 + C3 \cdot h^6 + \cdots + Ci \cdot h^{2i})$$

where $\lambda$ is the wavelength of an incident light beam, Ci is a coefficient representing the phase, and h is the height measured from an optical axis.

54. An optical apparatus according to claim 53, wherein the condition:

$$\Psi 2 \cdot C1 < 0$$

is satisfied, when $\Psi 2$ is the refractive power of said second lens unit.

55. An optical apparatus according to claim 53, wherein the conditions:

$$1 \times 10^{-4} < |C2/C1| < 1 \times 10^{+1}$$

and $$1 \times 10^{-5} < |C3/C1| < 1 \times 10^{-3}$$

are satisfied.

56. An optical apparatus according to claim 53, wherein the condition:

$$0.1 < |F2/Fbo| < 0.7$$

is satisfied, where F2 is the focal length of said second lens unit and Fbo is the focal length of only a diffraction optical surface of said diffraction optical element.

57. An optical apparatus according to claim 53, wherein the condition:

$$0.25 < |F2/\sqrt{Fw \cdot Ft}| < 0.45$$

is satisfied, where F2 is the focal length of said second lens unit, and Fw and Ft are the focal lengths of the entire lens system at a wide angle end and at a telephoto end, respectively.

58. An optical apparatus according to claim 53, wherein the condition:

$$|F2/Rbo| < 1.8$$

is satisfied, when there is only one diffraction optical surface in said second lens unit, F2 is the focal length of said second lens unit, and Rbo is the curvature of a surface corresponding to said diffraction optical surface of said diffraction optical element.

59. An optical apparatus according to claim 53, wherein the condition:

$$0.05 < |t2/F2| < 0.4$$

is satisfied, where t2 is the axial thickness of said second lens unit, and F2 is the focal length of said second lens unit.

60. An optical apparatus according to claim 53, wherein said first lens unit has a positive refractive power, said second lens unit has a negative refractive power, said third lens unit has a positive refractive power, and said fourth lens unit has a positive refractive power.

61. An optical apparatus according to claim 53, wherein said diffraction optical element comprises a first annular diffraction grating and a second diffraction grating formed on said first annular diffraction grating, with said first annular diffraction grating and said second annular diffraction grating being made of different materials.

62. An optical apparatus, comprising:
   a zoom lens device; and
   means for holding said zoom lens device;
   wherein said zoom lens device comprises, in order of lens units from a long conjugate side, at least:
   (a) a first lens unit;
   (b) a second lens unit which is moved during zooming in order to change the size of an image;
   (c) a third lens unit which is stationary during zooming and which includes a diffraction optical element; and
   (d) a fourth lens unit;
   wherein during zooming (i) said fourth lens unit or (ii) in the case where there is one or more lens unit on the short conjugate side of said fourth lens unit, at least one lens unit of said fourth lens unit and said one or more lens unit, onwards is moved to correct a change in an image plane which occurs as the magnification changes.

63. An optical apparatus according to claim 62, wherein said first lens unit has a positive refractive power, said second lens unit has a negative refractive power, said third lens unit has a positive refractive power, and said fourth lens unit has a positive refractive power.

64. An optical apparatus according to claim 62, wherein the condition:

$$\Psi 3 \cdot C1 < 0$$

is satisfied, when $\Psi 3$ is the refractive power of said third lens unit, and when the phase at said diffraction optical element is:

$$\phi(h) = \frac{2\pi}{\lambda}(C1 \cdot h^2 + C2 \cdot h^4 + C3 \cdot h^6 + \cdots + Ci \cdot h^{2i})$$

where $\lambda$ is the wavelength of an incident light beam, Ci is a coefficient representing the phase, and h is the height measured from an optical axis.

65. An optical apparatus according to claim 62, wherein the condition:

$$\Psi 3 \cdot C1 < 0$$

is satisfied, when $\Psi 3$ is the refractive power due to the curvature of a surface corresponding to a diffraction optical surface of said diffraction optical element, and when the phase at said diffraction optical element is:

$$\phi(h) = \frac{2\pi}{\lambda}(C1 \cdot h^2 + C2 \cdot h^4 + C3 \cdot h^6 + \cdots + Ci \cdot h^{2i})$$

where $\lambda$ is the wavelength of an incident light beam, Ci is a coefficient representing the phase, and h is the height measured from an optical axis.

66. An optical apparatus according to claim 62, wherein the conditions:

$$1 \times 10^{-4} < |C2/C1| < 1 > 10^{-1}$$

and $$1 \times 10^{-5} < |C3/C1| < 1 \times 10^{-2}$$

are satisfied, when the phase at said diffraction optical element is:

$$\phi(h) = \frac{2\pi}{\lambda}(C1 \cdot h^2 + C2 \cdot h^4 + C3 \cdot h^6 + \cdots + Ci \cdot h^{2i})$$

where $\lambda$ is a wavelength of an incident light beam, Ci is a coefficient representing the phase, and h is the height measured from an optical axis.

67. An optical apparatus according to claim 62, wherein the condition:

$$0.05 < F3/Fbo < 0.2$$

is satisfied, where F3 is the focal length of said third lens unit and Fbo is the focal length of only a diffraction optical surface of said diffraction optical element.

68. An optical apparatus according to claim 62, wherein the condition:

$$0.5 < F3/\sqrt{Fw \cdot Ft} < 1.0$$

is satisfied, where F3 is the focal length of said third lens unit, and Fw and Ft are the focal lengths of the entire lens system at a wide angle end and at a telephoto end, respectively.

69. An optical apparatus according to claim 62, wherein the condition:

$$|F3/Rbo| 0.7$$

is satisfied, when there is only one diffraction optical surface in said third lens unit, F3 is the focal length of said third lens unit, and Rbo is the curvature of a surface corresponding to said diffraction optical surface of said diffraction optical element.

70. An optical apparatus according to claim 62, wherein the condition:

$$0.1 < t3/F3 < 0.27$$

is satisfied, where t3 is the axial thickness of said third lens unit, and F3 is the focal length of said third lens unit.

71. An optical apparatus according to claim 62, wherein said first lens unit has a positive refractive power, said second lens unit has a negative refractive power, said third lens unit has a positive refractive power, and said fourth lens unit has a negative refractive power.

72. An optical apparatus according to claim 62, wherein said diffraction optical element comprises a first annular diffraction grating and a second annular diffraction grating formed on said first annular diffraction grating, with said first annular diffraction grating and said second annular diffraction grating being made of different materials.

73. An optical apparatus, comprising:
   a zoom lens device; and
   means for holding said zoom lens device;
   wherein said zoom lens device comprises, in order of lens units from a long conjugate side, at least:
      (a) a first lens unit;
      (b) a second lens unit which is moved during zooming in order to change the size of an image;
      (c) a third lens unit which is stationary during zooming; and
      (d) a fourth lens unit including a diffraction optical element;
   wherein during zooming (i) said fourth lens unit or (ii) in the case where there is one or more lens unit on the short conjugate side of said fourth lens unit, at least one lens unit of said fourth lens unit and said one or more lens unit, is moved to correct changes in an image plane occurring as the magnification changes.

74. An optical apparatus according to claim 73, wherein said first lens unit has a positive refractive power, said second lens unit has a negative refractive power, said third lens unit has a positive refractive power, and said fourth lens unit has a positive refractive power.

75. A zoom lens device according to claim 73, wherein the following condition is met:

$$|0.5797 \cdot C14 + \Sigma(1/(f4i \cdot v4i))| \cdot f4 < 9.8 \times 10^{-3},$$

where f4i and v4i are the focal length and the Abbe number of all of the lenses of the fourth lens unit, where i refers to the i-th lens of the fourth lens unit, and C14 is a coefficient in the second order term of the following formula for the phase at the diffraction optical element:

$$\phi(h) = \frac{2\pi}{\lambda}(C1 \cdot h^2 + C2 \cdot h^4 + C3 \cdot h^6 + \cdots + Ci \cdot h^{2i})$$

where $\lambda$ is the wavelength of an incident light beam, Ci is a coefficient representing the phase, and h is the height measured from an optical axis.

76. An optical apparatus according to claim 73, wherein the following condition is met:

$$|0.5797 \cdot C14 + \Sigma(1/(f4i \cdot v4i))| \cdot f4 < 9.8 \times 10^{-3},$$

where f4i and v4i are the focal length and the Abbe number of all of the lenses of the fourth lens unit, where i refers to the i-th lens of the fourth lens unit, and C14 is a coefficient in the second order term of the following formula for the phase at the diffraction optical element:

$$\phi(h) = \frac{2\pi}{\lambda}(C1 \cdot h^2 + C2 \cdot h^4 + C3 \cdot h^6 + \cdots + Ci \cdot h^{2i})$$

where $\lambda$ is the wavelength of an incident light beam, Ci is a coefficient representing the phase, and h is the height measured from an optical axis.

77. A zoom lens device comprising in order from the object side to the image side:
   a first lens unit having a positive refractive power, wherein said first lens unit includes from the object side to the image side a meniscus negative first lens having a convex surface facing the object side, a positive second lens, and a positive third lens;
   a second lens unit having a negative refractive power, said second lens unit being moved during zooming in order to change the size of an image;
   a third lens unit having a positive refractive power;
   a fourth lens unit having a negative refractive power, wherein said fourth lens unit is moved during zooming; and
   a fifth lens unit having a positive refractive power,
   wherein said first lens unit further includes a diffractive optical element.

78. A zoom lens according to claim 77, wherein said diffractive optical element has a shape rotationally symmetrical with respect to the optical axis.

79. A zoom lens according to claim 77, wherein said diffractive optical element is formed on a refractive surface of one of said first through third lenses of said first lens unit,
   wherein during change of magnification from the wide angle end toward the telephoto end, said second lens unit moves toward the image side and said fourth lens unit moves along a locus which is convex towards the image side,
   wherein during focusing from a nearest object to an object at infinity, said fourth lens unit moves toward the object side,
   wherein said first, third, and fifth lens units are fixed, and
   wherein the following conditions are satisfied:

$$5.1 < |f1/f2| < 9.3$$

where f1 and f2 respectively represent the focal lengths of said first and second lens units, $$1.8 < f1/\sqrt{Fw \cdot Ft} < 3.2$$

where fW and fT respectively represent focal lengths at the wide angle end and the telephoto end of said zoom lens, $$v12 < 65$$

$$v13 < 65$$

where v12 and v13 respectively represent Abbe numbers of said second lens and said third lens, and $$|0.5797 \cdot C_2 + \Sigma(1/(f1i \cdot v1i))| \cdot f1 < 9.8 \times 10^{-3},$$

wherein f1i and ν1i respectively represent the focal length and the Abbe number of the i-th lens of said first lens unit and C2 represents the coefficient of the second term of the following formula for the phase at said diffractive optical element:

$$\phi(h) = \frac{2\pi}{\lambda}(C1 \cdot h^2 + C2 \cdot h^4 + C3 \cdot h^6 + \cdots + Ci \cdot h^{2i})$$

where λ is the wavelength of an incident light beam, Ci is a coefficient representing the phase, and h is the height measured from an optical axis.

80. A zoom lens according to claim 39, wherein a most object side surface of said fourth lens unit is aspherical.

81. A zoom lens system comprising, in order from an object side to an image side,
   a first lens unit of positive optical power;
   a second lens unit of negative optical power which moves along an optical axis for zooming;
   a third lens unit of positive optical power; and
   a fourth lens unit which moves along an optical axis for zooming,
   wherein at least one of said first, second, third and fourth lens unit includes a diffraction optical element, and
   wherein the product of the refractive power due to the curvature of a surface corresponding to a diffraction optical surface of said diffraction optical element and the optical power due to the diffractive action of said diffraction optical surface is a positive value.

82. A zoom lens system according to claim 81, wherein said third lens unit does not move for zooming.

83. A zoom lens system according to claim 81, wherein said first lens unit does not move for zooming.

84. A zoom lens system according to claim 81, wherein an optical power of said fourth lens unit has a positive optical power.

85. A zoom lens system according to claim 84, further comprising a fifth lens unit of negative optical power which is disposed on the image side of said fourth lens unit.

86. A zoom lens system according to claim 81, wherein an optical power of said fourth lens unit has a negative optical power.

87. A zoom lens system according to claim 86, further comprising a fifth lens unit of positive optical power which is disposed on the image side of said fourth lens unit.

88. A camera, comprising:
   a zoom lens system for forming an image; and
   an image pick-up element for receiving said image;
   wherein said zoom lens system comprises in order from an object side to an image side,
   (a) a first lens unit of positive optical power;
   (b) a second lens unit of negative optical power which moves along an optical axis for zooming;
   (c) a third lens unit of positive optical power; and
   (d) a fourth lens unit which moves along an optical axis for zooming,
   wherein at least one of said first, second, third and fourth lens units includes a diffraction optical element, and
   wherein the product of the refractive power due to the curvature of a surface corresponding to a diffraction optical surface of said diffraction optical element and the optical power due to the diffractive action of said diffraction optical surface is a positive value.

89. A zoom lens system according to claim 81, wherein said first lens unit includes a diffraction optical element.

90. A zoom lens system according to claim 81, wherein said second lens unit includes a diffraction optical element.

91. A zoom lens system according to claim 81, wherein said third lens unit includes a diffraction optical element.

92. A zoom lens system according to claim 81, wherein said fourth lens unit includes a diffraction optical element.

93. A zoom lens system comprising, in order from the object side to the image side:
   a first lens unit having a positive refractive power;
   a second lens unit having a negative refractive power;
   a third lens unit having a positive refractive power; and
   a fourth lens unit having a positive or negative refractive power,
   wherein during zooming, said second lens unit and said fourth lens unit move and said third lens unit is stationary, and
   wherein a diffraction optical surface is included in said third lens unit or a diffraction optical surface is included in said fourth lens unit.

94. A zoom lens system according to claim 93, wherein a diffraction optical surface is included in said third lens unit.

95. A zoom lens system according to claim 93, wherein a diffraction optical surface is included in said fourth lens unit.

96. A zoom lens system according to claim 93, wherein said fourth lens unit moves for focusing.

97. A zoom lens device according to claim 17, wherein during zooming said fourth lens unit is moved.

98. A zoom lens device according to claim 27, wherein during zooming said fourth lens unit is moved.

99. A zoom lens device according to claim 39, wherein during zooming said fourth lens unit is moved.

100. An optical apparatus according to claim 53, wherein during zooming said fourth lens unit is moved.

101. An optical apparatus according to claim 62, wherein during zooming said fourth lens unit is moved.

102. An optical apparatus according to claim 73, wherein during zooming said fourth lens unit is moved.

103. A zoom lens device according to claim 16, wherein during zooming said fourth lens unit is moved.

104. An optical apparatus according to claim 52, wherein during zooming said fourth lens unit is moved.

* * * * *

UNITED STATES PATENT AND TRADEMARK OFFICE
CERTIFICATE OF CORRECTION

PATENT NO. : 6,606,200 B1
DATED : August 12, 2003
INVENTOR(S) : Hiroki Nakayama et al.

It is certified that error appears in the above-identified patent and that said Letters Patent is hereby corrected as shown below:

Column 4,
Line 19, ":device" should read -- device --.

Column 6,
Line 30, "$10^{-1}$" should read -- $10^{+1}$ --.
Line 39, "$1 \times 10^{-5} < |C2/C1| < 1 \times 10^{-2}$" should read -- $1 \times 10^{-5} < |C3/C1| < 1 \times 10^{-2}$ --.

Column 13,
Line 33, "A3:- 1.700558E-05" should read -- A3: -1.70558E-04 A4: 2.88941E-05 --.

Column 15,
Line 11, "A2" should read -- C2 --.

Column 19,
Line 11, "refractive-power" should read -- refractive power --.

Column 22,
Line 44, "(1i" should read -- (f1i --.

Column 25,
Line 16, (10th surface, A3), "1.749 E-05" should read -- 1.769 E-05 --.

Column 26,
Line 57, (13th surface, A4), "1.338 E-06" should read -- 1.388 E-06 --.

Column 27,
Lines 50 and 59, "y1i" should read -- $v$1i --.

Column 32,
Line 4, "$(|0.5797 \cdot C11 + \Sigma(1/fli v1i| \cdot fl < 0.02))$" should read -- $|0.5797 \cdot C11 + \Sigma(1/fli \cdot v1i))| \cdot fl < 0.02$ --.

UNITED STATES PATENT AND TRADEMARK OFFICE
CERTIFICATE OF CORRECTION

PATENT NO. : 6,606,200 B1
DATED : August 12, 2003
INVENTOR(S) : Hiroki Nakayama et al.

It is certified that error appears in the above-identified patent and that said Letters Patent is hereby corrected as shown below:

Column 33,
Line 16, "A4 = 4.02213×10$^{-3}$" should read -- A4 =4.02213×10$^{-7}$ --.
Line 60, "A3 = 1.70009×10" should read -- A3 =1.70009×10$^{-5}$ --.
Line 64, "A3 = 2.27981×10" should read -- A3 =2.27981×10$^{-5}$ --.
Line 65, "65" should be deleted.

Column 39,
Line 49, "aberrations-caused" should read -- aberrations caused --.

Column 42,
Line 64, "A3 =7.60311×10$^{-3}$" should read -- A3 =7.60311×10$^{-7}$ --.

Column 43,
Line 7, "C3 =-8.60805·10$^{-3}$" should read -- C3 =8.60805·10$^{-3}$ --.

Column 45,
Line 58, "59A-D" should read -- 57A-D --.

Column 47,
Line 45, "(2i)i" should read -- (2i) --.

Column 48,
Line 45, "unit L1" should read -- unit L1 --.

Column 52,
Line 28, "(1/fli$v$1i)" should read -- (1/fli·$v$1i) --.

Column 55,
Line 55, "surface," should read -- surface in said second lens unit --.

Column 57,
Line 45, "0.7" should read -- <0.7 --.

UNITED STATES PATENT AND TRADEMARK OFFICE
CERTIFICATE OF CORRECTION

PATENT NO. : 6,606,200 B1
DATED : August 12, 2003
INVENTOR(S) : Hiroki Nakayama et al.

It is certified that error appears in the above-identified patent and that said Letters Patent is hereby corrected as shown below:

Column 61,
Line 52, "onwards" should be deleted.

Column 63,
Line 46, "73" should read -- 39 --.
Line 48, "$v4i)$" should read -- $v4i))$ --.

Column 64,
Line 66, "$C_2$" should read -- C2 --.

Signed and Sealed this

Thirtieth Day of March, 2004

JON W. DUDAS
*Acting Director of the United States Patent and Trademark Office*